United States Patent [19]

Matsumaru

[11] Patent Number: 5,428,713
[45] Date of Patent: Jun. 27, 1995

[54] COMPOUND MODULE TYPE MANIPULATOR APPARATUS

[75] Inventor: Takafumi Matsumaru, Yokohama, Japan

[73] Assignee: Kabushiki Kaisha Toshiba, Kawasaki, Japan

[21] Appl. No.: 982,294

[22] Filed: Nov. 25, 1992

[30] Foreign Application Priority Data

Nov. 25, 1991 [JP] Japan .................................. 3-309426
Nov. 25, 1991 [JP] Japan .................................. 3-334492

[51] Int. Cl.$^6$ ........................ G05B 19/00; G05B 19/42
[52] U.S. Cl. ............................................. 395/80; 395/84; 395/86; 395/93; 395/97
[58] Field of Search ................... 395/80, 97, 93, 84, 395/86

[56] References Cited

U.S. PATENT DOCUMENTS

| | | | |
|---|---|---|---|
| 3,575,301 | 1/1968 | Panissidi | 414/618 |
| 4,698,572 | 10/1987 | Stone | 395/89 |
| 4,806,060 | 2/1989 | Rhodes et al. | 395/89 |
| 4,937,759 | 6/1990 | Vold | 395/97 |

FOREIGN PATENT DOCUMENTS

| | | |
|---|---|---|
| 53-3141 | 2/1978 | Japan . |
| 60-34282 | 2/1985 | Japan . |
| 62-282886 | 12/1987 | Japan . |
| 63-50155 | 10/1988 | Japan . |

OTHER PUBLICATIONS

Toward Planning and Control of Highly Redundant Manipulators 5-7 Sep. 1990 A. Hayashi et al.
Two 7-R Manipulators Which Provide Controlably Dexterous Workspace, 14-19 May 1989 J. K. Davidson.

*Primary Examiner*—Allen R. MacDonald
*Assistant Examiner*—Richemond Dorvil
*Attorney, Agent, or Firm*—Oblon, Spivak, McClelland, Maier, & Neustadt

[57] ABSTRACT

A manipulator main body is constituted by a combination of a plurality of joint modules and a plurality of arm modules. In addition, each of the joint modules incorporates at least one gravity switch or the like as an identification signal generator for detecting the ordinal number of each joint module in the order of connection or its degree of freedom of assembly in a direction in a given coordinate system, and outputting an identification signal indicating the detection result. Furthermore, each of the arm modules incorporates at least one measurement signal generator for detecting the length and bending direction of each arm module, and outputting a measurement signal indicating the detection result. Moreover, the manipulator main body includes a signal processing unit for performing analysis processing of signals representing the states of the respective modules constituting the main body according to a predetermined procedure. The control program for controlling the manipulator main body is customized on the basis of the processed signals, and is started to allow the manipulator main body to perform an optimal operation in an assembled state.

14 Claims, 50 Drawing Sheets

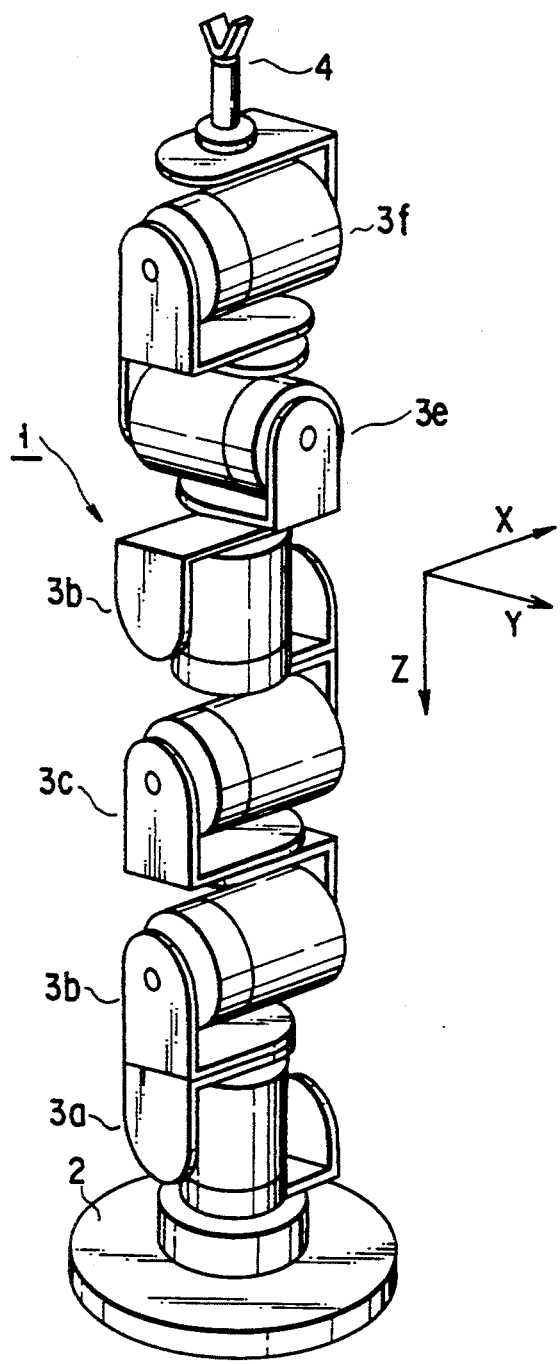
F I G. 1
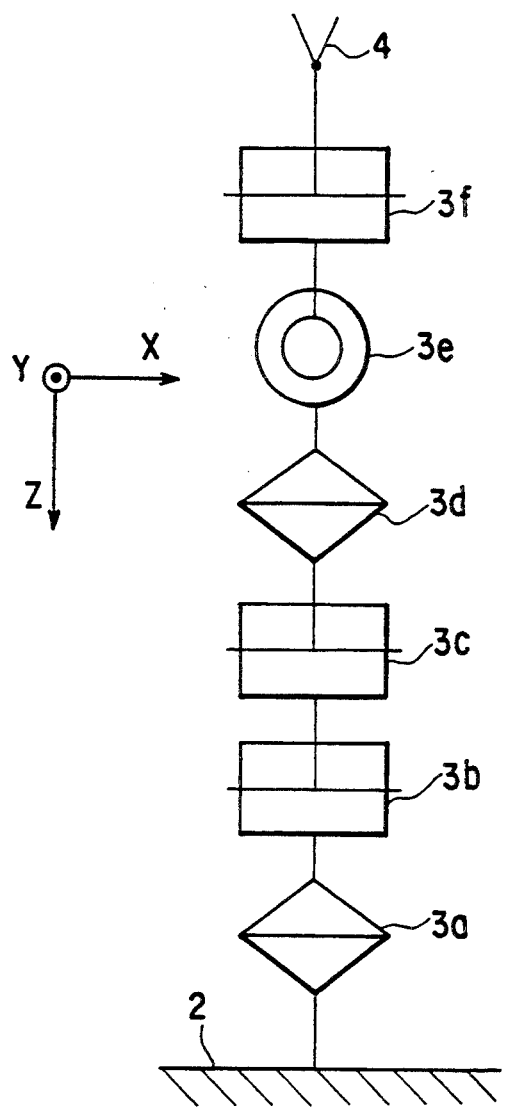
F I G. 2

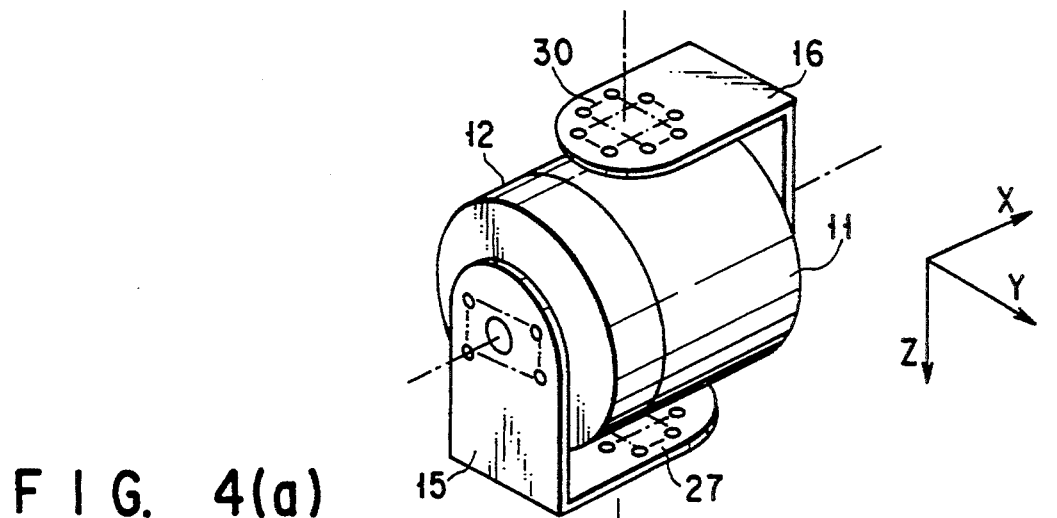
F I G. 4(a)
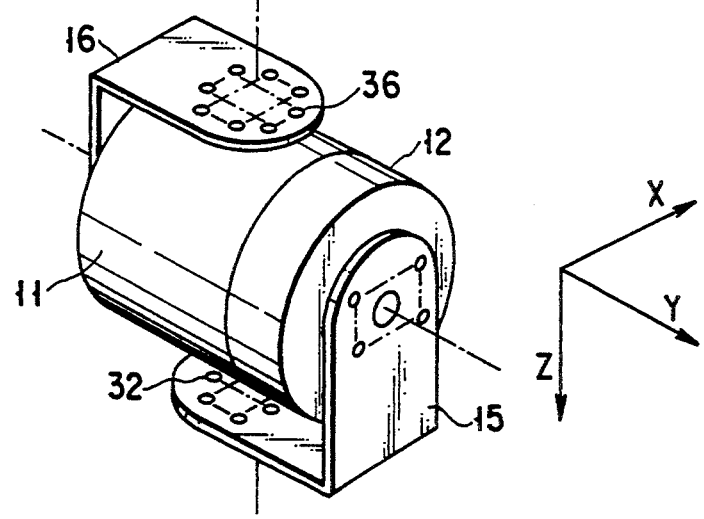
F I G. 4(b)
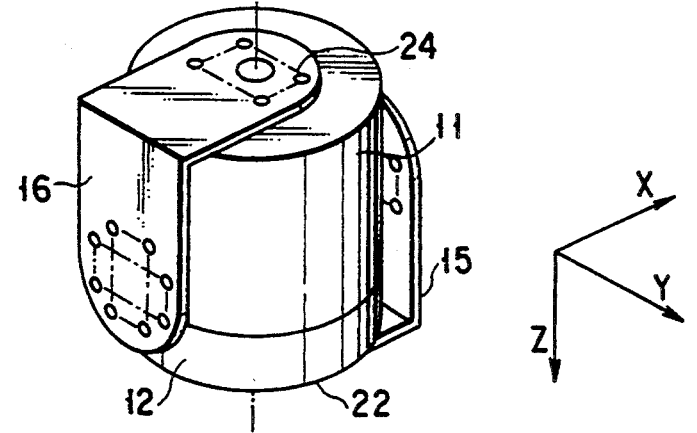
F I G. 4(c)

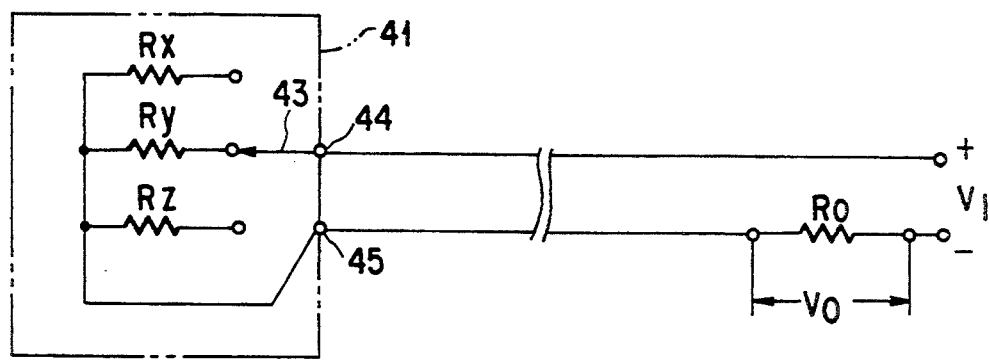
FIG. 8
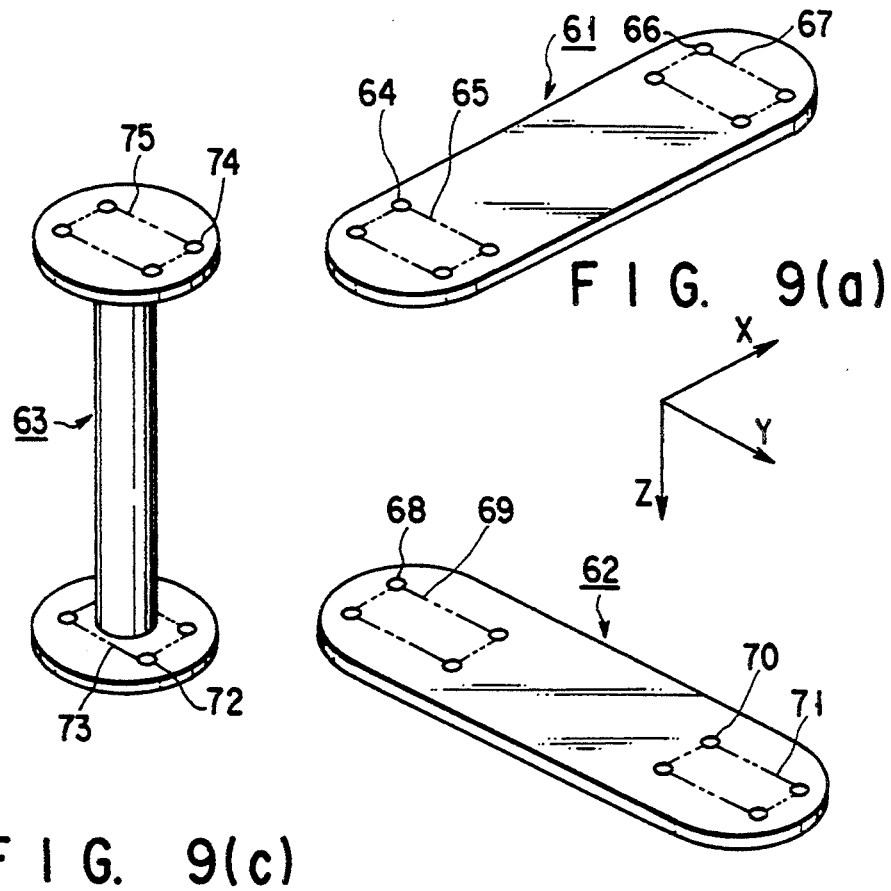
FIG. 9(a)
FIG. 9(b)
FIG. 9(c)

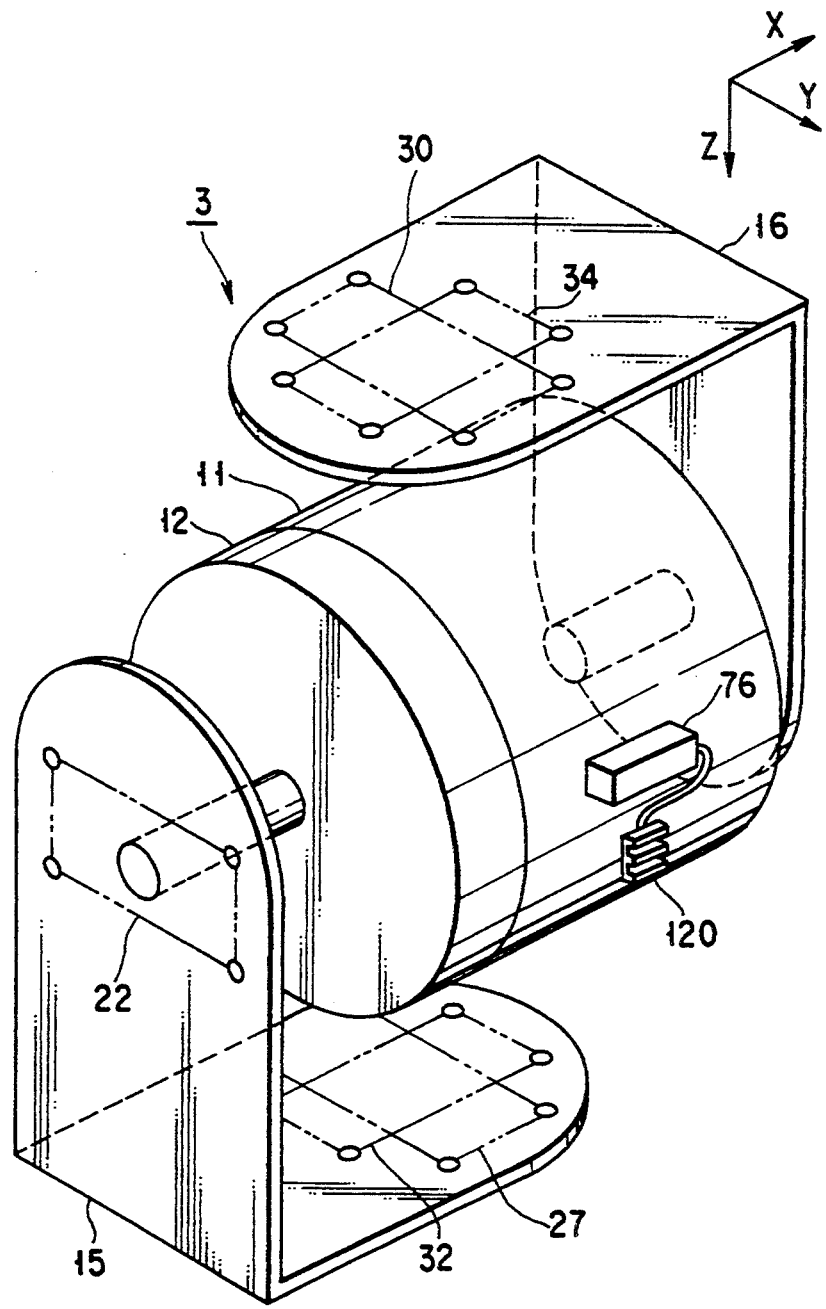
F I G. 12

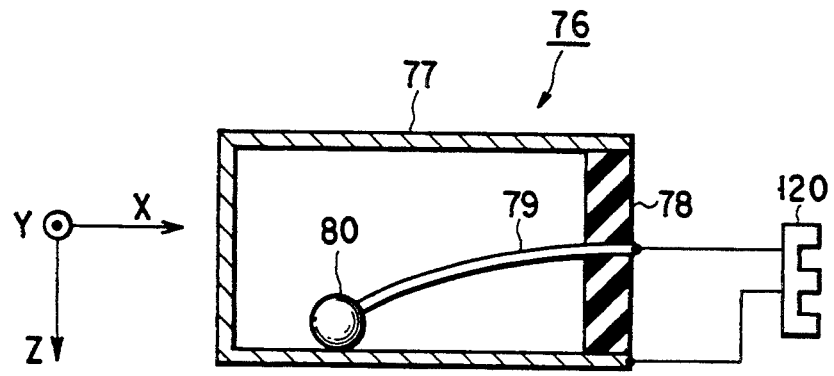
F I G. 13(a)
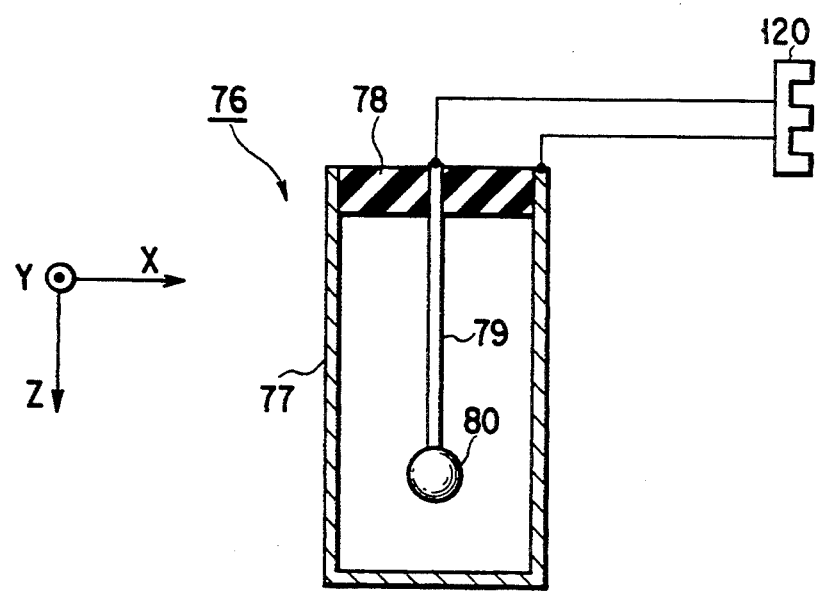
F I G. 13(b)

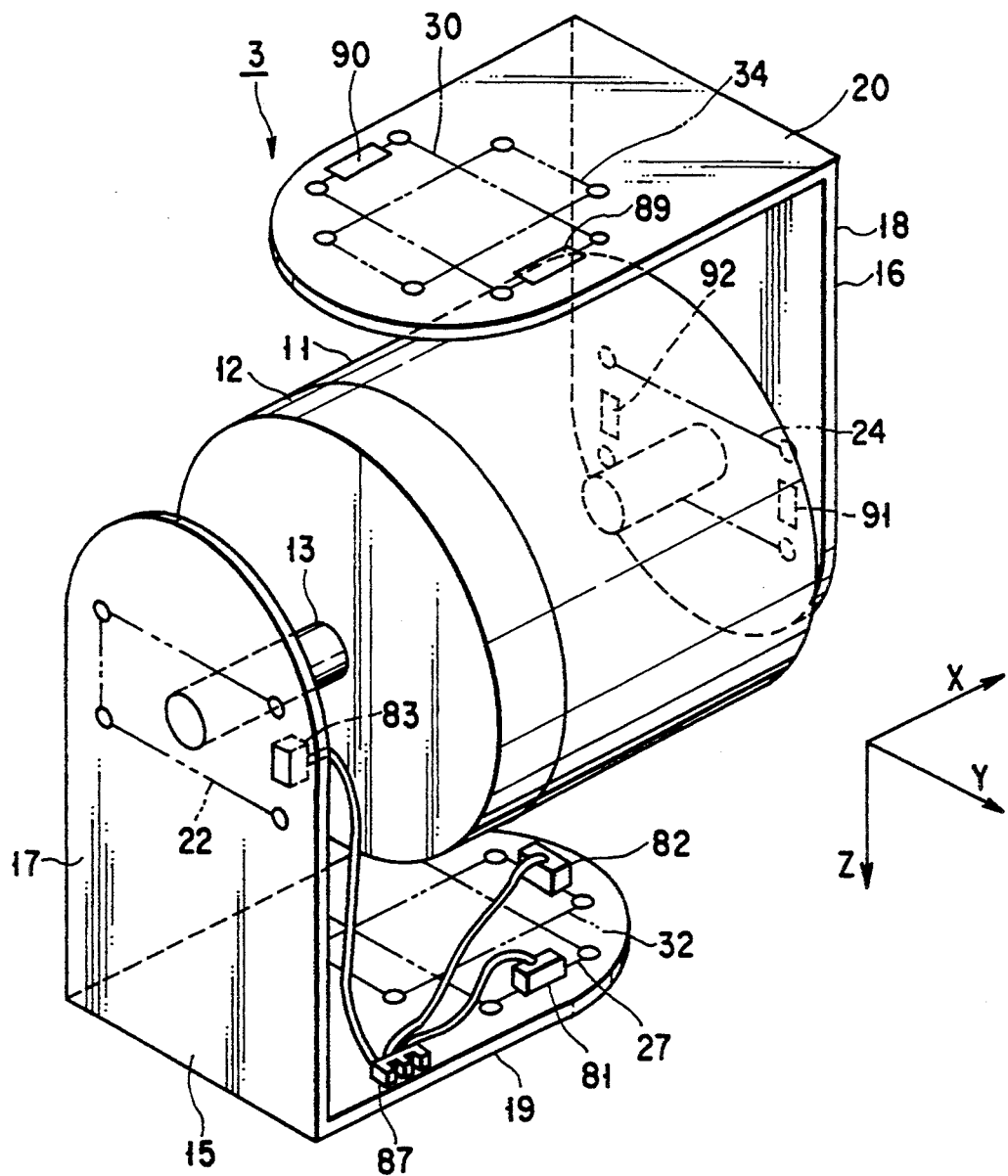
F I G. 15

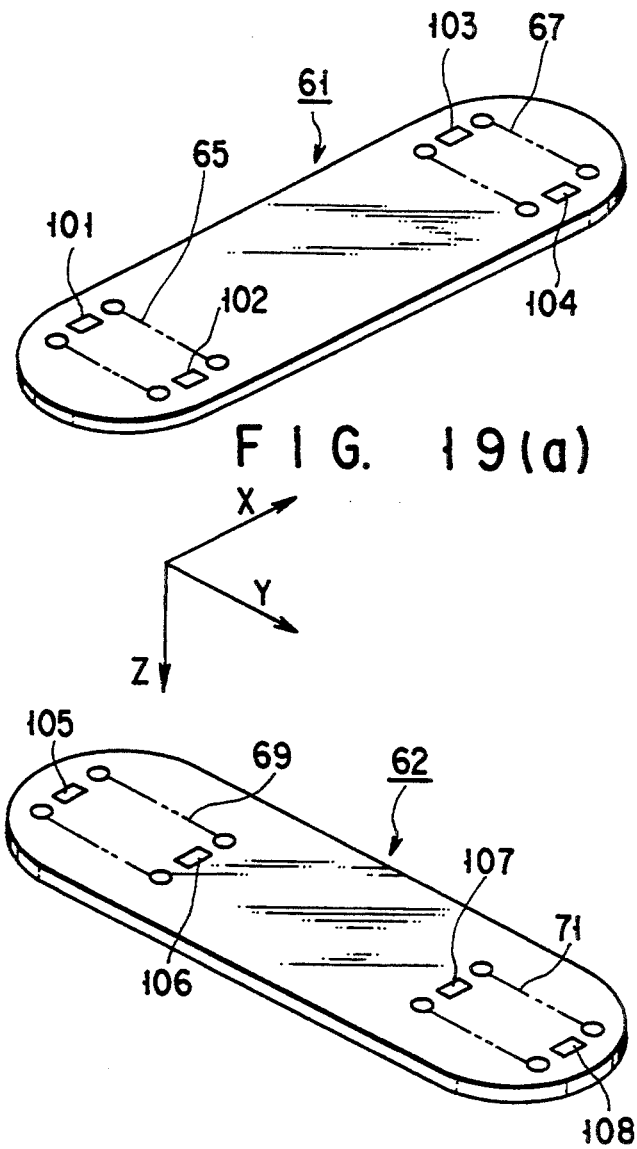
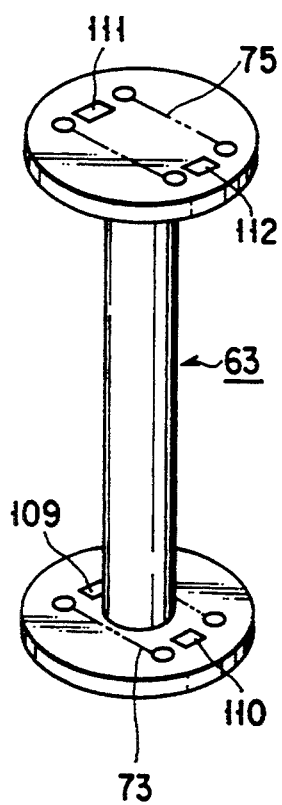
FIG. 19(a)
FIG. 19(c)    FIG. 19(b)

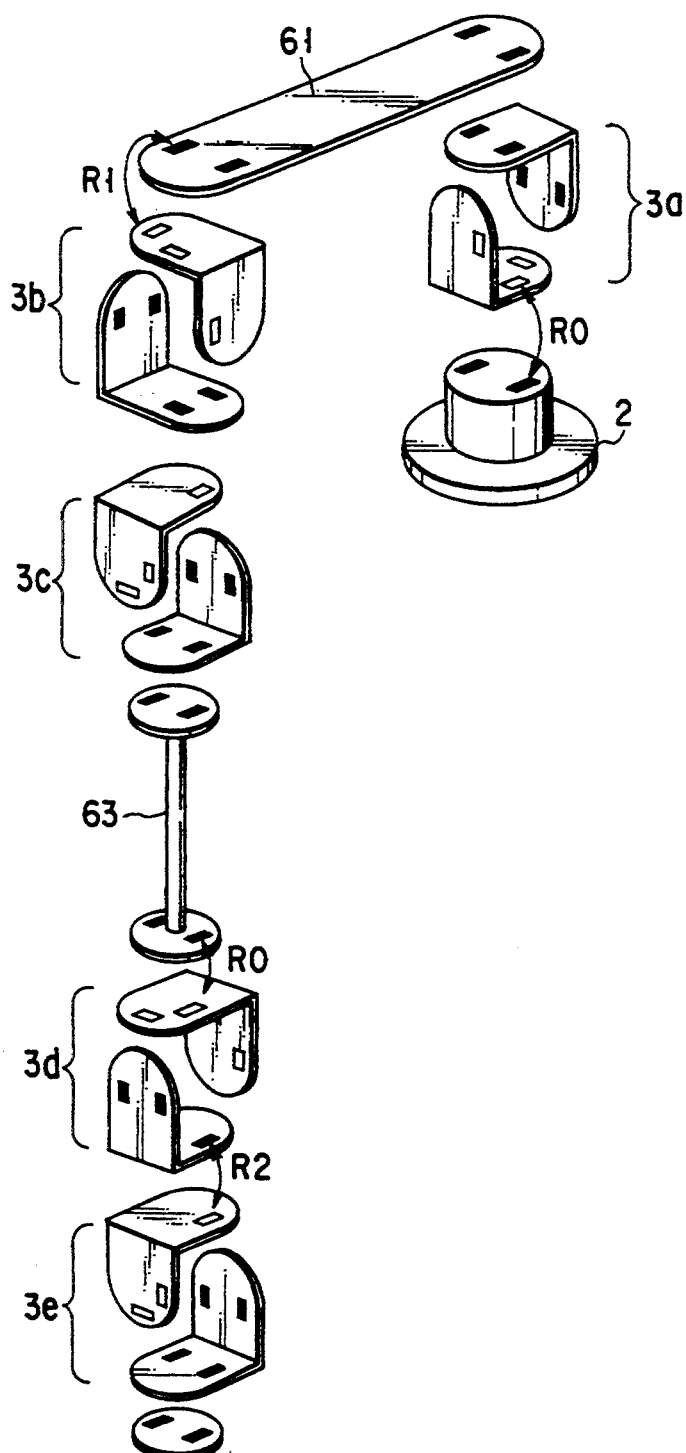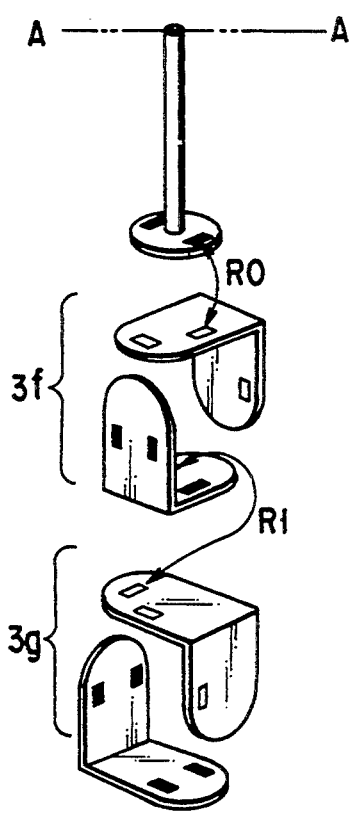
FIG. 20
FIG. 21

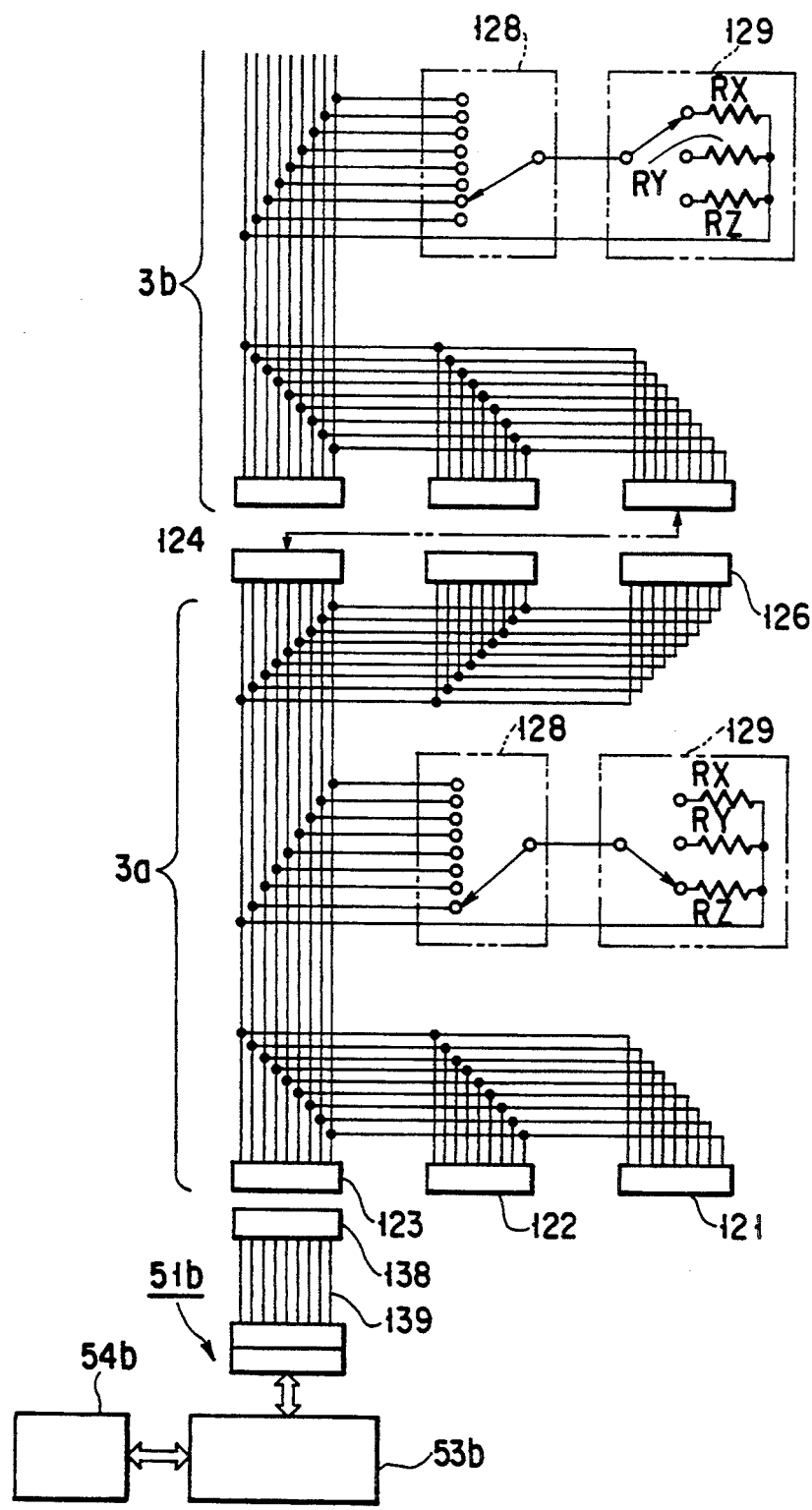
F I G. 26

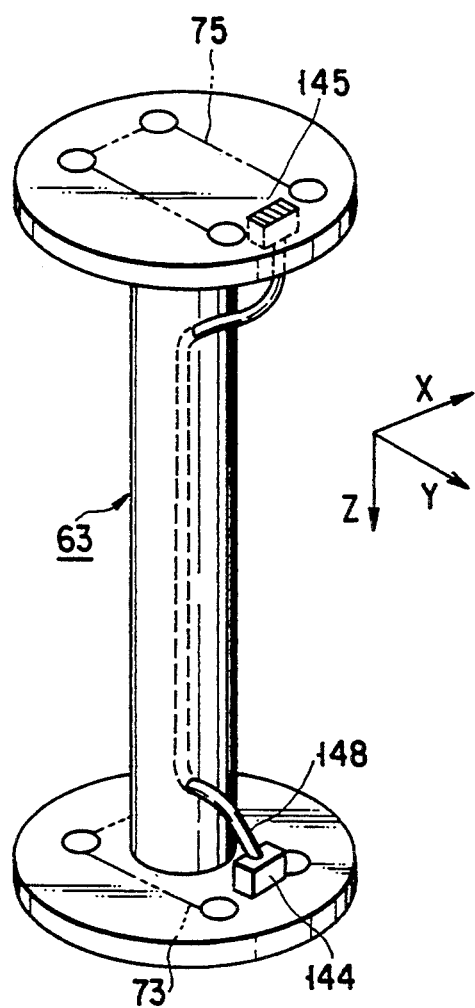
F I G. 29

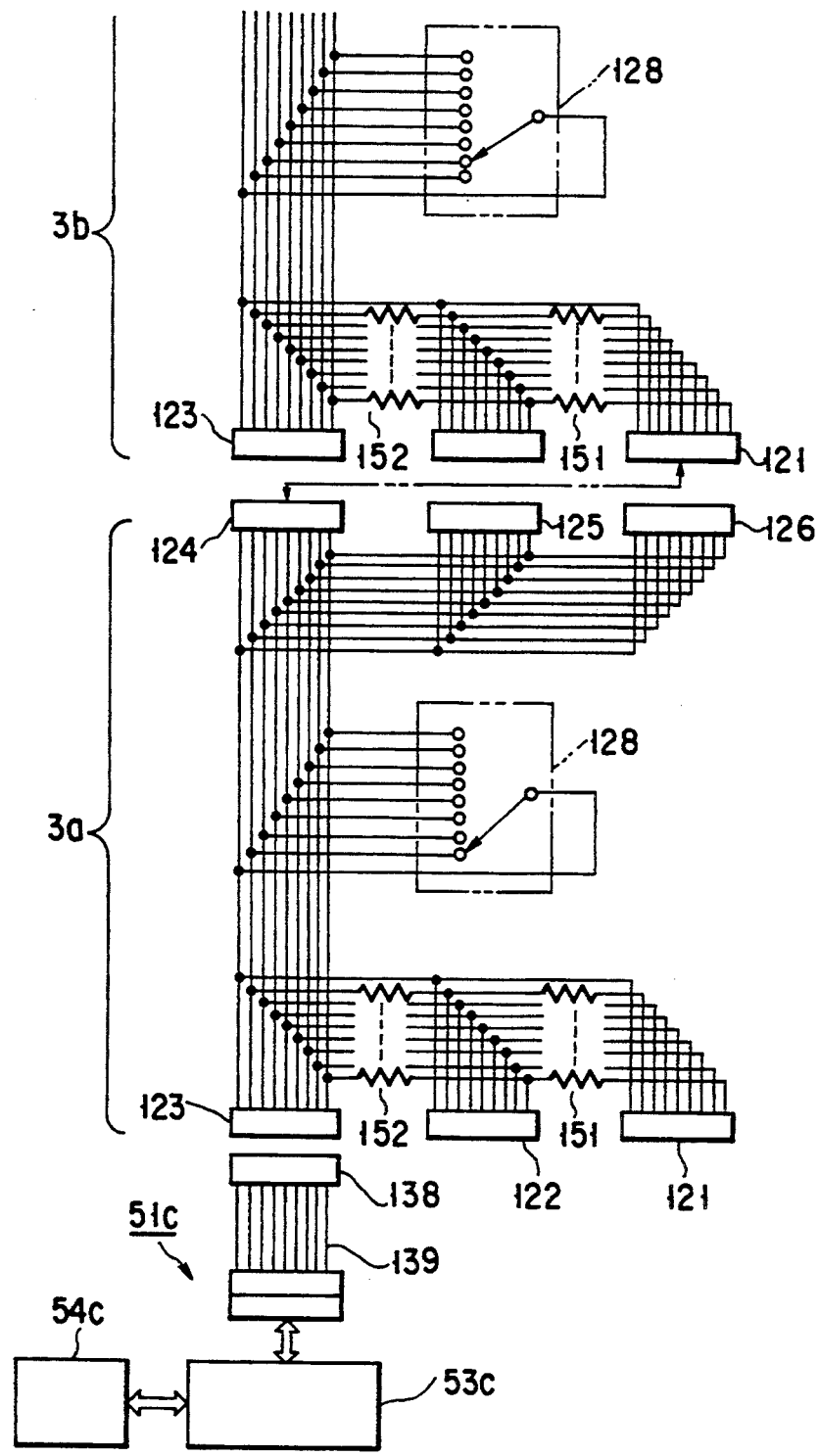
F I G. 33

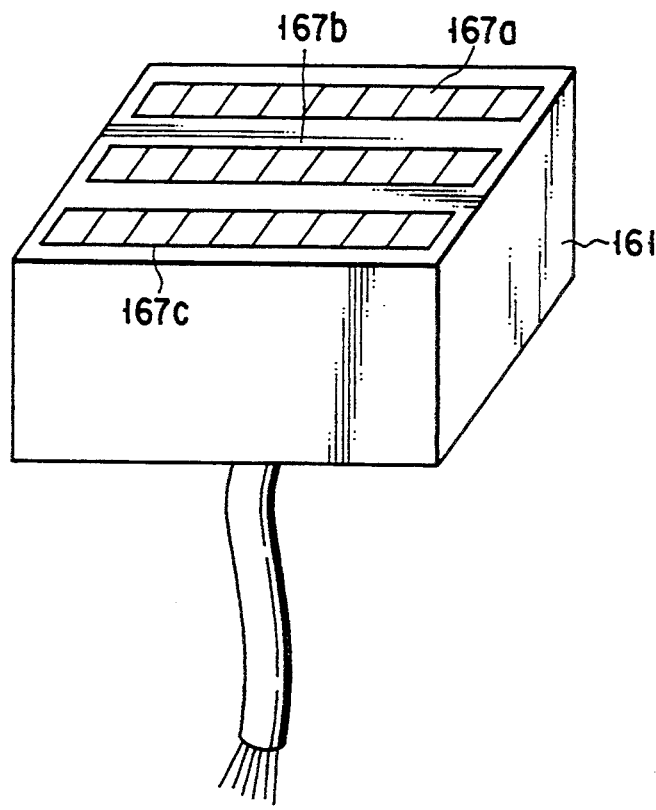
F I G. 35
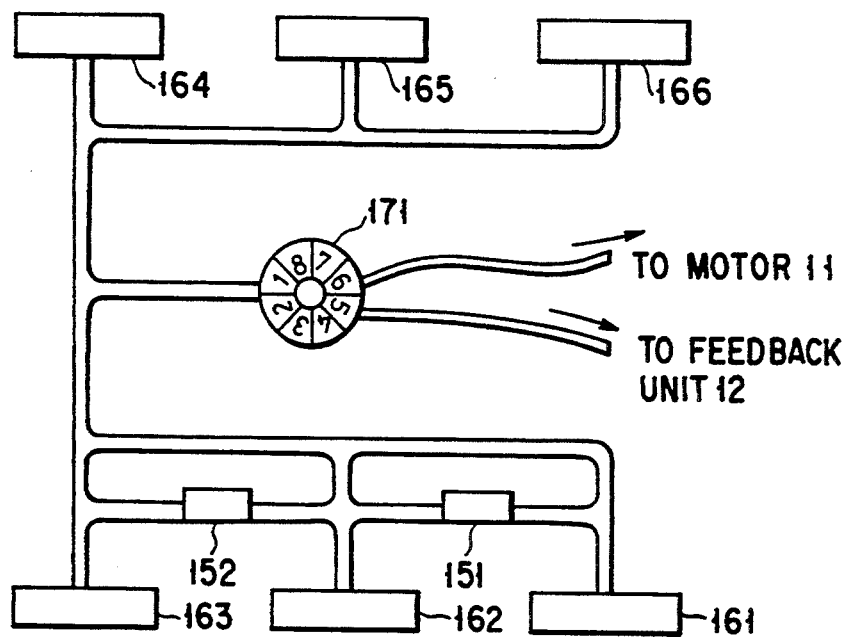
F I G. 36

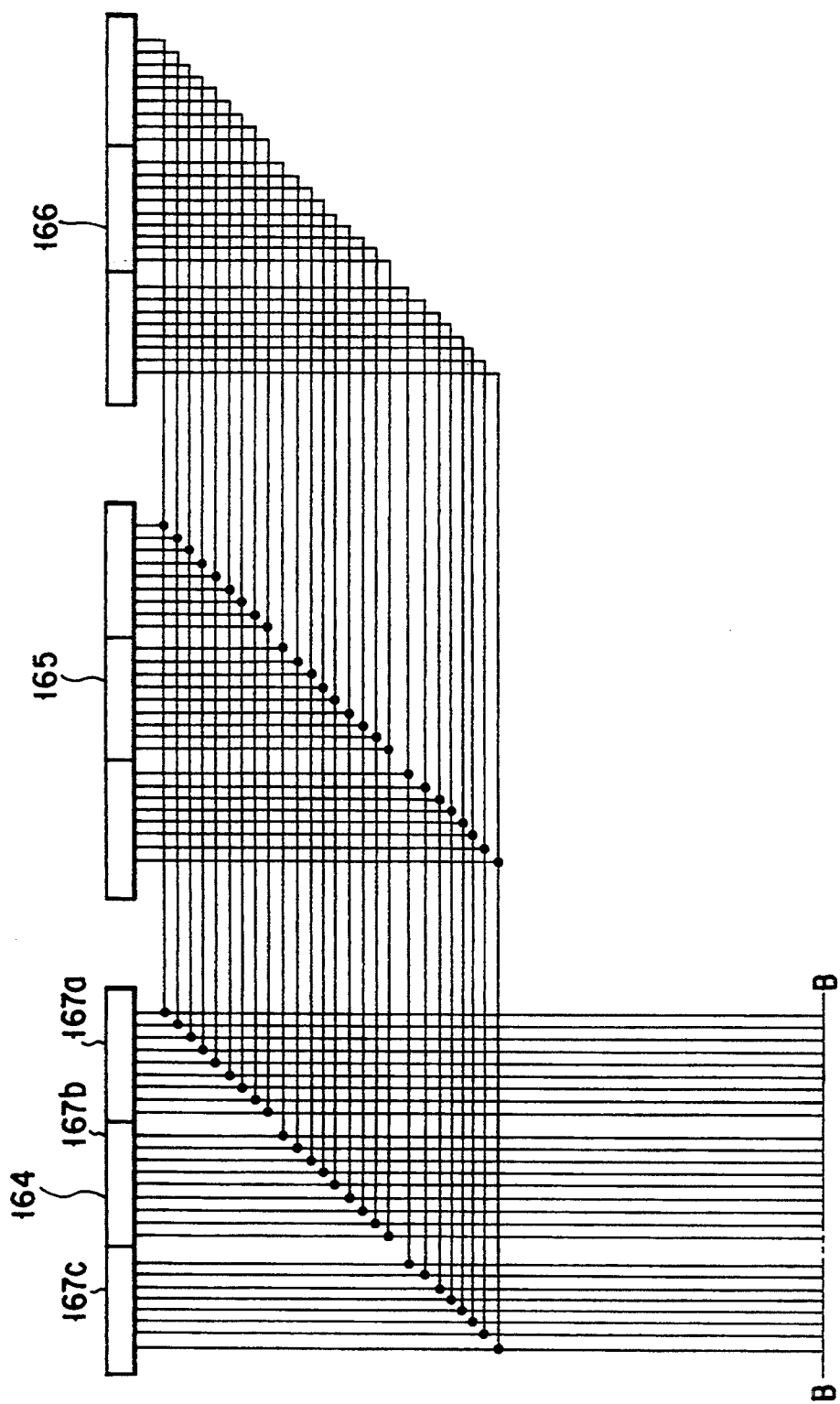
F I G. 37

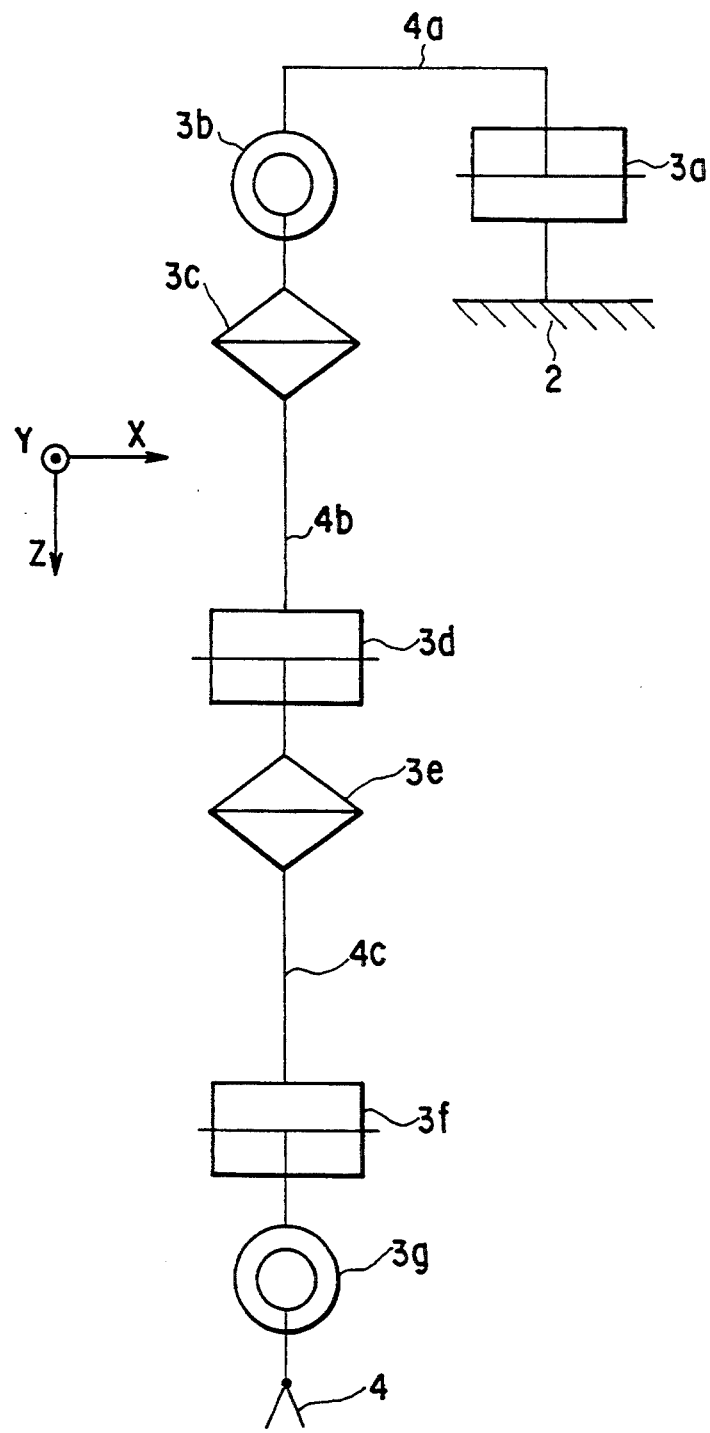
F I G. 45

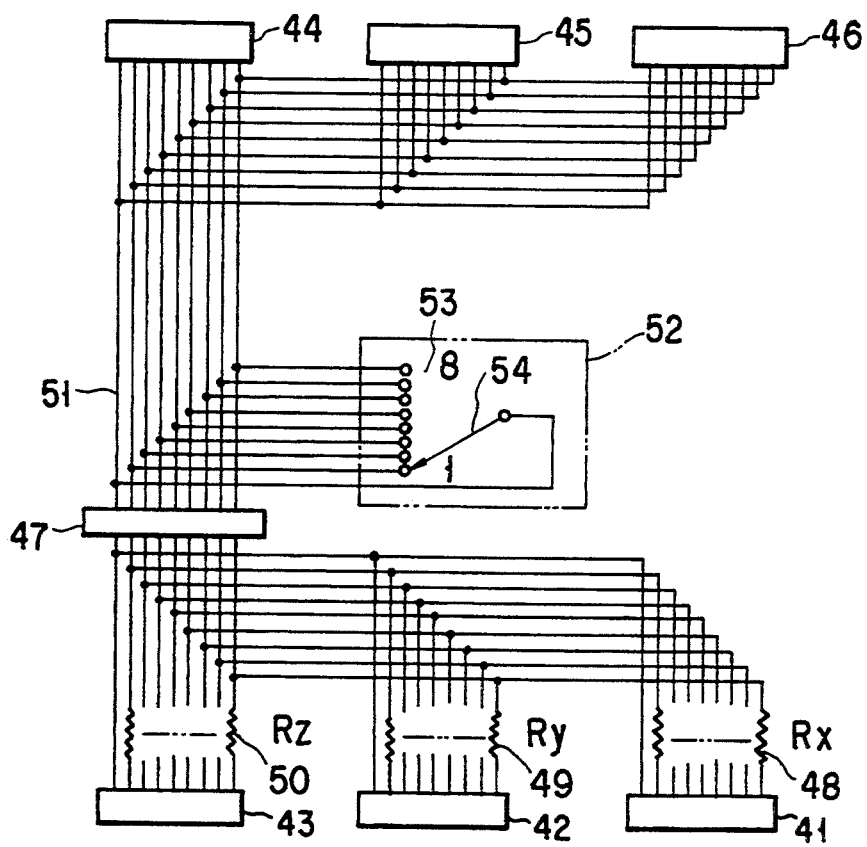
F I G. 47
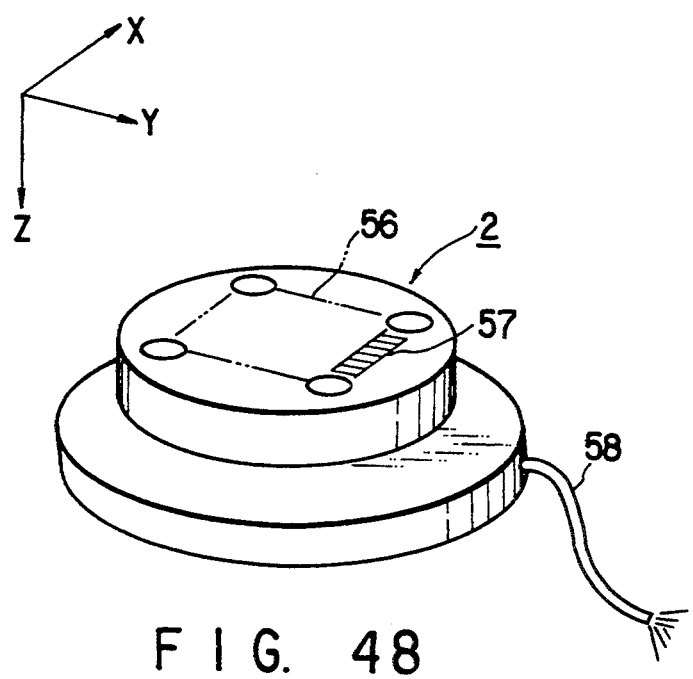
F I G. 48

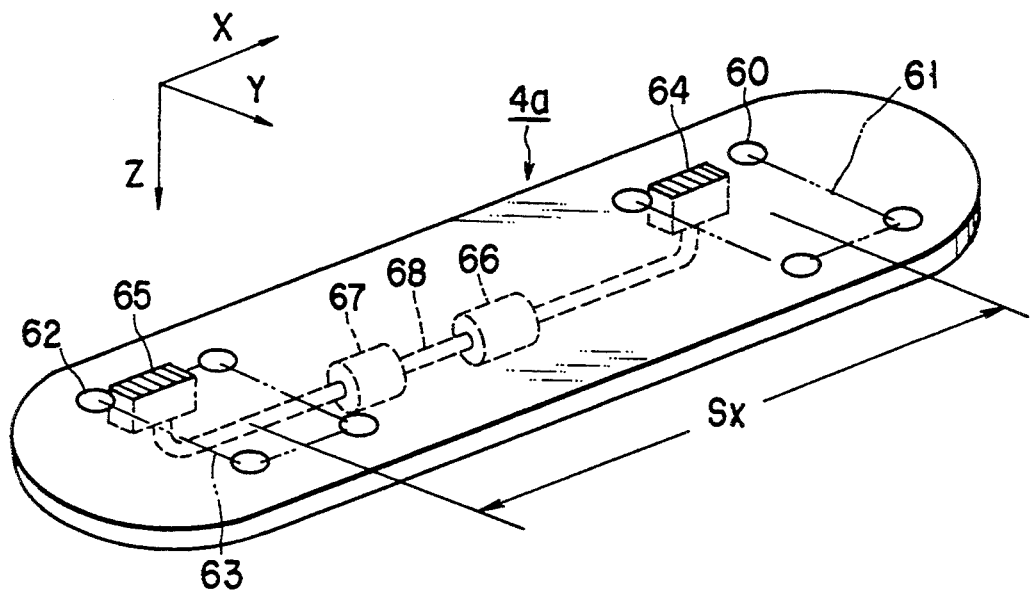
F I G. 49
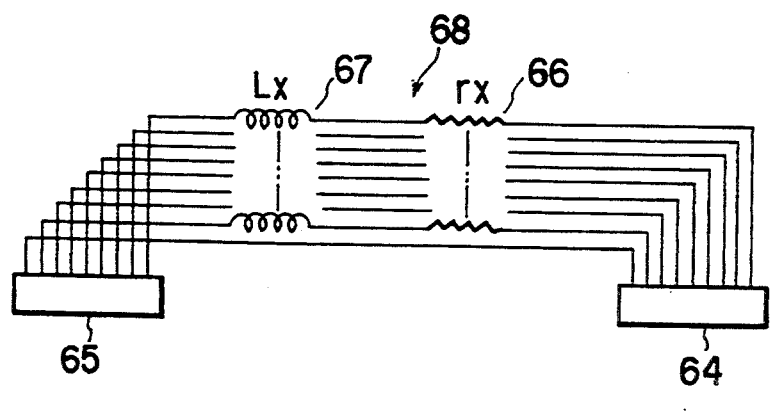
F I G. 50

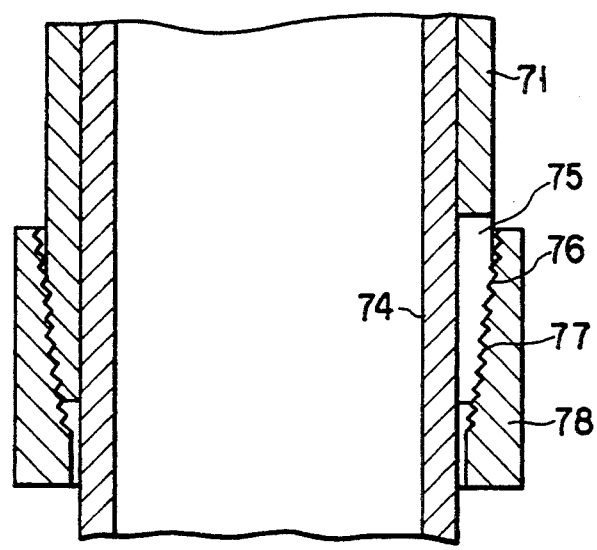
F I G. 52
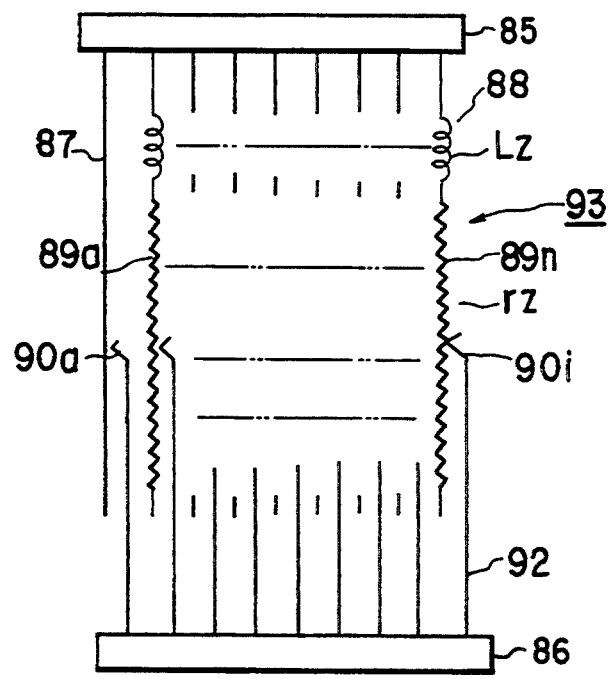
F I G. 53

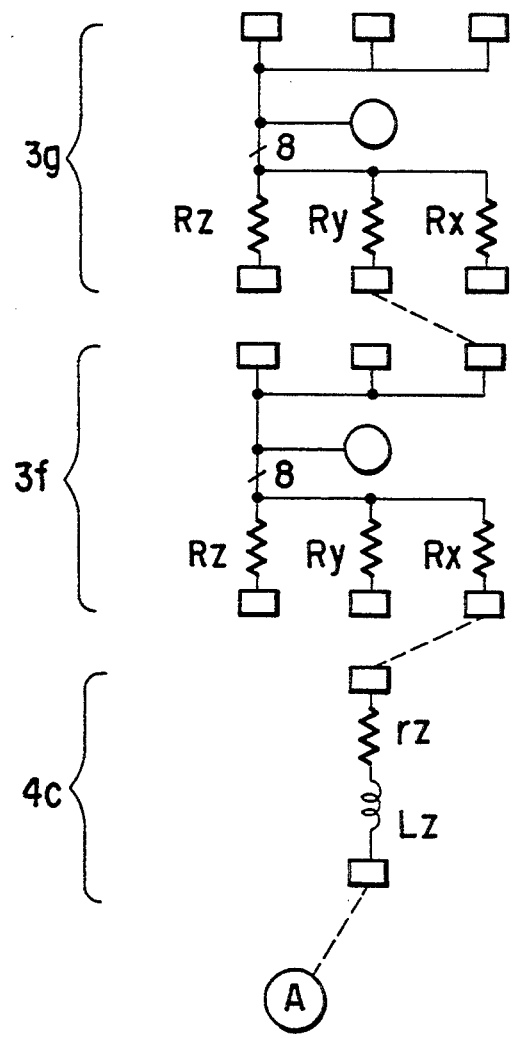
F I G. 55
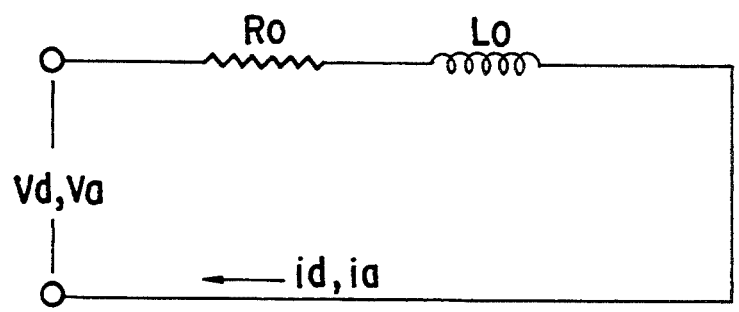
F I G. 56

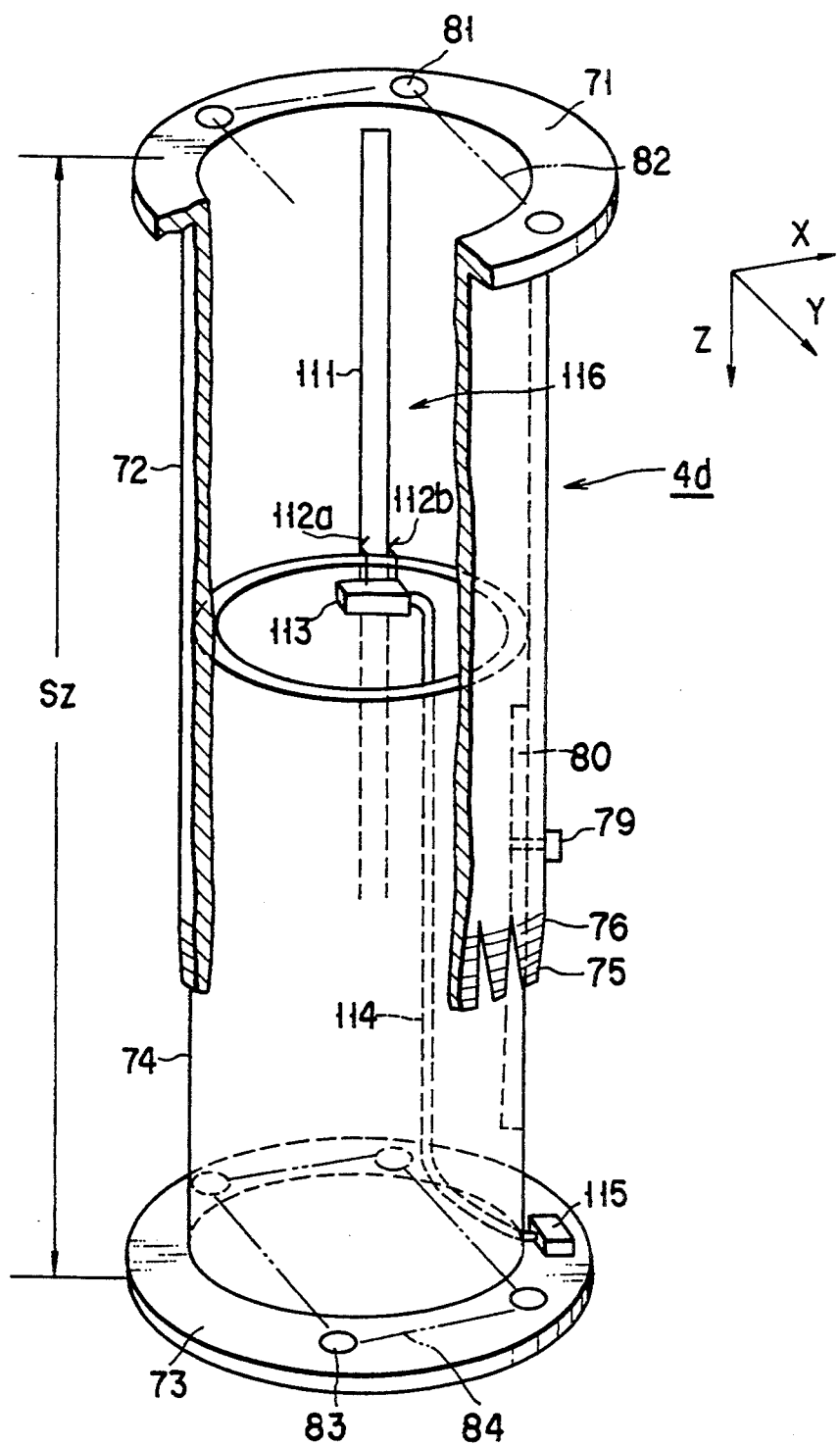
F I G. 57

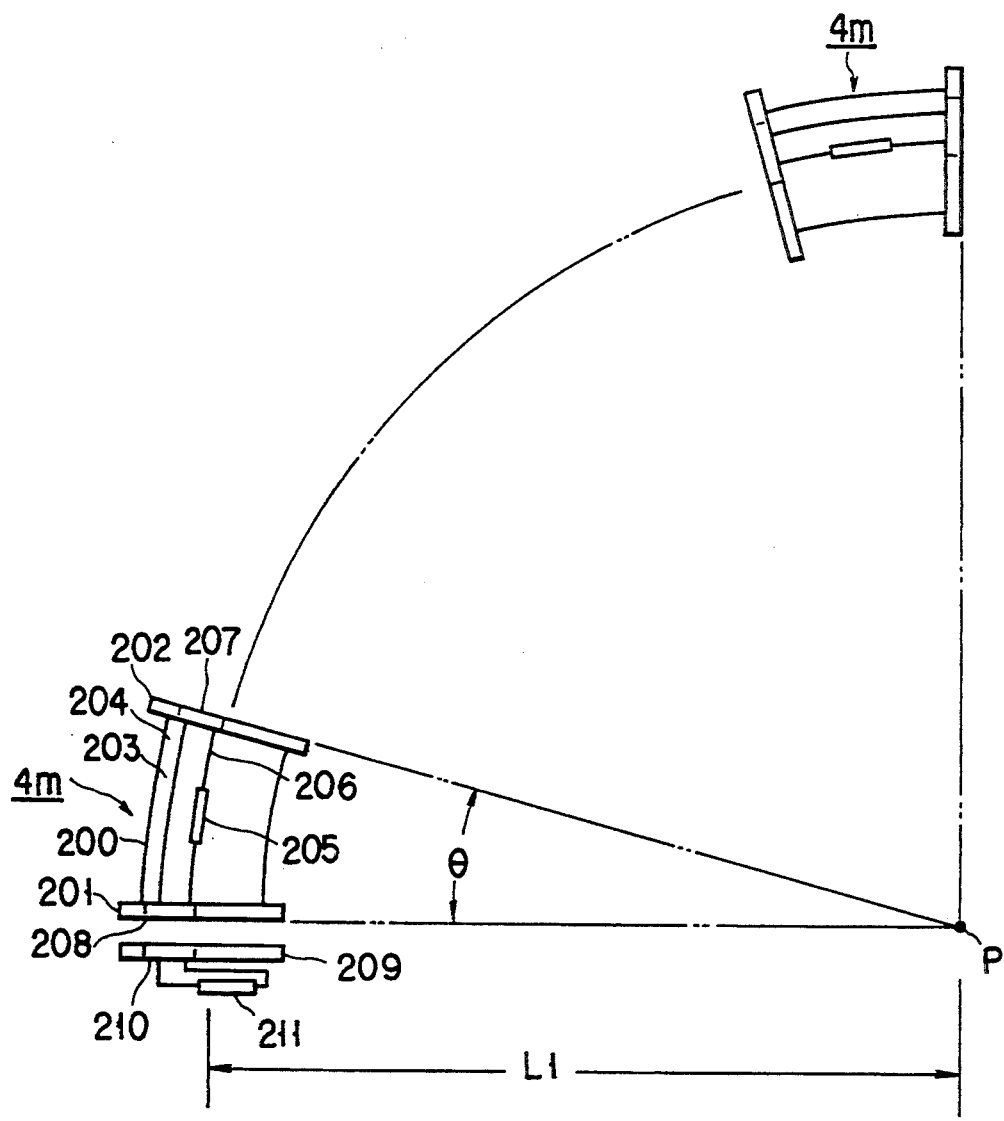
F I G. 65

COMPOUND MODULE TYPE MANIPULATOR APPARATUS

BACKGROUND OF THE INVENTION

1. Field of the Invention

The present invention relates to a manipulator apparatus and, more particularly, to a manipulator apparatus having a wide range of applications and good maintainability.

2. Description of the Related Art

As is known, conventional manipulator apparatuses include (1) a specialized manipulator having a manipulator main body constituted by components designed for a certain operation, and (2) a "module type manipulator" having a manipulator main body constituted by a combination of a plurality of standardized joint modules or arm modules.

In the former apparatus (1), various problems are posed when the operation target is changed. For example, assume that a manipulator apparatus having a long arm module, which is designed for a large working area, is to be used in a small working area. In this case, during an operation of the apparatus, the long arm module must always kept not to come into contact with sur rounding obstacles. Furthermore, in order to support the long arm module, an output from a joint driving section is wasted. Therefore, the output cannot be efficiently converted into power required for an end effector (e.g. hand unit) attached to the distal end of the arm module.

In contrast to this, the latter apparatus (2) can not only contribute to a reduction in the cost of the apparatus itself, but also cope with a change of operation target. In addition, the apparatus can contribute to the facilitation of maintenance.

As modules incorporated in the above-described "module type manipulator", a rotation joint module (disclosed in Japanese Patent Application 62-282886) and a link type arm module (disclosed in Published Examined Japanese Patent Application No. 63-50155) are known. By coupling and combining a plurality of modules of these types through mounting portions, a manipulator main body capable of performing a desired operation is provided.

The following problems, however, are also posed in the module type manipulator apparatus described above. In order to cause a manipulator main body to perform some operation after it is assembled by combining a plurality of modules, specialized software for driving/controlling the manipulator main body must be created. In creation of the software, the degree-of-free-direction (i.e., the degree of freedom of mobility and combination) of each joint module and the connecting direction and the length of each arm module need to be known in advance. If, however, the number and degree-of-free directions of joint modules are changed or arm modules having different lengths are combined in different directions every time the operation contents are changed, it often takes unexpectedly long time to confirm the degree-of-free-direction of each joint module and the length and direction of each arm module in an assembly site. In addition, after the confirmation, a series of operations (e.g., program creation, debugging, and testing) for the development of specialized software must be performed from the beginning. Therefore, it takes much labor and time to cause the manipulator apparatus to start a desired operation.

In order to eliminate such inconveniences, the apparatus may include an identification signal generator for outputting a signal corresponding to the degree-of-free direction of each joint module so that the degree of free direction of each joint module can be detected on the basis of an output from the signal generator. In spite of such improvement, whenever the length or direction of an arm module is changed in accordance with a change in working range, the size of the arm module must be measured again. It is, therefore, apparent that customization of software is difficult to realize.

As described above, the conventional module type manipulator apparatus requires much labor and time to update (e.g. reprograming for customizing) and change a program for driving/controlling the manipulator in accordance with a change in working range, thus imposing a heavy load on an operator.

SUMMARY OF THE INVENTION

It is an object of the present invention to provide a manipulator apparatus which can eliminate the above inconveniences, has high maintainability, and can contribute to the widening of the application range.

In order to achieve the above object, according to the present invention, there is provided an apparatus having the following arrangement. In order to allow selection of a desired degree of freedom of the overall arrangement of the apparatus, a manipulator main body is constituted by a combination of a plurality of joint modules and a plurality of arm modules, combined at mounting portions. In addition, (1): At least one of the plurality of arm modules has a shape changing section capable of arbitrarily setting the length or bending angle of the arm module itself, and the apparatus further comprises a measurement signal generating section for generating a measurement signal corresponding to the set length or bending angle.

(2): The apparatus comprises an identification signal generating section for outputting identification signals indicating the degree-of-free-direction of each joint module (i.e., a rotation axis identification signal (indicating a specific axis, of the X-, Y-, and Z-axes on a given coordinate system, about which each joint module is rotated) and a connection order identification signal (indicating the specific ordinal number of each joint module in relation to the order of connection of the respective joint modules of the manipulator main body).

(3): The apparatus further comprises a signal processing unit for customizing software for driving/controlling the manipulator main body on the basis of an output from the measurement signal generating section or the identification signal generating section.

(Function)

In the manipulator apparatus of the present invention, at least one of the plurality of arm module has a shape changing section capable of arbitrarily setting the length or bending angle of the arm module itself, and the measurement signal generating section is arranged to output a signal corresponding to the set length or bending angle. With this arrangement, even after the manipulator main body is assembled, its working range can be greatly changed by changing the shape of the arm module. In this case, the length or bending angle of the arm module can be accurately detected on the basis of an output from the measurement signal generating section. Therefore, when, for example, an "arm module shape changing operation" is performed, the software for driving/controlling the manipulator main body can be customized on the basis of information before the change and an output from the measurement signal generating section.

In addition, when a manipulator is assembled or reassembled by using a plurality of joint module and arm module according to an change of waking schedule, since a given joint module can be used as a rotation joint which is rotated about an arbitrary axis (e.g., the X-axis, the Y-axis, or the Z-axis on a coordinate system) by only selecting the types of mounting modules, assembly of the manipulator main body is facilitated. Furthermore, since the apparatus includes the identification signal generating section for outputting an identification signal indicating the degree-of-free-direction of each joint module, and an identification signal indicating the ordinal number of each joint module in relation to the connection of order of the respective joint modules, the software can be updated on the basis of an output from the identification signal generating section. That is, the conventional procedure of software creation (e.g., programming, compiling, linking, and testing) which are manually performed in a working site can be omitted. Instead of such a conventional procedure, the software (e.g., software for the relationship between the positions of each joint module and the hand module, soft-ware for the relationship between the speeds of each joint module and the hand module, and software for the relationship between the forces of each joint module and the hand portion) can be customized in accordance with an arbitrary arrangement selected in the working site.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing the overall manipulator main body of a manipulator apparatus according to the first embodiment of the present invention;

FIG. 2 is an equivalent diagram of the manipulator main body;

FIGS. 3(a) to 3(e) show a joint module constituting the manipulator main body, in which FIG. 3(a) is a front view of the joint module, FIG. 3(b) is a top view of the joint module, FIG. 3(c) is a left side view of the joint module, FIG. 3(d) is a right side view of the joint module, and FIG. 3(e) is a bottom view of the joint module;

FIGS. 4(a) to 4(c) are perspective views showing three examples of changing of the degree-of-freedom direction of the joint module;

FIG. 8 is a circuit diagram showing a means for extracting information from each identification signal generator;

FIGS. 9(a) to 9(c) are perspective views showing three types of extension arm modules;

FIG. 12 is an enlarged perspective view showing a joint module constituting the manipulator main body of a manipulator apparatus according to the second embodiment of the present invention;

FIGS. 13(a) and 13(b) are views for explaining the arrangement of an identification signal generator mounted in the joint module;

FIG. 15 is an enlarged perspective view showing one modification of the joint module constituting the manipulator main body according to either of the previous embodiments of the present invention;

FIGS. 19(a) to 19(c) are perspective views showing three types of extension arm modules used to form the manipulator main body by combining the joint modules;

FIG. 20 is a view for explaining part of an operation associated with each identification signal generator in the manipulator main body constituted by a combination of the joint modules and the extension arm modules;

FIG. 21 is a view for explaining the remaining part of the operation associated with each identification signal generator in FIG. 20;

FIG. 26 is a circuit diagram showing a state of connection between the identification signal generator mounted in each joint module and a signal processing system;

FIG. 29 is a perspective view showing a Z-axis extension arm module used to form the manipulator main body by combining the joint modules;

FIG. 33 is a circuit diagram showing a state of connection between the identification signal generator mounted in each joint module and a signal processing system;

FIG. 35 is a perspective view showing a connector mounted in the joint module in FIG. 34;

FIG. 36 is a connection diagram of an identification signal generator mounted in the joint module;

FIG. 37 is a connection diagram of part of a wiring system arranged in the joint module in FIG. 36;

FIG. 45 is an equivalent diagram of the manipulator main body;

FIG. 47 is a circuit diagram showing an identification signal generator mounted in the joint module;

FIG. 48 is a perspective view showing a base of the manipulator main body;

FIG. 49 is a perspective view showing an X-axis extension arm module incorporated in the manipulator main body;

FIG. 50 is a circuit diagram showing a measurement signal generator incorporated in the X-axis extension arm module;

FIG. 52 is an enlarged sectional view of a portion for adjusting the length of the Z-axis extension arm module;

FIG. 53 is a circuit diagram showing a measurement signal generator mounted in the Z-axis extension arm module;

FIG. 55 is a view showing the remaining part of the connection relationship in FIG. 54;

FIG. 56 is a view for explaining the principle of measurement of the length and direction of each arm module;

FIG. 57 is a partially cutaway perspective view showing a modification of the Z-axis extension arm module;

FIG. 65 is a side view for explaining another type of block type arm module unit.

Figure 3B:
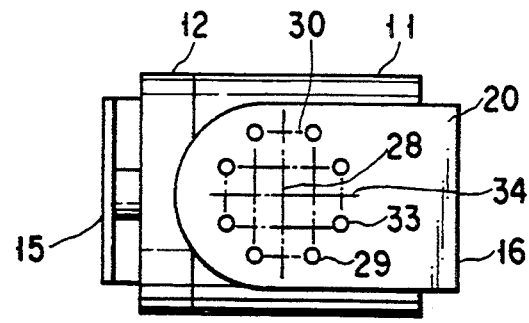

DETAILED DESCRIPTION OF THE PREFERRED EMBODIMENTS (First Embodiment)

A manipulator main body 1 according to the first embodiment of the present invention shown in FIG. 1 is designed such that six joint portions 3a to 3f formed as modules are connected in series on a base 2, and an effector unit 4 equivalent to a hand portion is attached to the joint portion 3f located at the farthest end of the joint portion assembly. The joint portions 3a to 3f are connected to each other to have a degree of freedom in the directions indicated by an equivalent diagram in FIG. 2 on the rectangular coordinate system shown in FIG. 1.

Figures 3A, 3C, 3D:
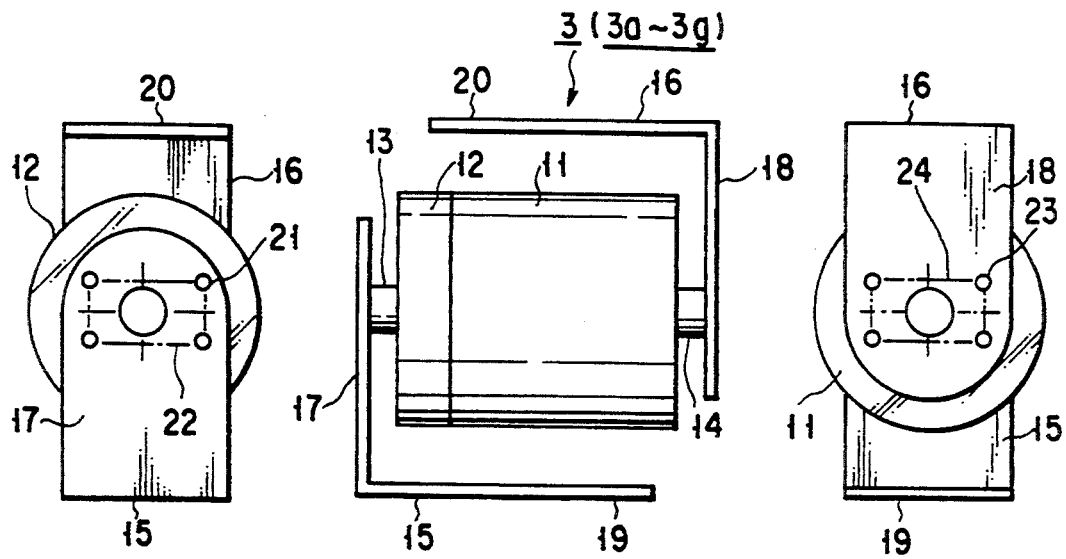

In this embodiment, the joint portions 3a to 3f are formed to have the same size. The detailed arrangement of each joint portion is shown in FIG. 3(a). More specifically, each of the joint portions 3a to 3f comprises: a motor portion 11 including a reduction gear unit; a feedback unit 12 coaxially and directly connected to the motor portion 11; a fixed shaft 13 extending from the feedback unit 12 outward to be coaxial with the rotation axis of the motor portion 11; a rotating shaft 14 extending from the motor portion 11 outward to be coaxial with the rotation axis of the motor portion 11; an L-shaped coupling member 15 having one end fixed to the fixed shaft 13 and the other end extending in a direction perpendicular to the rotation axis and subsequently extending parallel to the rotation axis along the outer surfaces of the feedback unit 12 and the motor portion 11; and an L-shaped coupling member 16 having one end fixed to the rotating shaft 14 and the other end extending in a direction perpendicular to the rotation axis and subsequently extending parallel to the rotation axis along the outer surfaces of the motor portion 11 and the feedback unit 12. By operating the motor portion 11 and the feedback unit 12 through a power supply cable (not shown) and a signal line (not shown), the coupling members 15 and 16 can be rotated about the rotation axis of the motor portion 11.

Figure 3E:
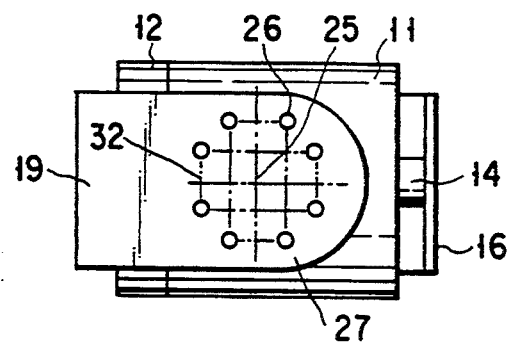

Three types of mounting portions having bolt insertion holes (to be described next) are formed on portions 17 and 18, of the coupling members 15 and 16, which are perpendicular to the rotation axis, and on portions 19 and 20, of the coupling members 15 and 16, which are parallel to the rotation axis. More specifically, as shown in FIG. 3(c), four mounting holes 21 are formed in the portion 17 of the coupling member 15 at the vertex positions of a rectangle drawn on the portion 17 to have a center coinciding with the rotation axis and long sides extending in a direction perpendicular to the extending direction of the portion 17. These four mounting holes 21 constitute a first mounting portion 22. Similarly, as shown in FIG. 3(d), four mounting holes 23 are formed in the portion 18 of the coupling member 16 at the vertex positions of a rectangle drawn on the portion 18 to have a center coinciding with the rotation axis and long sides extending in a direction perpendicular to the extending direction of the portion 18. These four mounting holes 23 constitute a second mounting portion 24 corresponding to the first mounting portion 22. As shown in FIG. 3(e), four mounting holes 26 are formed in the portion 19 of the coupling member 15 at the vertex positions of a rectangle drawn on the portion 19 to have a center coinciding with a central position 25 in the widthwise direction of the portion 19 and long sides crossing the rotation axis at right angles. These four mounting holes 26 constitute a third mounting portion 27. In addition, as shown in FIG. 3(b), four mounting holes 29 are formed in the portion 20 of the coupling member 16 at the vertex positions of a rectangle drawn on the portion 20 to have a center coinciding with a central position 28 in the widthwise direction of the portion 20, and long sides crossing the rotation axis at right angles. The positions 25 and 28 are located at the same distance from the outer surface of the portion 18. These four mounting holes 29 constitute a fourth mounting portion 30 corresponding to the third mounting portion 27. Furthermore, as shown in FIG. 3(e), four mounting holes 31 are formed in the portion 19 of the coupling member 15 at the vertex positions of a rectangle drawn on the portion 19 to have a center coinciding with the position 25 and long sides extending parallel to the rotation axis. These four mounting holes 31 constitute a fifth mounting portion 32. Moreover, as shown in FIG. 3(b), four mounting holes 33 are formed in the portion 20 of the coupling member 16 at the vertex positions of a rectangle drawn on the portion 20 to have a center coinciding with the position 28 and long sides extending parallel to the rotation axis. These four mounting holes 33 constitute a sixth mounting portion 34 corresponding to the fifth mounting portion 32. In this case, the rectangles defining the distances between the four mounting holes constituting each of the first and sixth mounting portions 22, 24, 27, 30, 32, and 34 have the same length and width.

When the joint portions 3a to 3f each having the above-described arrangement are to be actually assembled, they are differently mounted depending on rotational directions. If, for example, rotation about the X-axis on the rectangular coordinate system shown in FIG. 4 is to be realized, the third and fourth mounting portions 27 and 30 are selected, as shown in FIG. 4(a). If rotation about the Y-axis is to be realized, the fifth and sixth mounting portions 32 and 34 are selected, as shown in FIG. 4(b). In addition, for rotation about the Z-axis, the first and second mounting portions 22 and 24 are selected, as shown in FIG. 4(c).

Since each of the joint portions 3a to 3f has the above arrangement, even if they have different outputs, they can be connected to each other in any order to constitute a manipulator main body. In addition, even after a manipulator main body is constituted by the joint portions, the degree-of-freedom arrangement can be changed by changing the connection order of the joint portions. Each joint portion can be separately carried to a working site, and a manipulator main body can be assembled at the site. Furthermore, when operation contents are determined, a manipulator main body can be assembled upon selecting a degree-of-freedom arrangement suited for the operation contents. Therefore, the performance of each joint portion of the manipulator main body can be efficiently transmitted, as speed and power, to the effector unit. Even if the operation contents are changed, the manipulator main body can be easily rearranged to have a degree-of-freedom arrangement suited for the new operation contents.

In this manner, one joint portion can be used as both a rotation joint and a flexion joint. The manipulator main body 1 is constituted by a combination of six joint portions 3a to 3f, each of which is designed such that when it serves as a flexion joint, its bending direction can be selected from two orthogonal directions.

Figure 5:
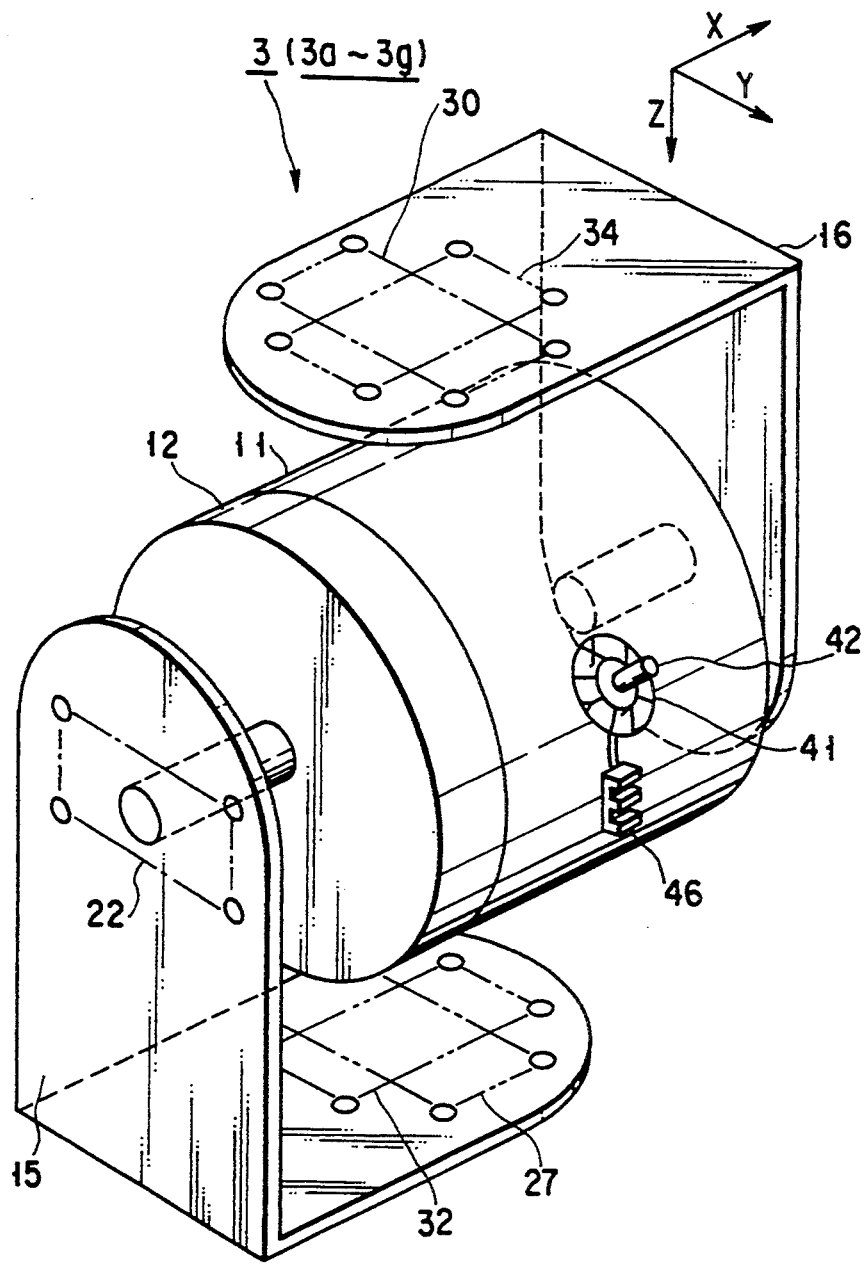
FIG. 5 is an enlarged perspective view of the joint module.

Each of the six joint portions 3a to 3f assembled into the manipulator main body 1 has an identification signal generator for outputting an identification signal indicating the degree-of-freedom direction of the joint portion. In this embodiment, as shown in FIG. 5, each identification signal generator is constituted by a switch unit 41 as a main part, which is attached to the outer surface of the motor portion 11.

Figure 6:
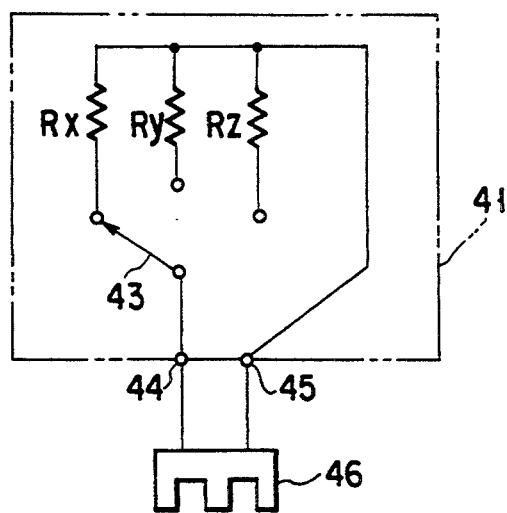
FIG. 6 is a circuit diagram showing an identification signal generator mounted in the joint module.

When a knob 42 of the switch unit 41 is operated to set the pointer to a mark "X", a movable contact 43 moves to set a resistance Rx between output terminals 44 and 45, as shown in FIG. 6. When the pointer is set to a mark "Y", a resistance Ry is set. When the pointer is set to a mark "Z", a resistance Rz is set. In addition, the output terminals 44 and 45 are connected to a two-pin type connector 46.

As described above, in the embodiment, by operating the knob 42 of the switch unit 41 arranged on each of the joint portions 3a to 3f constituting the manipulator main body 1 in an assembly process, an identification signal indicating whether the corresponding joint portion serves as a joint which rotates about the X-, Y-, or Z-axis on a given rectangular coordinate system can be output in the form of a resistance.

Figure 7:
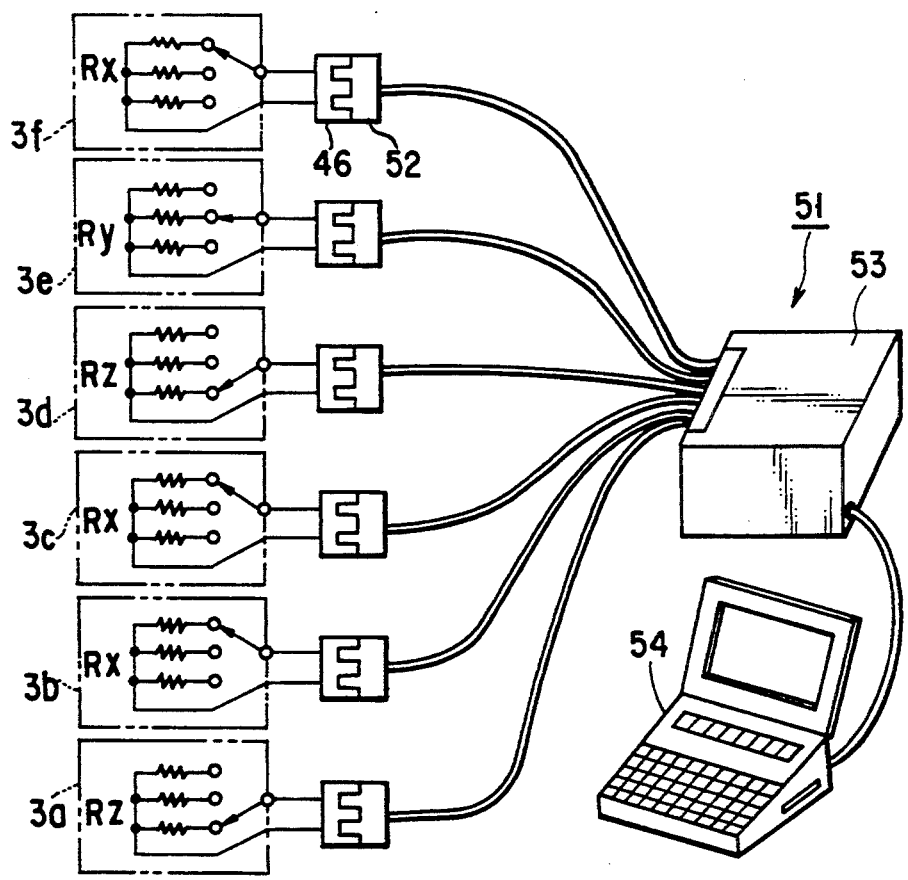
FIG. 7 is a view showing a state of connection between the identification signal generator mounted in each joint module and a signal processing system.

This identification signal is supplied to a signal processing system 51 shown in FIG. 7 upon completion of an assembly process for changing the degree of freedom of the manipulator main body 1.

In the signal processing system 51, connectors 52 are respectively connected to connectors 46, and resistances in the respective joint portions are measured by a measuring unit 53 through the connectors 52.

In the manipulator main body 1 shown in FIG. 1, the resistance Rz is measured in the joint portion 3a; the resistance Rx, in the joint portion 3b; the resistance Rx, in the joint portion 3c, the resistance Rz, in the joint portion 3d, the resistance Ry, in the joint portion 3e; and the resistance Rx, in the joint portion 3f. Measurement of each resistance is performed by measuring a voltage V0 across a reference resistance R0 connected in series with a measurement line, while a reference voltage Vi is applied across the measurement line, as shown in FIG. 8. With this measurement, the joint portions 3a to 3f are sequentially determined as joint portions serving as a Z-axis rotation joint, an X-axis rotation joint, an X-axis rotation joint, a Z-axis rotation joint, a Y-axis rotation joint, and an X-axis rotation joint.

The obtained axis rotation information is sent from the measuring unit 53 to an information processing unit 54 to be processed. In the case shown in FIG. 7, since resistance measurement cords extend from the measuring unit 53 in one-to-one correspondence with the connectors 46 on the respective joint portions, the ordinal number of a joint portion from which a signal is input can be discriminated. Assume that only one resistance measurement cord is used. In this case, if, for example, the operator inputs a joint portion number through a keyboard attached to the measuring unit 53 every time he/she connects the resistance measurement cord to the connector 46 of one of the joint portions, the ordinal number of the joint portion from which a signal is input can be known.

Assume that, in the manipulator apparatus having the above-described arrangement, each joint portion of a specific ordinal number is determined as a joint portion serving as a joint which rotates about a specific axis on a give rectangular coordinate system. A method of using the information obtained in this case will be described in detail below.

As a program required to drive/control the manipulator apparatus, consider a program of coordinate conversion from the angle of each joint portion into the position/posture of the hand portion.

As a program required to drive/control the manipulator apparatus, coordinate conversion from the angle of each joint portion into the position/posture of the hand portion is performed through the following procedure.

(1) Coordinate conversion in rotation joint portion

If a coordinate system which is rotated about the X-axis of a coordinate system (i) through an angle Θ is represented as a coordinate system (i−1), the relationship between an expression [x(i), y(i), z(i)]T in the coordinate system (i) and an expression [x(i−1), y(i−1), z(i−1)]T in the coordinate system (i−1) can be represented as follows:

[Math 1]

$$\begin{bmatrix} x(i) \\ y(i) \\ z(i) \end{bmatrix} = \begin{bmatrix} 1, & 0, & 0 \\ 0, & \cos\theta, & -\sin\theta \\ 0, & \sin\theta, & -\sin\theta \end{bmatrix} \begin{bmatrix} x(i-1) \\ y(i-1) \\ z(i-1) \end{bmatrix} =$$

$$Ci - 1, i \begin{bmatrix} x(i-1) \\ y(i-1) \\ z(i-1) \end{bmatrix}$$

In this case, "Ci−1, i" is a 3×3 matrix of coordinate conversion by an X-axis rotation joint portion, and is called an "X-axis rotation C matrix".

Similarly, if a coordinate system which is rotated about the Y-axis of the coordinate system (i) through the angle Θ is represented as a coordinate system (i−1), the relationship between an expression [x(i), y(i), z(i)]T in the coordinate system (i) and an expression [x(i−1), y(i−1), z(i−1)]T in the coordinate system (i−1) can be represented as follows:

[Math 2]

$$\begin{bmatrix} x(i) \\ y(i) \\ z(i) \end{bmatrix} = \begin{bmatrix} \cos\theta, & 0, & \sin\theta \\ 0, & 1, & 0 \\ -\sin\theta, & 0, & \cos\theta \end{bmatrix} \begin{bmatrix} x(i-1) \\ y(i-1) \\ z(i-1) \end{bmatrix} =$$

$$Ci - 1, i \begin{bmatrix} x(i-1) \\ y(i-1) \\ z(i-1) \end{bmatrix}$$

In this case, "Ci−1, i" is a 3×3 matrix of coordinate conversion by a Y-axis rotation joint portion, and is called a "Y-axis rotation C matrix".

Similarly, if a coordinate system which is rotated about the Z-axis of the coordinate system (i) through the angle Θ is represented as a coordinate system (i−1), the relationship between an expression [x(i), y(i), z(i)]T in the coordinate system (i) and an expression x(i−1), y(i−1), z(i−1)]T in the coordinate system (i−1) can be represented as follows:

[Math 3]

$$\begin{bmatrix} x(i) \\ y(i) \\ z(i) \end{bmatrix} = \begin{bmatrix} \cos\theta, & \sin\theta, & 0 \\ \sin\theta, & \cos\theta, & 0 \\ 0, & 0, & 1 \end{bmatrix} \begin{bmatrix} x(i-1) \\ y(i-1) \\ z(i-1) \end{bmatrix} =$$

$$Ci - 1, i \begin{bmatrix} x(i-1) \\ y(i-1) \\ z(i-1) \end{bmatrix}$$

In this case, "Ci−1, i" is a 3×3 matrix of coordinate conversion by a Z-axis rotation joint portion, and is called a "Z-axis rotation C matrix".

(2) Synthesis of coordinate conversion

Synthesis of coordinate conversion is expressed by using the above recurrence formulae as follows:

[Math 4]

$$\begin{bmatrix} x(0) \\ y(0) \\ z(0) \end{bmatrix} = C01 \begin{bmatrix} x(1) \\ y(1) \\ z(1) \end{bmatrix} = C01C12 \begin{bmatrix} x(2) \\ y(2) \\ z(2) \end{bmatrix} \quad (1)$$

$$= C01 \ldots Ci-1, i \begin{bmatrix} x(i) \\ y(i) \\ z(i) \end{bmatrix}$$

$$= Ai \begin{bmatrix} x(i) \\ y(i) \\ z(i) \end{bmatrix} = \begin{bmatrix} Ai(00), Ai(01), Ai(02) \\ Ai(10), Ai(11), Ai(12) \\ Ai(20), Ai(21), Ai(22) \end{bmatrix} \begin{bmatrix} x(i) \\ y(i) \\ z(i) \end{bmatrix}$$

In this case, a matrix Ai is a 3×3 synthesis conversion matrix for expressing a vector, expressed by a joint coordinate system (i), by using a base coordinate system (0), and is called an "A matrix".

In this manner, a vector expressed by a given joint coordinate system (i) can be coordinate-converted into a vector expressed by the base coordinate system (0) by detecting the number of joint portions between the base coordinate system and the target joint portion, discriminating each joint portion as a rotation joint which rotates about a specific axis, and sequentially multiplying the C matrixes corresponding to the respective rotation joints to obtain the A matrix.

(3) Calculation of position

A vector Li representing an arm between joint portions is expressed as follows regardless of the posture of the manipulator apparatus, provided that the arm is present in the negative direction on the Z-axis of the joint coordinate system (i):

[Math 5]

$$Li(i) = \begin{bmatrix} 0 \\ 0 \\ -Li \end{bmatrix}$$

When the manipulator apparatus is set in a certain posture, a vector representing each arm is converted from an expression by the joint coordinate system (i) into an expression by the base coordinate system (0) by using the above A matrix.

[Math 6]

$$Li(0) = AiLi(i) = Ai \begin{bmatrix} 0 \\ 0 \\ -Li \end{bmatrix}$$

$$= \begin{bmatrix} Ai(00), Ai(01), Ai(02) \\ Ai(10), Ai(11), Ai(12) \\ Ai(20), Ai(21), Ai(22) \end{bmatrix} \begin{bmatrix} 0 \\ 0 \\ -Li \end{bmatrix} = -Li \begin{bmatrix} Ai(02) \\ Ai(12) \\ Ai(22) \end{bmatrix}$$

A position coordinate value Pi of each joint portion which is expressed by the base coordinate system (0) is equivalent to a value obtained by adding all the arm vectors expressed by the base coordinate system and corresponding to a portion from the base to a joint portion immediately before the target joint portion.

[Math 7]

$$Pi(0) = L0(0) + L1(0) + \ldots + Li-1(0) =$$

$$-L0 \begin{bmatrix} A0(02) \\ A0(12) \\ A0(22) \end{bmatrix} - L1 \begin{bmatrix} A1(02) \\ A1(12) \\ A1(22) \end{bmatrix} - \ldots - Ln-1 \begin{bmatrix} Ai-1(02) \\ Ai-1(12) \\ Ai-1(22) \end{bmatrix}$$

Especially, the position coordinate value of the distal end which is expressed by the base coordinate system (0) is equivalent to a value obtained by adding all the arm vectors expressed by the base coordinate system.

[Math 8]

$$Pn(0) = L0(0) + L1(0) + \ldots + Ln(0) = \quad (2)$$

$$-L0 \begin{bmatrix} A0(02) \\ A0(12) \\ A0(22) \end{bmatrix} - L1 \begin{bmatrix} A1(02) \\ A1(12) \\ A1(22) \end{bmatrix} - \ldots - Ln \begin{bmatrix} An(02) \\ An(12) \\ An(22) \end{bmatrix}$$

According to equation (1), the elements of matrix A are described by using A0(02), A0(12), A0(22)..., An(02), An(12), An(22). The A matrix is obtained by sequential n times multiplying of the three types of C matrixes (i.e. corresponding to X-axis, Y-axis and Z-axis ratation of those C matrixes).

Those multiplyings are performed by using the signals corresponding the relation between the respective joints and each axis.

In the drive/control software, equation (2) is programmed as a calculation for obtaining the position/posture of the hand portion from the angle of each joint portion. If the values L0, L1, ..., Ln in equation (2) are replaced with measured signals, the calculation for obtaining the position/posture of the hand portion from the angle of each joint portion can be rewritten.

Software capable of responding to a change in degree-of-free-arrangement is prepared for the information processing unit 54 so as to customize the software used to drive/control the manipulator main body. In practice, the software is automatically changed to a program for performing desired operation control by updating the parameters of subroutines constituting the software.

In this manner, the manipulator main body 1 is constituted by a combination of the joint portions 3a to 3f each having a plurality of types of mounting portions, i.e., the first to sixth mounting portions 22, 24, 27, 30, 32, and 34, which allow selection of an overall degree-of-free-arrangement. Therefore, by only selecting the types of mounting portions, one joint portion can be used as a flexion joint which rotates about the X-axis in a given coordinate system, a flexion joint which rotates about the Y-axis, or a rotation joint which rotates about the Z-axis, thereby facilitating assembly. In addition, since each of the joint portions 3a to 3f includes the identification signal generator for outputting an identification signal indicating the degree-of-freedom direction of each joint portion in a given coordinate system, information required to update the software used for driving/controlling the manipulator apparatus can be obtained from an output from each identification signal generator. That is, the software can be customized by using the signal processing system 51, thereby omitting the conventional procedure for developing software, which is manually performed in a working site, e.g., program editing for each operation, and subsequent compiling and linking operations. In addition, in accordance with a degree-of-freedom arrangement selected in a working site, the software for the relationship between the positions of each joint portion and the hand portion, the software for the relationship between the speeds of each joint portion and the hand portion, and the software for the relationship between the forces of each joint portion and the hand portion can be easily updated.

In the above-described embodiment, the manipulator main body 1 is constituted by combining only a plurality of joint portion modules. However, a manipulator main body must often be formed by inserting arms between joint portions. For such a case, an X-axis extension arm 61, a Y-axis extension arm 62, and a Z-axis extension arm 63 are prepared, as respectively shown in FIGS. 9(a) to 9(c). Mounting holes 64 are formed in one end portion of the X-axis extension arm 61 to have the same arrangement of the mounting holes constituting the first mounting portion 22, thus forming one mounting portion 65. Mounting holes 66 are formed in the other portion of the arm 61 to have the same arrangement of the mounting holes constituting the second mounting portion 24, thus forming the other mounting portion 67. Similarly, holes 68 are formed in one end portion of the Y-axis extension arm 62 in an arranging direction different from that of the mounting holes constituting the first mounting portion 22 by 90°, thus forming one mounting portion 69. Mounting holes 70 are formed in the other end portion of the arm 62 in an arranging direction different from that of the mounting holes constituting the second mounting portion 24 by 90°, thus forming the other mounting portion 71. In addition, mounting holes 72 and 74 are respectively formed in the two end portions of the Z-axis extension arm 63 to have the same arrangements as those of the mounting holes constituting the first and second mounting portions 22 and 24, thus forming mounting portions 73 and 75.

(Second Embodiment)

Figure 10:
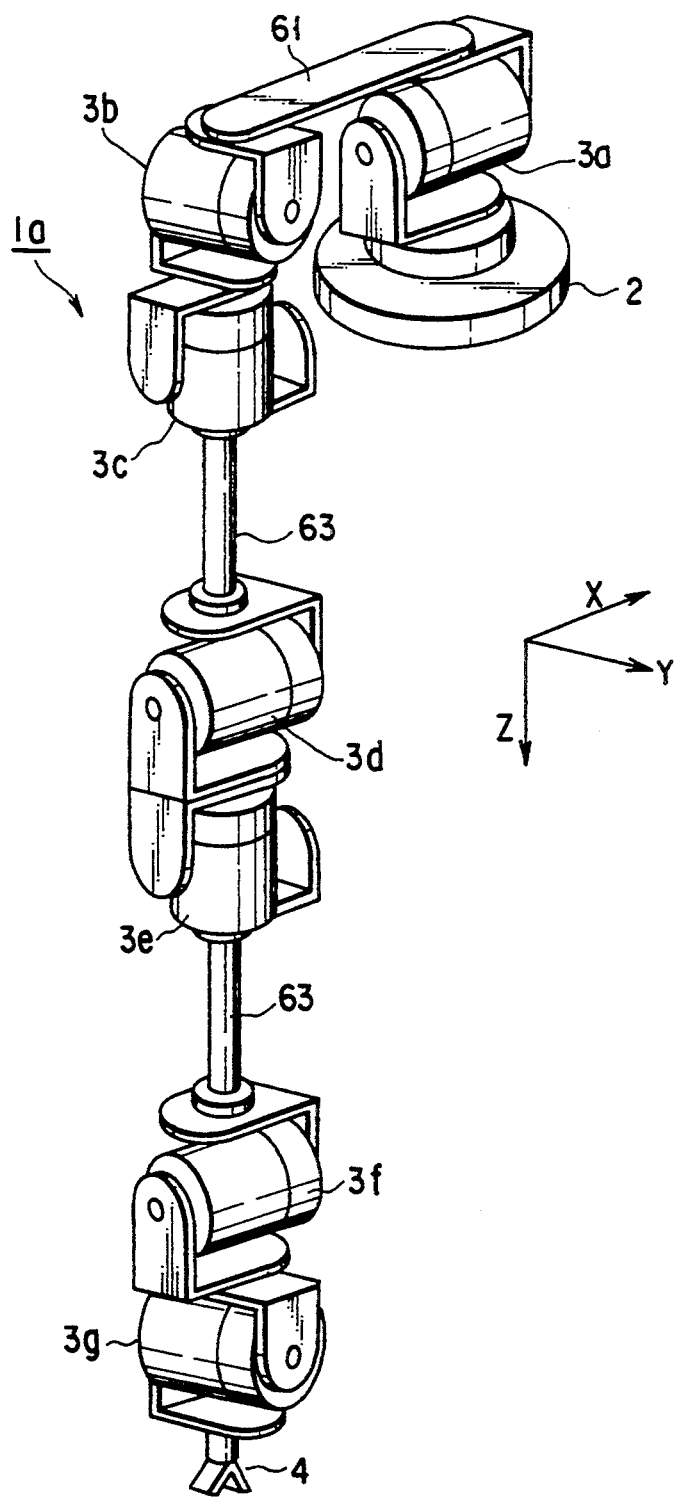
FIG. 10 is a perspective view showing an overall manipulator main body constituted by a combination of extension arm modules and joint modules according to the second embodiment of the present invention.
Figure 11:
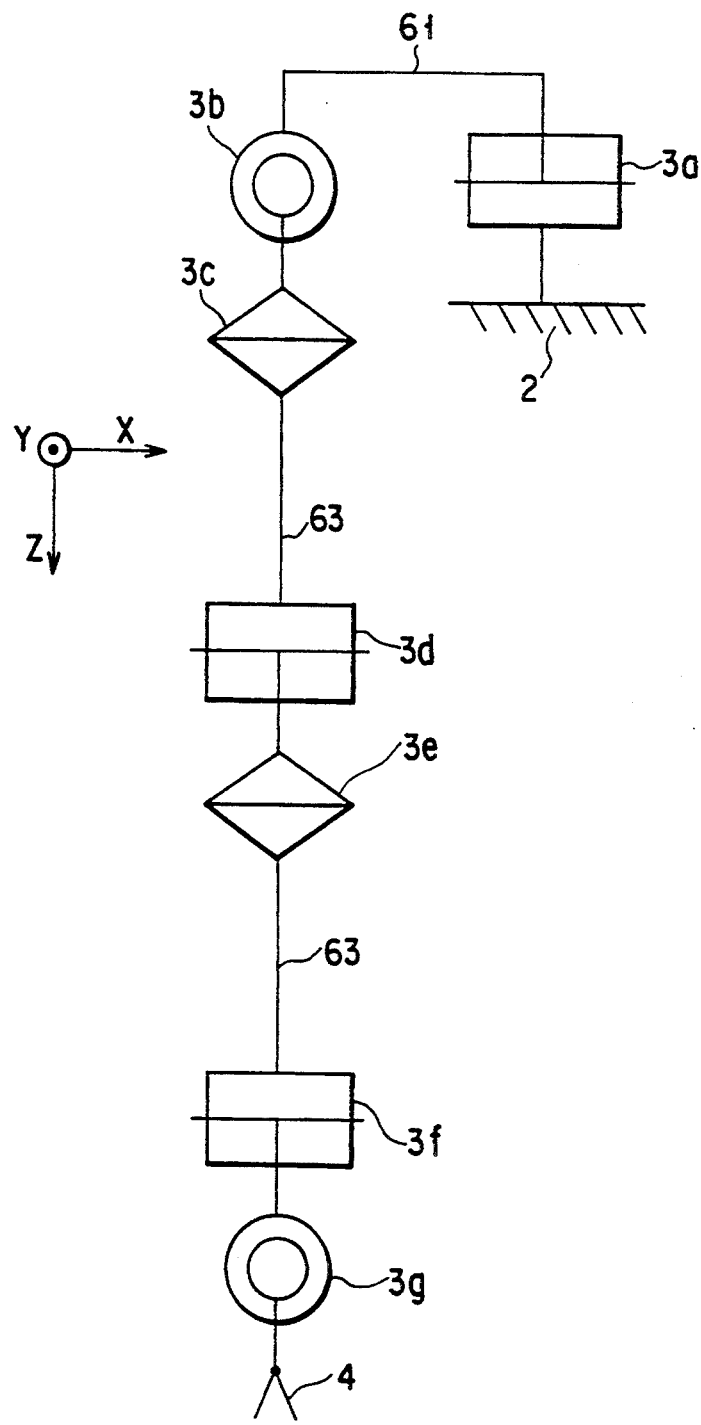
FIG. 11 is an equivalent diagram of the manipulator main body.

FIG. 10 shows the second embodiment of the manipulator main body constituted by a combination of the above-described arms and seven join portions 3a to 3f formed as modules. FIG. 11 is an equivalent diagram of a manipulator main body 1a, showing the degree-of-freedom direction of each joint portion. Similar to the first embodiment, in this embodiment, each of the join portions 3a to 3f includes a switch unit for outputting an identification signal indicating the degree-of-freedom direction of each joint portion in a given coordinate system. Since the length of each arm is known, the same effects as those of the first embodiment can be obtained.

FIG. 12 shows the arrangement of each joint portion 3 constituting the manipulator main body of the manipulator apparatus according to the second embodiment. In this case, the main body portion of the joint portion 3 has the same arrangement as that of the joint portion in the first embodiment. The difference between these joint portions is that the joint portion of the second embodiment uses a gravity switch as an identification signal generator for generating an identification signal indicating the degree-of-freedom direction of the joint portion.

As shown in FIGS. 13(a) and 13(b), a gravity switch 76 is constituted by a rectangular parallelepiped case 77 having a bottom and consisting of a metal material, an insulating member 78 mounted on the case 77 to cover its opening portion, a wire 79 having one end fixed to the insulating member 78 and the other end extending into the case 77 and having high lateral rigidity, and a metal contact member 80 fixed to the free end portion of the wire 79. The wire 79 and the case 77 are connected to a two-pin type connector 120 through leads. The gravity switch 76 having the above-described arrangement is fixed to the outer surface of a motor portion 11 such that the wire 79 becomes parallel to the rotation axis of the joint portion 3.

When, therefore, the joint portion 3 shown in FIG. 12 is used as a flexion joint which rotates about the X-or Y-axis in FIG. 13(a), the contact member 80 cantilevered by the wire 79 is brought into contact with the conductive case 77 due to the weight of the contact member 80. As a result, the two pins of the connector 120 are rendered conductive. If the joint portion 3 is used as a rotation joint which rotates about the Z-axis in FIG. 13(b), the contact member 80 is not brought into contact with the case 77, and the two pins of the connector 120 are kept nonconductive.

As is apparent from the above description, in this embodiment, when a manipulator main body is constituted by a combination of a plurality of joint portions 3, whether each joint portion operates as a flexion joint or a rotation joint can be indicated externally by the conduction state between the two pints of each connector 120.

Figure 14:
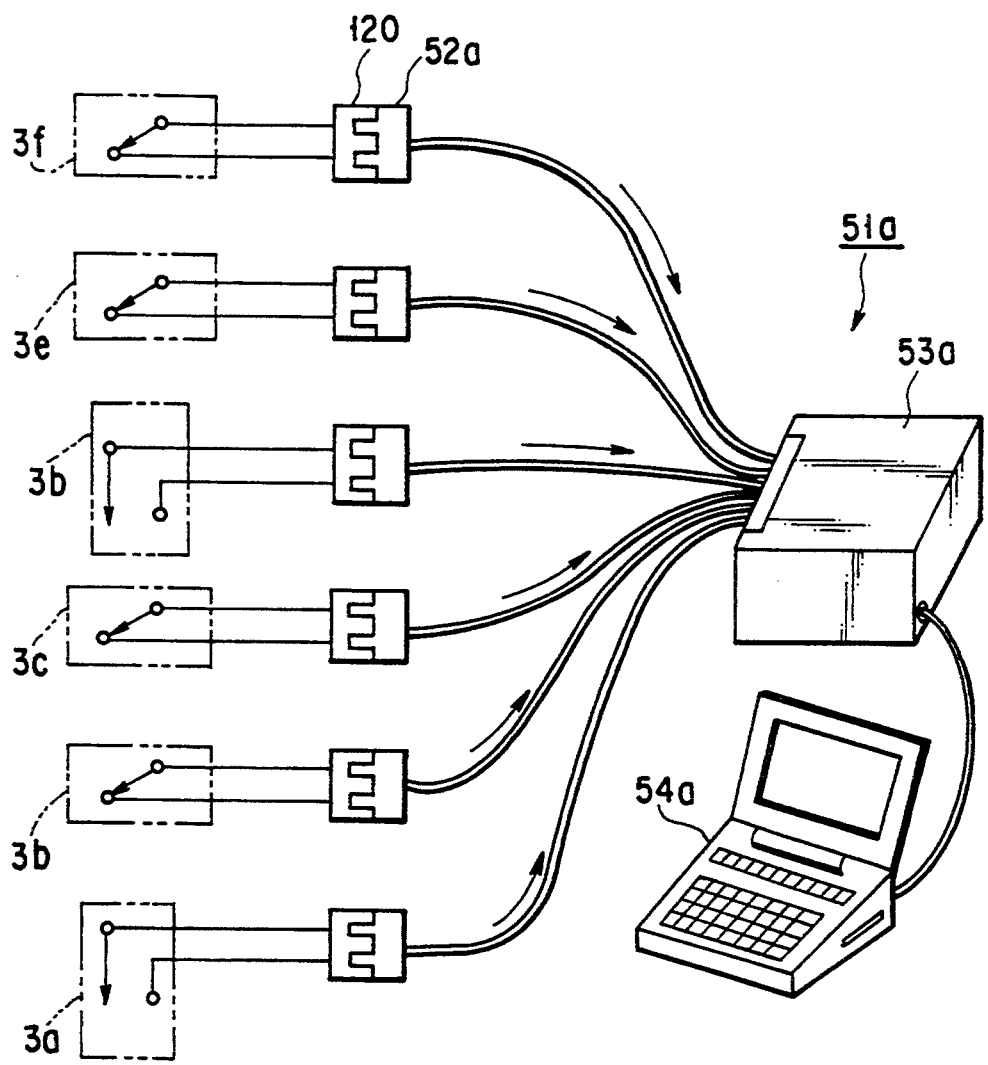
FIG. 14 is a view showing a state of connection between the identification signal generator mounted in each joint module and a signal processing system.

FIG. 14 shows a state wherein a manipulator main body is constituted by combining the six joint portions 3 each having the above-described gravity switch 76, as shown in FIG. 1, and updating of software is performed by loading information from each gravity switch 76 into a signal processing system 51a in accordance with a required control operation.

Information from each gravity switch 76 is loaded into a measuring unit 53a through a specialized connector 52a and a lead. In this case, upon measurement, a nonconductive state is determined for the joint portion 3a; a conductive state, for the joint portion 3b; a conductive state, for the joint portion 3c; a nonconductive state, for the joint portion 3d; a conductive state, for the joint portion 3e; and a conductive state, for the joint portion 3f. The join portions 3a to 3f are sequentially determined as a rotation joint, a flexion joint, a flexion joint, a rotation joint, a flexion joint, and a flexion joint. This information is sent to the information processing unit 54a to be used for software updating required for a driving/controlling operation.

The method in the first embodiment described above satisfies the conditions required for updating software used to drive/control the manipulator apparatus. Since the method in the first embodiment is based on information indicating whether each joint portion serves as a rotation joint or a flexion joint, although the required conditions are satisfied, the method cannot be used to customize the software. In order to obtain information for updating the software, it is at least required that information obtained by the method in the first embodiment does not conflict with that obtained by the method in the second embodiment. Therefore, safety can be doubly checked by using the second embodiment together with the first embodiment.

(First Modification)

FIG. 15 shows a modification of the joint portion 3 constituting the manipulator main body of the manipulator apparatus of the present invention. The main body portion of a joint portion 3 in this modification has the same arrangement as that of the joint portion in the previous embodiment. The difference between these joint portions is in an identification signal generator arranged in each joint portion 3 in the modification which generates an identification signal indicating the degree-of-freedom direction of the joint portion.

In the modification, when a manipulator main body is constituted by combining a plurality of joint portions 3, the identification signal generators of all the joint portion 3 automatically generate identification signals indicating specific axes on a given rectangular coordinate system about which the respective joint portions rotate.

Figure 16:
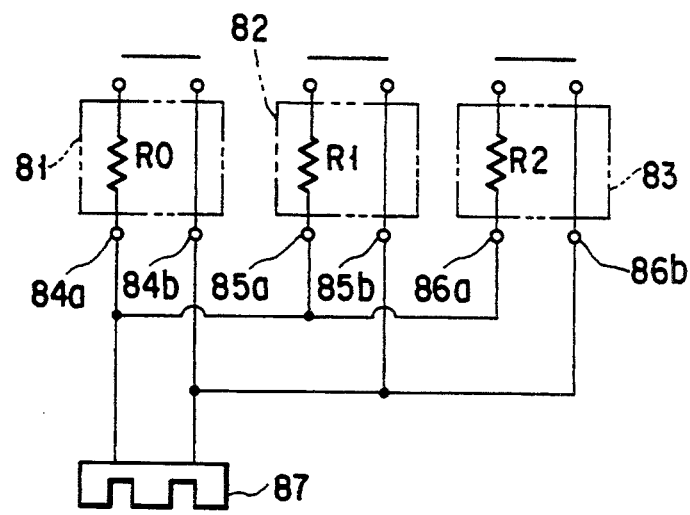
FIG. 16 is a circuit diagram showing an identification signal generator mounted in the joint module in FIG. 15.

In the modification, coupling members 15 and 16 are constituted by nonconductive members. A connector 81 is arranged on a portion 19, of the coupling member 15, which is parallel to the rotation axis of the joint portion 3, at a position on a short side, of a rectangle defining a third mounting portion 27, which is located on the positive side on the Y-axis in FIG. 15 with respect to the center of the rectangle in such a manner that the two pins of the connector 81 are exposed to the lower surface of the portion 12 in FIG. 15. A connector 82 is arranged on the portion 19 of the coupling member 15 at a position on a short side, of a rectangle defining a fifth mounting portion 32, which is located on the positive side on the X-axis in FIG. 15 with respect to the center of the rectangle in such a manner that the two pins of the connector 82 are exposed to the lower surface of the portion 19 in FIG. 15. A connector 83 is arranged on a portion 17, of the coupling member 15, which is perpendicular to the rotation axis, at a position on a short side, of a rectangle defining a first mounting portion 22, which is located on the positive side on the Y-axis in FIG. 15 with respect to the center of the rectangle in such a manner that the two pins of the connector 83 are exposed to the left outer surface of the portion 17 in FIG. 15. In each of the connectors 81, 82, and 83, resistors respectively having resistances R0, R1, and R2 are arranged, as shown in FIG. 16. More specifically, when the two pins of the connector 81 are short-circuited, the resistance between terminals 84a and 84b is set to be the resistance R0. When the two pins of the connector 82 are short-circuited, the resistance between terminals 85a and 85b is set to be the resistance R1. When the two pins of the connectors 83 are short-circuited, the resistance between terminals 86a and 86b is set to be the resistance R2. The terminals 84a, 84b, 85a, 85b, 86a, and 86b of the connectors 81, 82, and 83 are connected to a two-pin type connector 87 while the corresponding terminals are commonly connected to each other.

Figure 17:
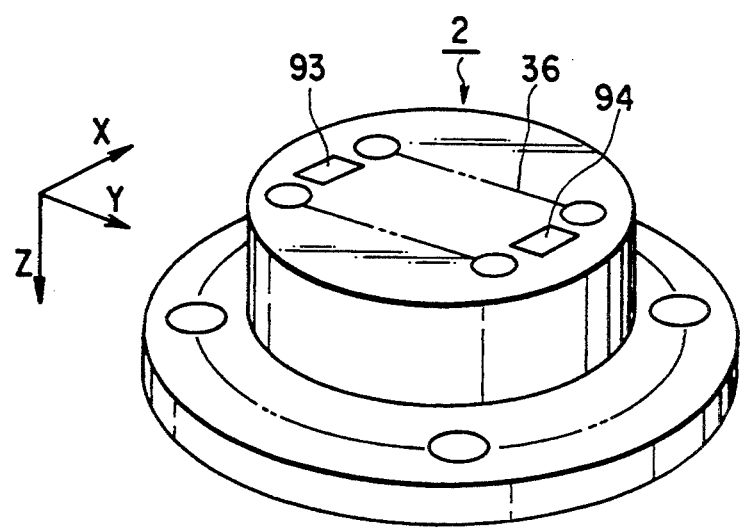
FIG. 17 is a perspective view showing a base of a manipulator main body using the joint module.

Conductors for short-circuiting the two pins of one of the connectors 81, 82, and 83 are formed on the coupling member 16 in correspondence with the degree-of-freedom direction of each joint portion coupled to the coupling portion of the coupling member 16. More specifically, conductors 89 and 90 are formed on a portion 20, of the coupling member 16, which is parallel to the rotation axis, at positions on the short sides, of a rectangle defining a fourth mounting portion 30, which are located on the positive and negative sides on the Y-axis in FIG. 15 with respect to the center of the rectangle. Conductors 91 and 92 are formed on a portion 18, of the coupling member 16, which is perpendicular to the rotation axis, at positions on the short sides, of a rectangle defining a second mounting portion 24, which are located at the positive and negative sides on the Y-axis in FIG. 15 with respect to the center of the rectangle. In addition, as shown in FIG. 17, conductors 93 and 94 are formed on a base 2 at positions on the short sides, of a rectangle defining a mounting portion 36, which are located on the positive and negative sides on the Y-axis in FIG. 17 with respect to the center of the rectangle.

Figure 18:
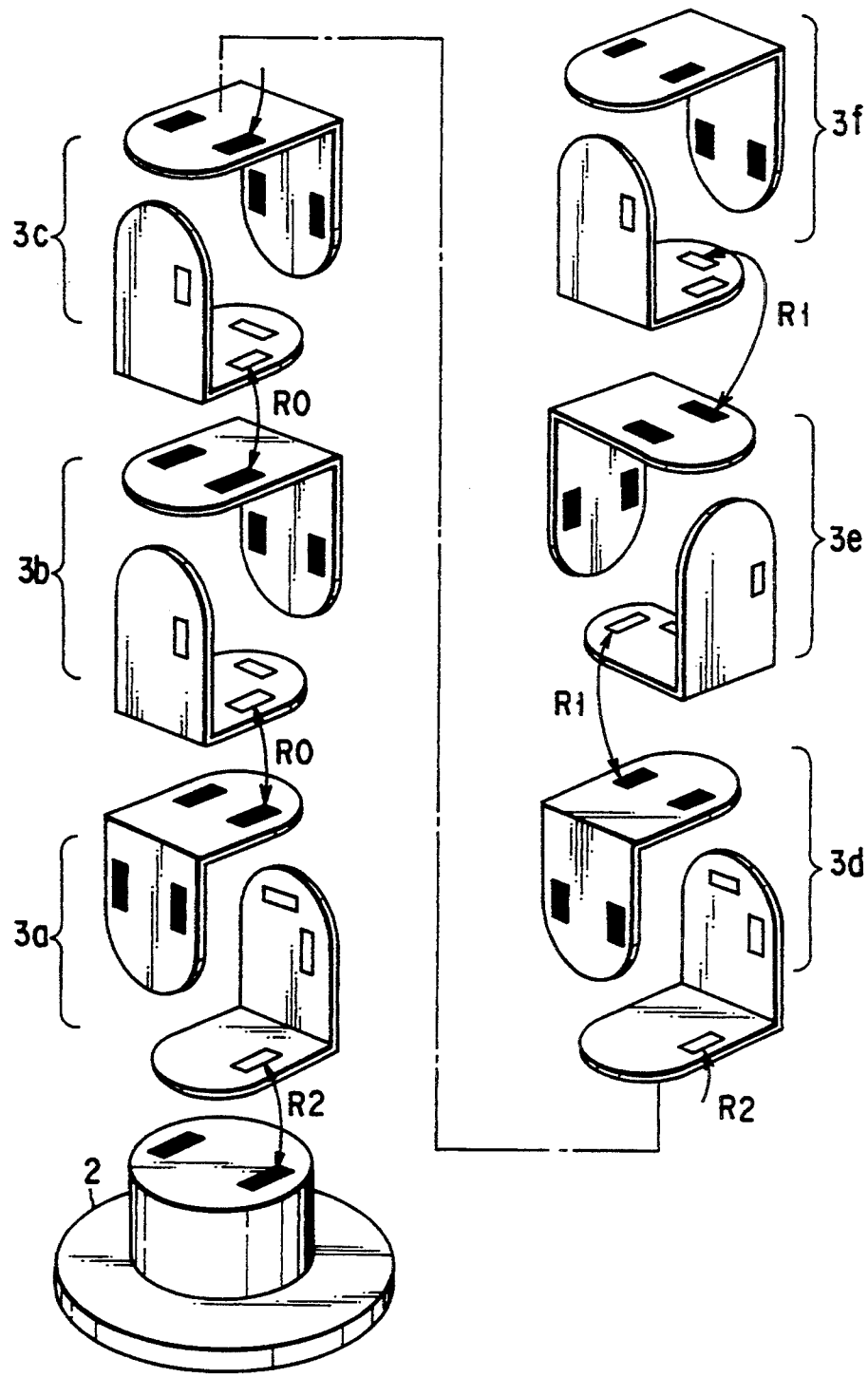
FIG. 18 is a view for explaining an operation associated with each identification signal generator in a manipulator main body formed by combining joint modules, each identical to the joint module in FIG. 15.

FIG. 18 shows the positional relationship between each connector and each conductor in a case wherein the manipulator main body shown in FIG. 1 is constituted by six joint portions 3 each having the connectors 81, 82, and 83 and the conductors 89, 90, and 91. Referring to FIG. 18, each white rectangle indicates a connector; and a black rectangle, a conductor, Table 1 shows a resistance obtained from a connector 87 arranged in each joint portion and a technique of processing it.

TABLE 1

| Joint Number | Measured Resistance | Z-axis Determination | Identification Signal | Sum of Binary Numbers | X-/Y- axis Determination | Overall Degree-of-free Arrangement |
| --- | --- | --- | --- | --- | --- | --- |
| base | | | | 0 | | base |
| 3a | R2 | Z | 2 | 10 | | Z |
| 3b | R0 | | 0 | 10 | X | X |
| 3c | R0 | | 0 | 10 | X | X |
| 3d | R2 | Z | 2 | 100 | | Z |
| 3e | R1 | | 1 | 101 | Y | Y |
| 3f | R1 | | 1 | 110 | X | X |

As is apparent from FIG. 15 to 18 and Table 1, a resistance R2 is measured at a joint portion 3a; a resistance R0, at a joint portion 3b; a resistance R0, at a joint portion 3c; a resistance R2, at a joint portion 3d; a resistance R1, at a joint portion 3e; and a resistance R1, at a joint portion 3f.

A measurement unit (not shown) unconditionally determines that a joint portion at which the resistance R2 is measured is a rotation joint which rotates about the Z-axis. In this case, the joint portions 3a and 3d are determined as joints which rotate about the Z-axis. Subsequently, an identification signal "0" is assigned to a joint portion having the resistance R0; an identification signal "1", to a joint portion having the resistance R1; and an identification signal "2", a joint portion having the resistance R2. These values of identification signals, starting from "0" for the base portion to the hand portion, are sequentially added as binary numbers. A joint portion, other than a joint portion determined as an X-axis rotation joint portion, which has "0" as the least significant digit is determined as an X-axis rotation joint portion, whereas a joint portion having "1" as the least significant digit is determined as a Y-axis rotation joint portion. In this case, the joint portions 3b, 3c, and 3f are determined as X-axis rotation joint portions, and the joint portion 3e is determined as a Y-axis rotation joint portion.

By the above-described method, the arrangement of the manipulator main body is determined as "(Base) - Z - X - X - Z - Y - X - (Hand)", starting from the first joint portion. This information is supplied to an information processing unit (not shown) to customize the software for a driving/controlling operation.

When a manipulator main body is to be formed by using the joint portion 3 shown in FIG. 15 and inserting arms between joint portions, as shown in FIG. 10, conductors 101 to 112 may be formed on the short sides of rectangles defining mounting portions 65, 67, 69, 71, 73, and 75 formed on an X-axis extension arm 61, a Y-axis extension arm 62, and Z-axis extension arm 63, as shown in FIGS. 19(a) to 19(c).

FIGS. 20 and 21 show the positional relationship between each connector and each conductor in a case wherein the manipulator main body 1a shown in FIG. 10 is constituted by a combination of the seven joint portions 3 each having the connectors 81, 82, and 83 and the conductors 89, 90, 91, and 92, and the X-axis extension arm 61 and the Z-axis extension arm 63 shown in FIGS. 19(a) and 19(c). Referring to FIGS. 20 and 21, each white rectangle indicates a connector; and each black rectangle, a conductor. Table 2 shows a resistance obtained from the connector 87 arranged in each joint portion, and a technique of processing it.

portion, other than a joint portion determined as an X-axis rotation joint portion, which has "0" as the least significant digit is determined as an X-axis rotation joint portion, whereas a joint portion having "1" as the least significant digit is determined as a Y-axis rotation joint portion. In this case, the joint portions 3a, 3d, and 3e are determined as X-axis rotation joint portions, and the joint portions 3b and 3g are determined as Y-axis rotation joint portions.

By the above-described method, the arrangement of the manipulator main body 1a is determined as "(Base) - X - Y - Z - X - Z - X - Y - (Hand)", starting from the first joint portion. This information is supplied to the information processing unit (not shown) to customize the software for a driving/controlling operation.

(Second Modification)

Figure 22:
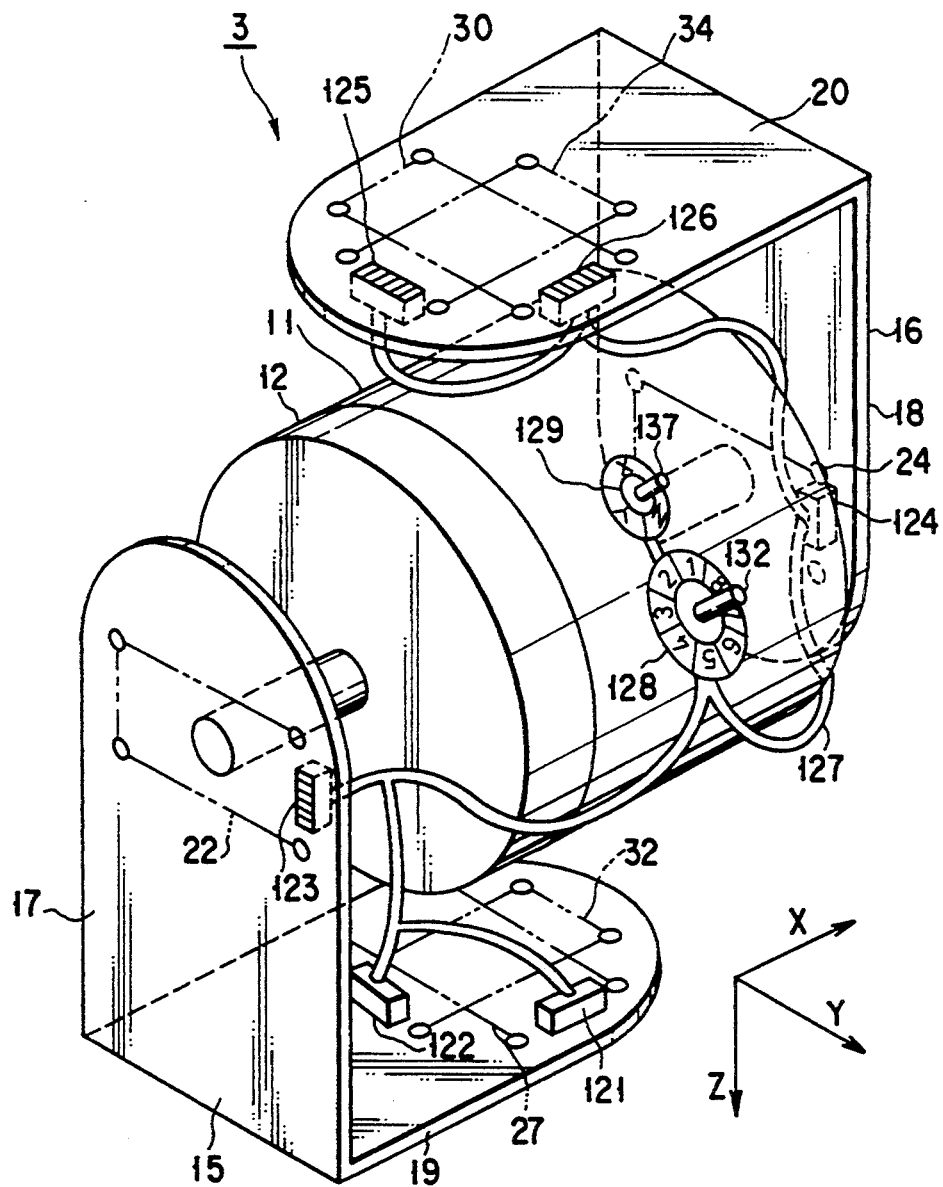
FIG. 22 is an enlarged perspective view showing another modification of the joint module constituting the manipulator main body according to the previous embodiment of the present invention.

FIG. 22 shows another modification of the joint portion 3 constituting the manipulator main body of the manipulator apparatus according to the previous embodiment of the present invention. The main body portion of a joint portion 3 of this modification has the same arrangement as that of the joint portion of the previous embodiment.

The difference between the modification and the previous embodiment is in an identification signal generator arranged in each joint portion 3 to generate an identification signal indicating the ordinal number of each joint in the order of connection, and an identification signal indicating the degree-of-freedom direction of each joint portion.

In this modification, when a manipulator main body is assembled, measurement lines are automatically con-

TABLE 2

| Joint Number | Measured Resistance | Z-axis Determination | Identification Signal | Sum of Binary Numbers | X-/Y- axis Determination | Overall Degree-of-free Arrangement |
| --- | --- | --- | --- | --- | --- | --- |
| base |  |  |  | 0 |  | base |
| 3a | R1 |  | 0 | 0 | X | X |
| 3b | R1 |  | 1 | 1 | Y | Y |
| 3c | nonconductive | Z | 1 | 10 | Z |  |
| 3d | R0 |  | 0 | 10 | X | X |
| 3e | R2 | Z | 2 | 100 |  | Z |
| 3f | R0 |  | 0 | 100 | X | X |
| 3g | R1 |  | 1 | 101 | Y | Y |

As is apparent from these drawings and table, the resistance R0 is measured at the joint portion 3a; the resistance R1, at the joint portion 3b; "nonconductive", at the joint portion 3c, the resistance R0, at the joint portion 3d; the resistance R2, at the joint portion 3e; the resistance R0, at the joint portion 3f; and the resistance R1, at the joint portion 3g.

The measuring unit (not shown) unconditionally determines that a joint portion at which the resistance R2 is measured, and a joint portion at which "nonconductive" is measured are Z-axis rotation joints. In this case, the joint portions 3c and 3e are determined as Z-axis rotation joints. Subsequently, an identification signal "0" is assigned to a joint portion having the resistance R0; an identification signal "1", to a joint portion having the resistance R1; an identification signal "2", to a joint portion having the resistance R2; and an identification signal "1", to a joint portion determined as "nonconductive". These values of identification signals, starting from "0" for the base portion to the hand portion, are sequentially added as binary numbers. A joint nected to each other to extend from the base to the joint portion at the farthest end of the joint portion assembly, and an identification signal indicating the ordinal number of each joint portion in the order of connection, and an identification signal indicating a specific axis on a given rectangular coordinate system about which each joint portion rotates are generated.

In this modification, each of coupling members 15 and 16 is constituted by a nonconductive member. A connector 121 is formed on a portion 19, of the coupling member 15, which is parallel to the rotation axis of the joint portion 3, at a position on a short side, of a rectangle defining a third mounting portion 27, which is located at the positive side on the Y-axis in FIG. 22 with respect to the center of the rectangle in such a manner that each pin of the connector 121 is exposed to the lower surface of the portion 19 in FIG. 22. A connector 122 is formed on the portion 19 of the coupling member 15 at a position on a short side, of a rectangle defining a fifth mounting portion 32, which is located on the negative side on the X-axis in FIG. 22 with respect to the center of the rectangle in such a manner that each pin of the connector 122 is exposed to the lower surface of the portion 19. In addition, a connector 123 is formed on a portion 17, of the coupling member 15, which is perpendicular to the rotation axis, at a position on a short side, of a rectangle defining a first mounting portion 22, which is located on the positive side on the Y-axis in FIG. 22 with respect to the center of the rectangle in such a manner that each pin of the connector 123 is exposed to the left outer surface of the portion 17.

A connector 124 is formed on a portion 18, of the coupling member 16, which is perpendicular to the rotation axis, at a position on a short side, of a rectangle defining a second mounting portion 24, which is located on the positive side on the Y-axis in FIG. 22 with respect to the center of the rectangle in such a manner that each pin of the connector 124 is exposed to the right outer surface of the portion 18. A connector 125 is formed on a portion 20, of the coupling member 16, which is parallel to the rotation axis, at a position on a short side of a rectangle defining a sixth mounting portion 34, which is located on the negative side on the X-axis in FIG. 22 with respect to the center of the rectangle in such a manner that each pin of the connector 125 is exposed to the upper surface of the portion 20. In addition, a connector 126 is formed on the portion 20 at a position on a short side, of a rectangle defining a fourth mounting portion 30, which is located on the positive side on the Y-axis in FIG. 22 with respect to the center of the rectangle in such a manner that each pin of the connector 126 is exposed to the upper surface of the portion 20.

Figure 23:
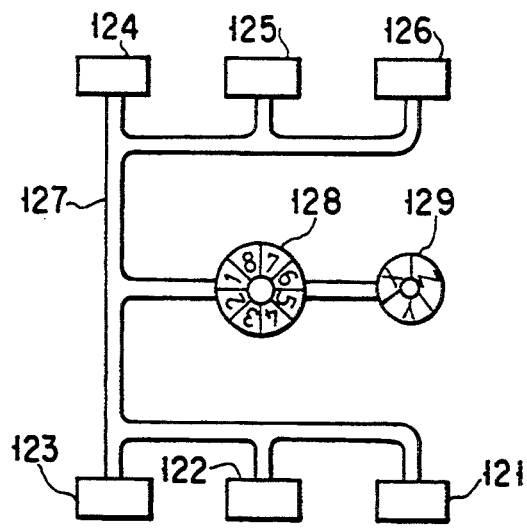
FIG. 23 is a connection diagram of an identification signal generator mounted in the joint module in FIG. 22.
Figure 24:
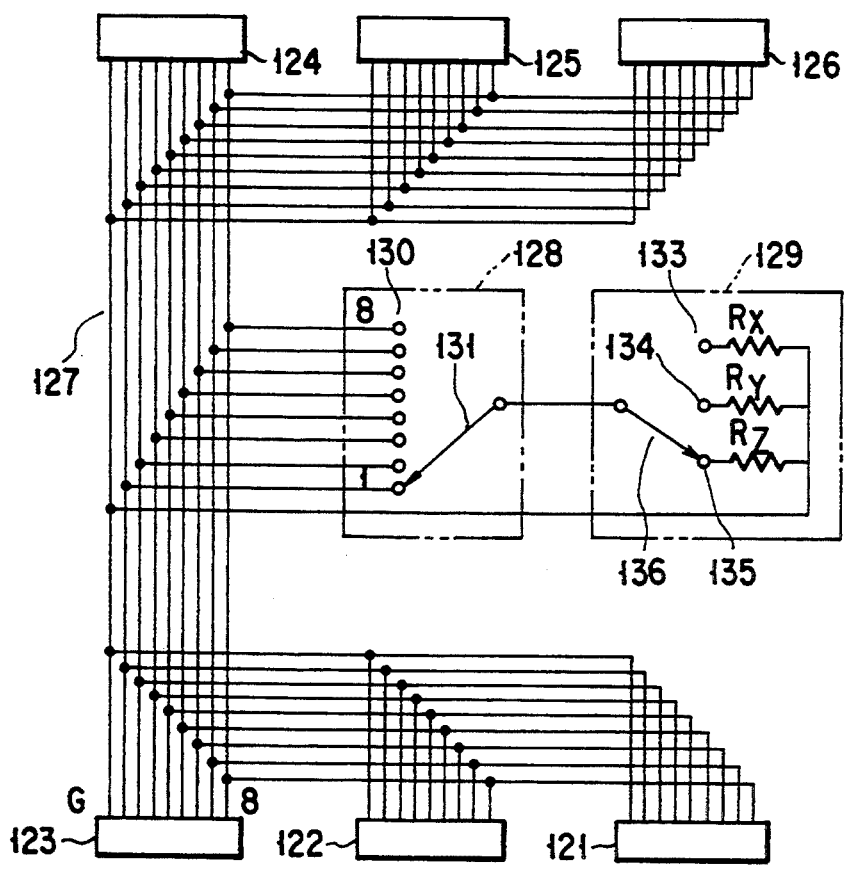
FIG. 24 is a circuit diagram showing the connection of the identification signal generator in detail.

In this case, each of the connectors 121 to 126 has nine pins. One of these nine pins is indicated by "G" representing "ground", and the remaining eight pints are indicated by "1" to "8". The corresponding pins of the connectors 121 to 126 are commonly connected through a cable 127, as shown in FIGS. 23 and 24.

Switches 128 and 129 are attached to the outer surface of a motor portion 11. The switch 128 includes a stationary contact group 130 consisting of eight contacts, and a movable contact 131 for selecting one stationary contact from the stationary contact group 130, as shown in FIG. 24. When a knob 132 is operated to set the pointer to one of numbers "1" to "8" on a dial, the movable contact 131 is brought into contact with the stationary contact corresponding to the number indicated by the pointer. The stationary contacts constituting the stationary contact group 130 are respectively connected to connector pins of numbers corresponding to the numbers of the contacts. The switch 129 includes an X stationary contact 133, a Y stationary contact 134, and a Z stationary contact 135, and a movable contact 136 for selecting one stationary contact from these stationary contacts, as shown in FIG. 24. When a knob 137 is operated to set the pointer to one of characters "X", "Y", and "Z" on a dial, the movable contact 136 is brought into contact with the stationary contact corresponding to the character indicated by the pointer. The movable contact 136 is connected to the movable contact 131 of the switch 128. One end of each of resistors respectively having resistances RX, RY, and RZ is connected to the X stationary contact 133, the Y stationary contact 134, and the Z fixed contract 135, and the other end of each of the resistors is commonly connected to the ground pin G of the above-described connector.

Figure 25:
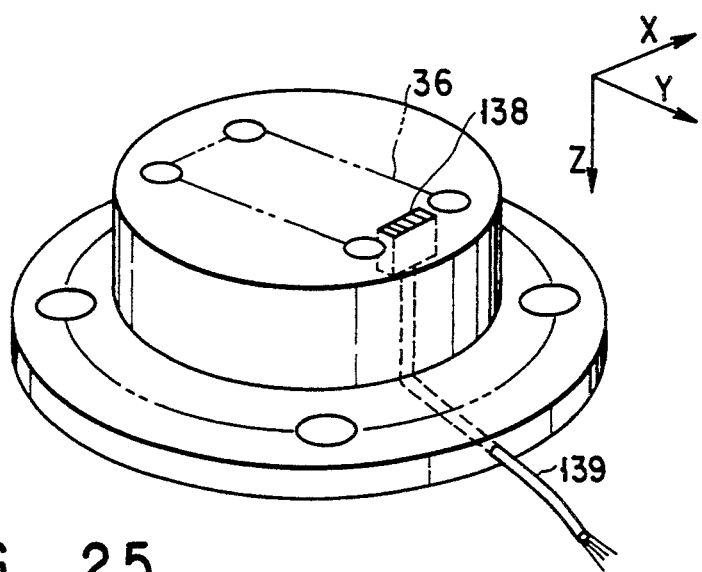
FIG. 25 is a perspective view showing a base of the manipulator main body using the joint module.

In addition, as shown in FIG. 25, a connector 138 having the same arrangement as that of the connectors 121 to 126 is attached to a base 2 at a position on a short side, of a rectangle defining a mounting portion 36, which is located on the positive side on the Y-axis in FIG. 25 with respect to the center of the rectangle in such a manner that each pin of the connector 138 is exposed. A cable 139 is connected to the connector 138. The cable 139 is selectively connected to a signal processing system 51b shown in FIG. 26.

Since the joint portions 3 and the base 2 have the above-described arrangements, when a manipulator main body is constituted by a combination of the joint portions 3, the connectors arranged on the adjacent joint portions are automatically connected to each other. When the joint portions 3 are to be assembled together, the ordinal number of each joint portion 3 with respect to the base 2, and its degree-of-freedom direction on a given rectangular coordinate system are checked, so that the pointer of the switch 128 is set to the corresponding ordinal number, and the pointer of the switch 129 is set to coincide with an axis indicating the degree of freedom.

FIG. 26 shows the relationship of connection between the measurement lines of the joint portions 3a and 3b in a case wherein the manipulator main body 1 shown in FIG. 1 is constituted by a combination of the six joint portion 3 each having the connectors 121 to 126 and the switches 128 and 129.

In this case, with regard to the joint portion 3a, the pointer of the switch 128 indicates "1" on the dial, while the pointer of the switch 129 indicates "Z" on the dial. With regard to the joint portion 3b, the pointer of the switch 128 indicates "2" on the dial, while the pointer of the switch 129 indicates "X" on the dial. Therefore, when the resistance between the ground pin and the first pin is measured from the signal processing system 51b side through the cable 139, a resistance RZ is measured. When the resistance between the ground pin and the second pin is measured, a resistance RX is measured. It can be determined from these resistances that the joint portion 3a is a Z-axis rotation joint portion, and the joint portion 3b is an X-axis rotation joint. Similarly, an axis about which each joint portion rotates can be determined in the same manner. The determination results are supplied to an information processing unit 54b to be used for customizing the software for a driving/controlling operation.

With this arrangement, the number of measurement cables required for measurement can be reduced, and errors can be reduced in terms of connection order of the respective portions.

Figure 27:
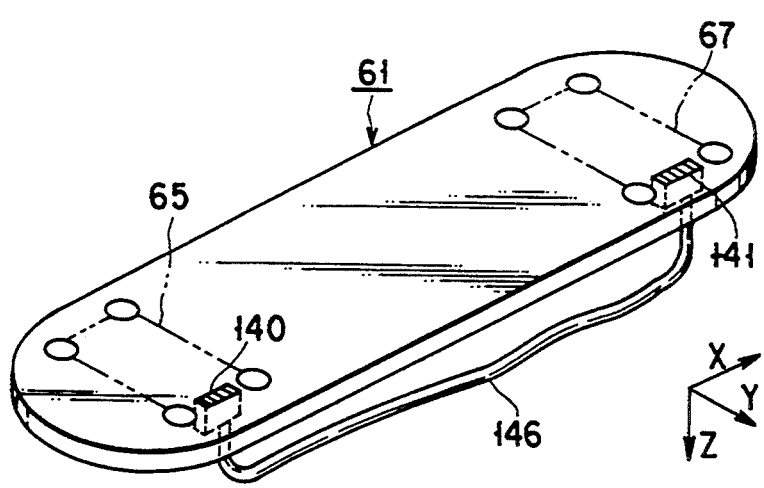
FIG. 27 is a perspective view showing an X-axis extension arm module used to form the manipulator main body by combining the joint modules.
Figure 28:
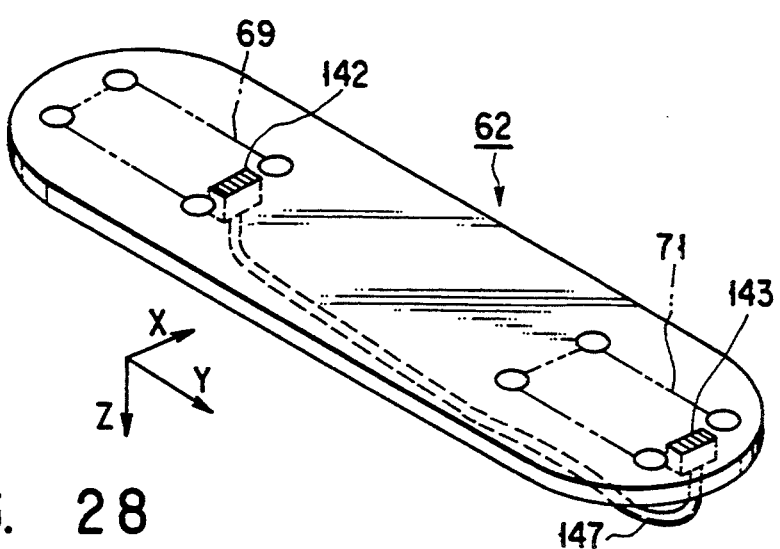
FIG. 28 is a perspective view showing a Y-axis extension arm module used to form the manipulator main body by combining the joint modules.

When a manipulator main body is to be formed by using the joint portions 3 each having the above arrangement and inserting arms therebetween, an X-axis extension arm 61, a Y-axis extension arm 62, and a Z-axis extension arm 63 respectively having connectors 140 to 145 formed on short sides of rectangles defining mounting portions 65, 67, 69, 71, 73, and 75 at the positions indicated by FIGS. 27, 28, and 29, and signal cables 146 to 148 connecting the connectors 140 to 145 to each other may be used.

(Third Modification)

Figure 30:
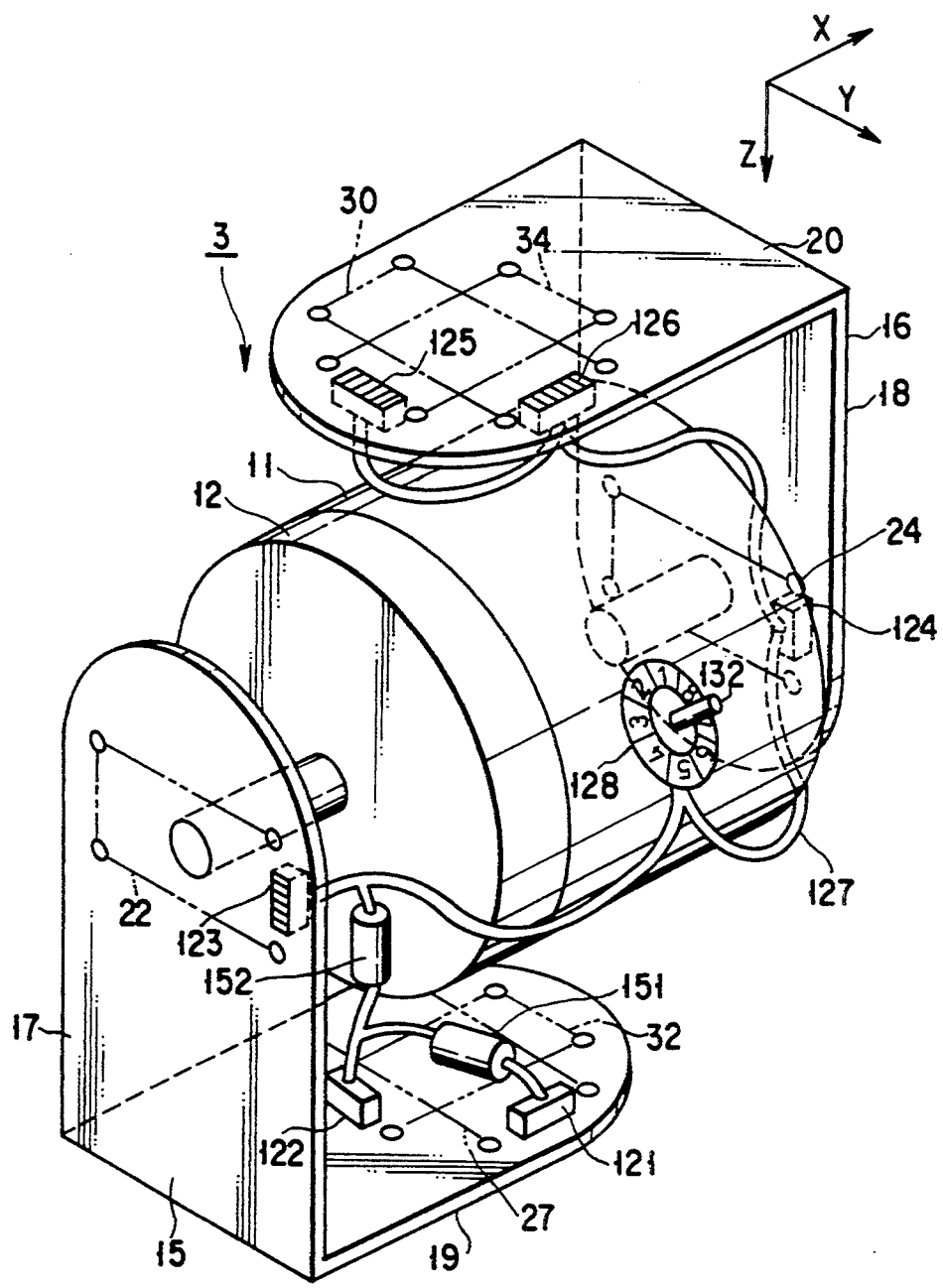
FIG. 30 is an enlarged perspective view showing still another modification of the joint module constituting the manipulator main body according to the previous embodiment of the present invention.

FIG. 30 shows still another modification of the joint portion 3 constituting the manipulator main body of the manipulator apparatus according to the previous embodiment of the present invention. Similar to the above modifications, the main body portion of the joint portion 3 of this modification has the same arrangement as that of the joint portion 3 of the previous embodiment. The same reference numerals in FIG. 30 denote the same parts as in FIG. 22.

The difference between the modification and the previous embodiment is in an identification signal generator arranged in each joint portion 3 to generate an identification signal indicating the ordinal number of each joint portion in the order of connection, and an identification signal indicating the degree-of-freedom direction of each joint portion.

Figure 31:
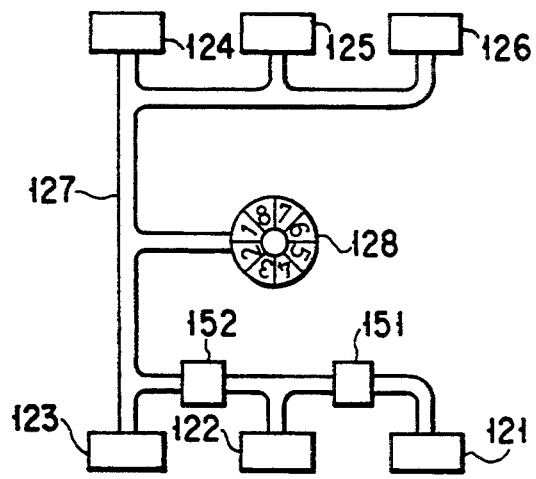
FIG. 31 is a connection diagram of an identification signal generator mounted in the joint module in FIG. 30.
Figure 32:
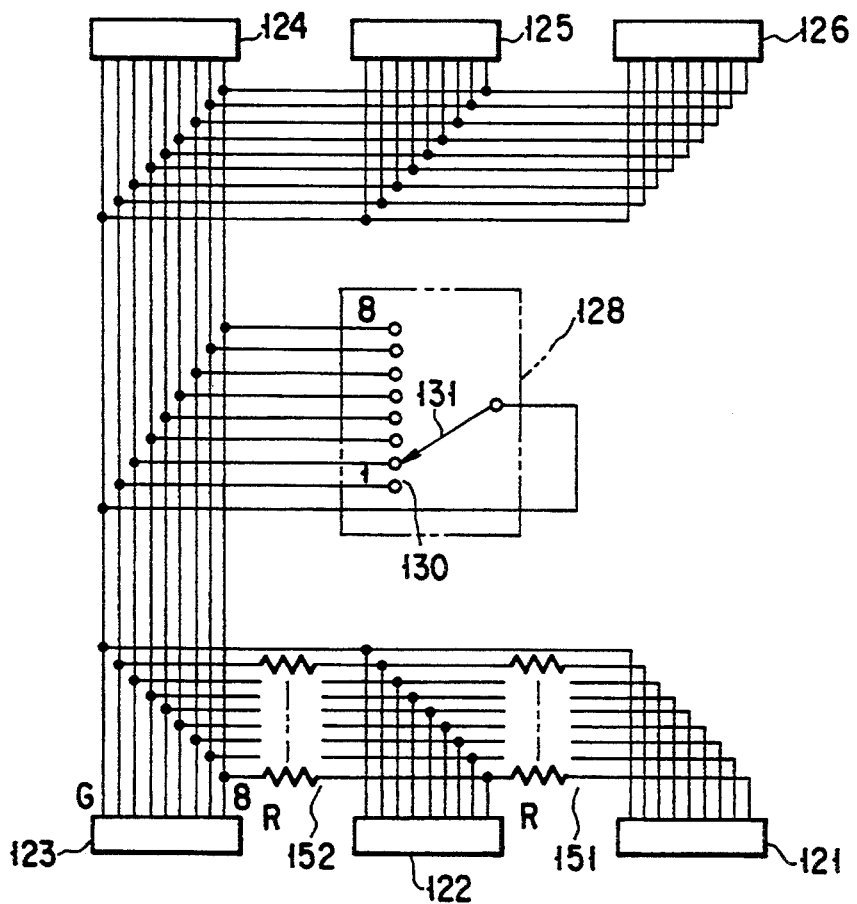
FIG. 32 is a circuit diagram showing the connection of the identification signal generator in detail.

In the modification, instead of arranging the switch 129 used in the embodiment shown in FIG. 22, resistors 151 each having a resistance R are inserted between the eight pins of a connector 121, excluding the ground pint, and the eight pins of a connector 122, excluding the ground pin, and resistors 152 each having the resistance R are inserted between the eight pins of the connector 122, excluding the ground pin, and the eight pins of a connector 123, excluding the ground pin, as shown in FIGS. 31 and 32. In addition, the nine pins of the connector 123, including the ground pin, and the corresponding nine pins of each of connectors 124, 125, and 126 are commonly connected.

FIG. 33 shows the relationship of connection between the measurement signal lines of joint portions 3a and 3b in a case wherein the manipulator main body 1 shown in FIG. 1 is constituted by a combination of the six joint portions 3 each having the connectors 121 to 126, the switch 128, and the resistors 151 and 152.

With this arrangement, if a given joint portion is connected as an X-axis rotation joint, the resistance of each signal line on the joint is increased by 2R. If the joint portion is connected as a Y-axis rotation joint, the resistance of each signal line on the joint is increased by 1R. If the joint portion is connected as a Z-axis rotation joint, the resistance of each signal line on the joint is increased by 0R, i.e., no change in resistance occurs. That is, a resistor indicating the rotational directional of each joint portion is connected in series with each signal line of the joint portion. If no further joint portion is connected, since the measured resistance becomes an open-circuit value, and the resistance difference becomes infinitive, the number of joint portion modules used can be obtained. Therefore, by measuring the resistance between the ground pin and each pin of each joint portion through the cable 139, and sequentially checking resistance differences in the respective joint portions, starting from the first joint portion, the degree of freedom of the manipulator main body and its arrangement (X or Y direction) can be detected.

Table 3 shows measurement results obtained by measurement with respect to the manipulator main body 1, assembled as shown in FIG. 1, using a measuring unit 53c, and determination results of degree-of-freedom arrangements.

TABLE 3

| Connector Pin Number | Measurement Resistance | Resistance Difference Arrangement | Overall Degree-of-free 1 |
| --- | --- | --- | --- |
| 1 | 0 | 0 | 3a: Z-axis rotation |
| 2 | 2R | 2R | 3b: X-axis rotation |
| 3 | 4R | 2R | 3c: X-axis rotation |
| 4 | 4R | 0 | 3d: Z-axis rotation |
| 5 | 5R | 1R | 3e: Y-axis rotation |
| 6 | 7R | 2R | 3f: X-axis rotatin |
| 7 | open-circuit | ∞ | six degree-of-free |

TABLE 3-continued

| Connector Pin Number | Measurement Resistance | Resistance Difference Arrangement | Overall Degree-of-free 1 |
| --- | --- | --- | --- |
| 8 | open-circuit | | arrangement |

Table 4 shows measurement results obtained by measurement with respect to the manipulator main body 1a, assembled as shown in FIG. 10, using the measuring unit 53c, and determination results of degree-of-free arrangements.

TABLE 4

| Connector Pin Number | Measurement resistance | Resistance Difference Arrangement | Overall Degree-of-free Arrangement |
| --- | --- | --- | --- |
| 1 | 2R | 2R | 3a: X-axis rotation |
| 2 | 3R | 1R | 3b: Y-axis rotation |
| 3 | 3R | 0 | 3c: Z-axis rotation |
| 4 | 5R | 2R | 3d: Y-axis rotation |
| 5 | 5R | 0 | 3e: Z-axis rotation |
| 6 | 7R | 2R | 3f: X-axis rotation |
| 7 | 8R | 1R | 3g: Y-axis rotation |
| 8 | open-circuit | ∞ | seven degree-of-free arrangement |

The results obtained by the above measurement and determination processing are supplied to an information processing unit 54c to be used for customizing the software for a driving/controlling operation. Therefore, in this modification, the same effects as those in the above embodiment can be obtained.

(Fourth Modification)

Figure 34:
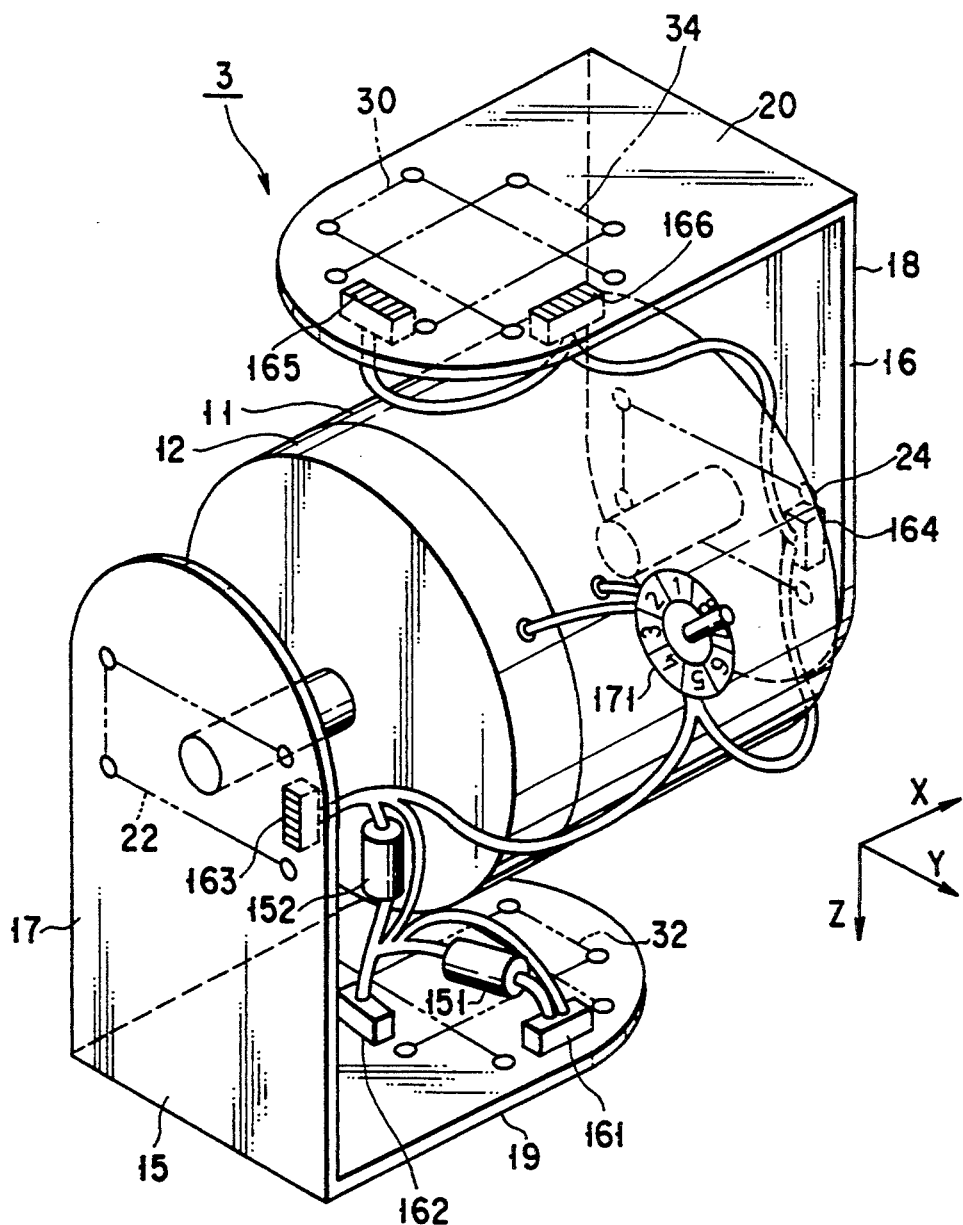
FIG. 34 is an enlarged perspective view showing still another modification of the joint module constituting the manipulator main body according to the second embodiment of the present invention.

FIG. 34 shows still another modification of the joint portion 3 constituting the manipulator main body of the manipulator apparatus according to the previous embodiment of the present invention. The main body portion of the joint portion 3 in this modification has the same arrangement as that of the joint portion in the previous embodiment. The modification employs the same method as that used for the joint portion shown in FIG. 30 with regard to a signal generator for generating an identification signal indicating the ordinal number of each joint portion in the order of connection of the respective joint portions, and an identification signal indicating the degree-of-freedom direction of each joint portion.

Figure 38:
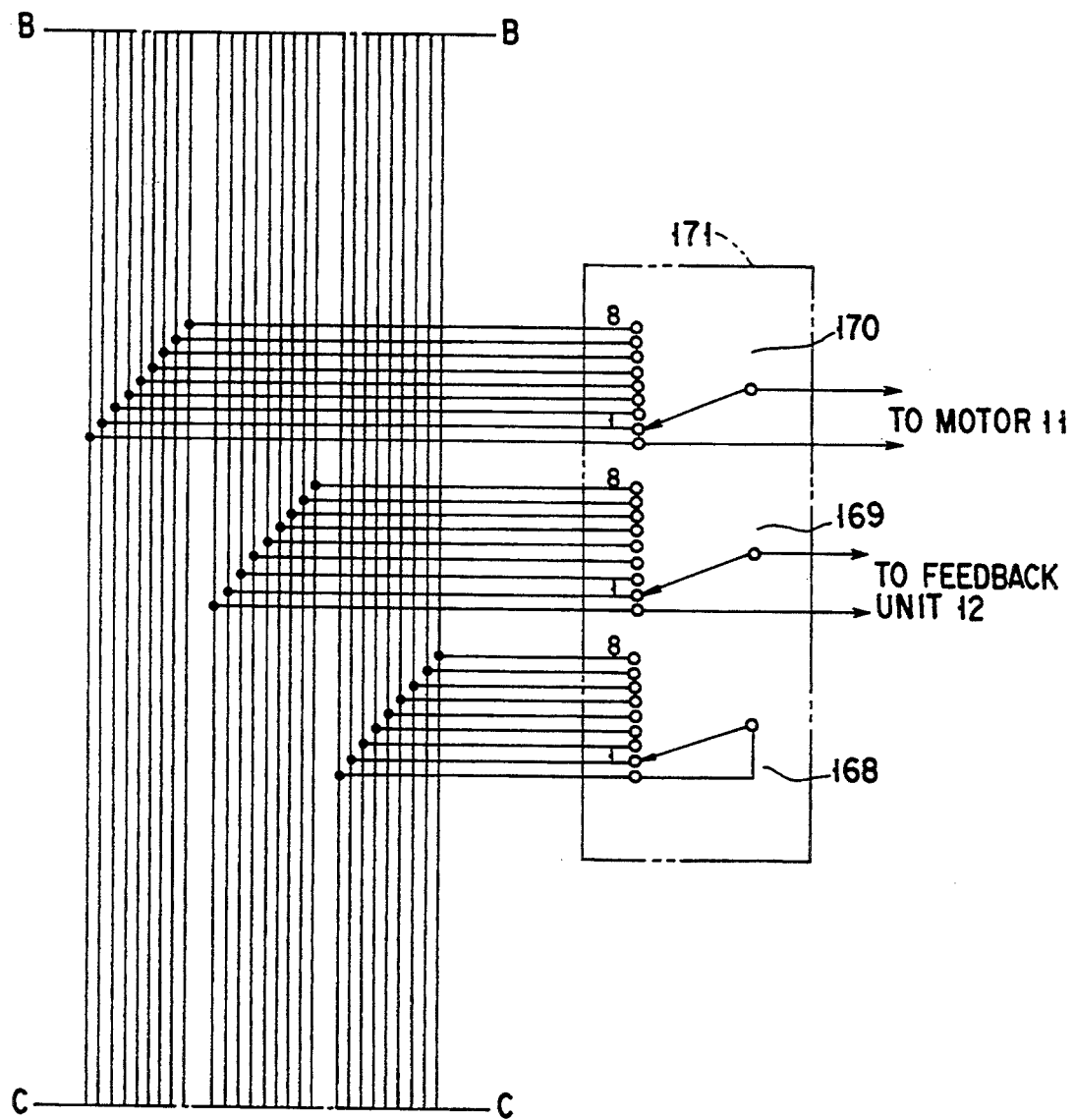
FIG. 38 is a connection diagram of a module, of the wiring system arranged in the joint module, which is defined between a line B—B and a line C—C.
Figure 39:
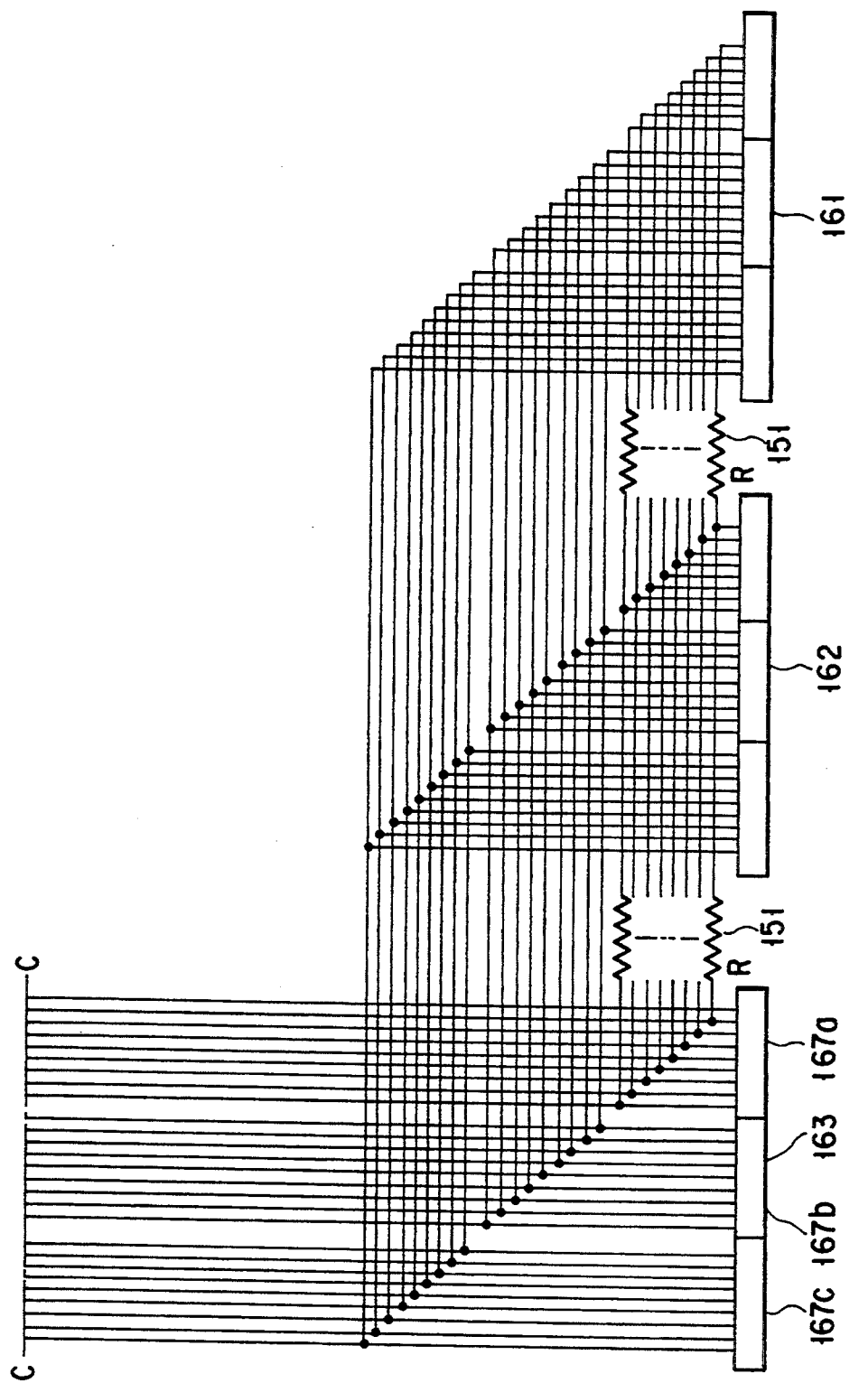
FIG. 39 is a connection diagram of the remaining module, of the wiring system arranged in the joint module, which follows the line C—C.

The modification is different from the previous embodiment in that connector portions 167a, 167b, and 167c are integrated into a unit used as each of connectors 161 to 166, as shown in FIGS. 35, 36, 37, 38, and 39. The connector portion 167a is used to measure the ordinal number of each joint portion in the order of connection and its degree-of-freedom direction. The connector portion 167b is used for connection to a feedback unit 12 of each joint portion. The connector portion 167c is used to supply power to a motor portion 11 of each joint portion. As shown in FIG. 38, the modification also uses a switch 171 having switch portions 169 and 170 designed to connect the feedback unit 12 and the motor portion 11 of each joint portion to pins of the corresponding connector portions upon interlocking with a switch portion 168 used to measure the ordinal number of each joint portion in the order of connection and its degree-of-freedom direction.

Even if such an arrangement is employed, the same effects as those in the previous embodiment can be obtained.

(Fifth Modification)

Figure 40:
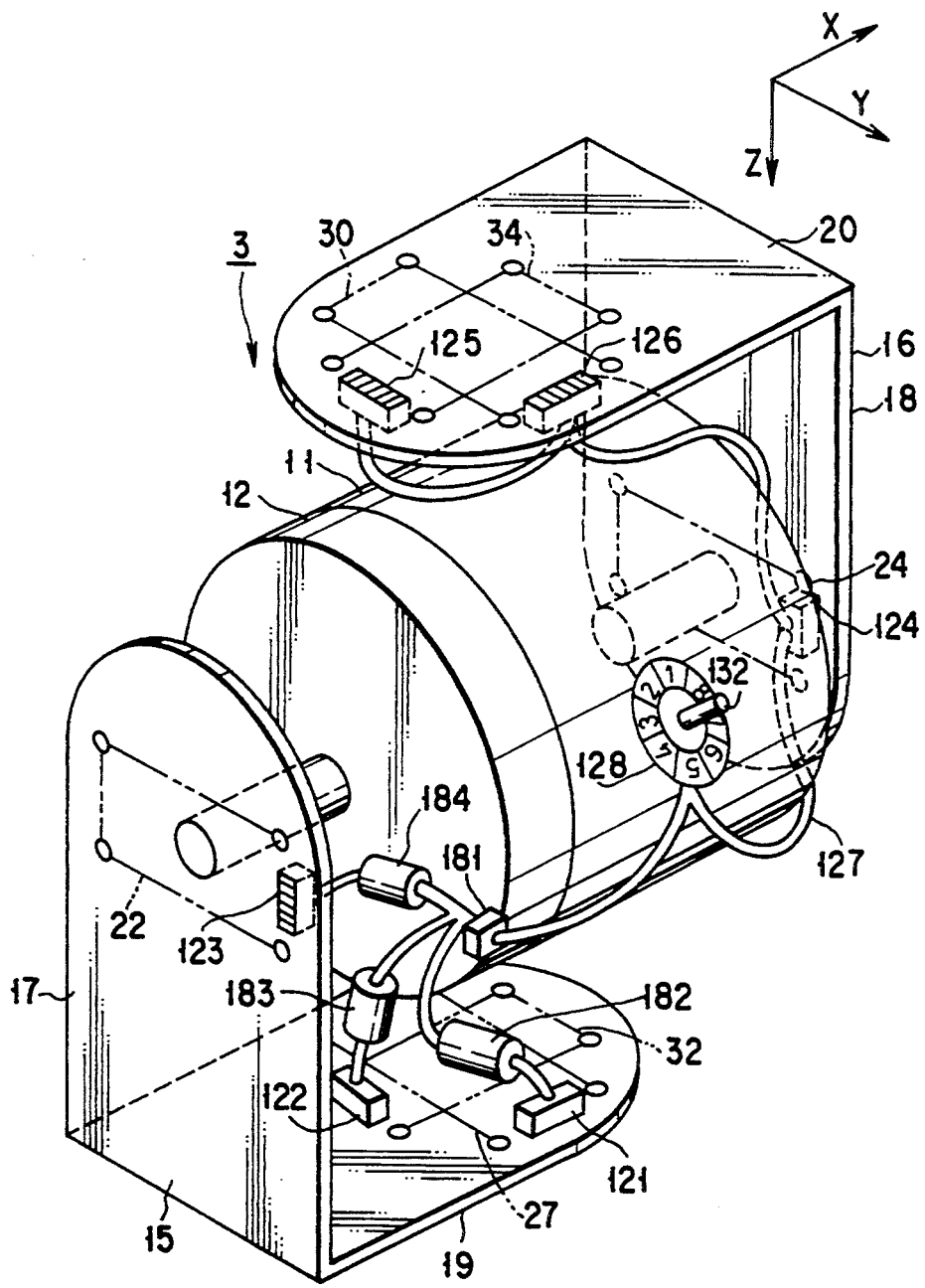
FIG. 40 is an enlarged perspective view showing still another modification of the joint module constituting the manipulator main body according to the second embodiment of the present invention.

FIG. 40 shows still another modification of the joint portion 3 constituting the manipulator main body of the manipulator apparatus according to the previous embodiment of the present invention. The main body portion of a joint portion 3 in this modification has the same arrangement as that of the joint portion 3 in the embodiment. The same reference numerals in FIG. 40 denote the same parts as in FIG. 30.

The difference between this modification and that shown in FIG. 30 is in an identification signal generator for generating an identification signal indicating the ordinal number of each joint portion in the order of connection, and an identification signal indicating the degree-of-freedom direction of each joint portion.

In this modification, resistors 182 each having a resistance Rx are connected between the eight pins of a connector 121, excluding the ground pin, and the eight pins of a relay connector 181, excluding the ground pin. Resistors 183 each having a resistance Ry are connected between the eight pins of a connector 122, excluding the ground pin, and the eight pins of the relay connector 181, excluding the ground pin. In addition, resistors 184 each having a resistance Rz are connected between the eight pins of a connector 123, excluding the ground pin, and the eight pins of the relay connector 181, excluding the ground pin. The ground pins of the connectors 121, 122, and 123 are commonly connected to the ground pin of the relay connector 181, and the nine pins of the relay connector 181, including the ground pin, and the corresponding nine pins of each of the connectors 124, 125, and 126 are commonly connected to each other.

Figure 41:
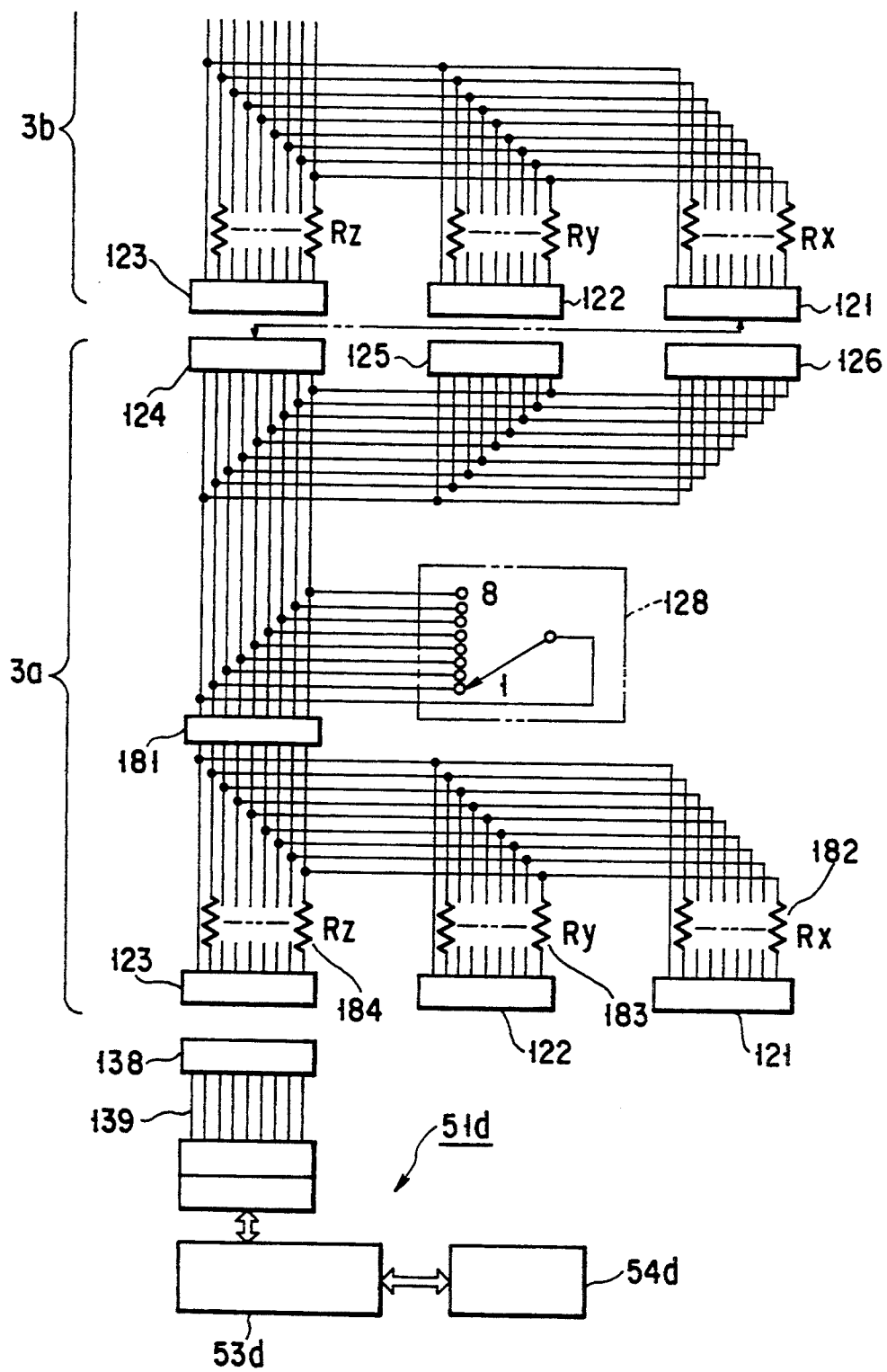
FIG. 41 is a connection diagram of an identification signal generator mounted in the joint module in FIG. 40.

FIG. 41 shows the relationship of connection between the measurement lines of joint portions 3a and 3b in a case wherein the manipulator main body 1 shown in FIG. 1 is constituted by a combination of the six joint portion 3 each having the connectors 121 to 126, the switch 128, and the resistors 182, 183, and 184.

With this arrangement, if a given joint portion is connected as a rotation joint which rotates about the X-axis, the resistance of each measurement line on the joint is increased by Rx. If the joint portion is connected as a rotation joint which rotates about the Y-axis, the resistance of each signal line on the joint portion is increased by Ry. If the joint portion is connected as a rotation joint which rotates about Z-axis, the resistance of each signal line on the joint is increased by Rz. In addition, if the joint portion is directly connected without the mediacy of an arm or the like as a flexion joint which bends in the same direction as that of a joint portion adjacent to the base side, the resistance of each signal line on the joint is increased by a resistance value obtained when the resistors having Rx and Ry are connected in parallel. That is, a resistor having a resistance indicating the rotational direction of each joint portion is connected in series with a corresponding signal line on each joint portion.

Figure 42:
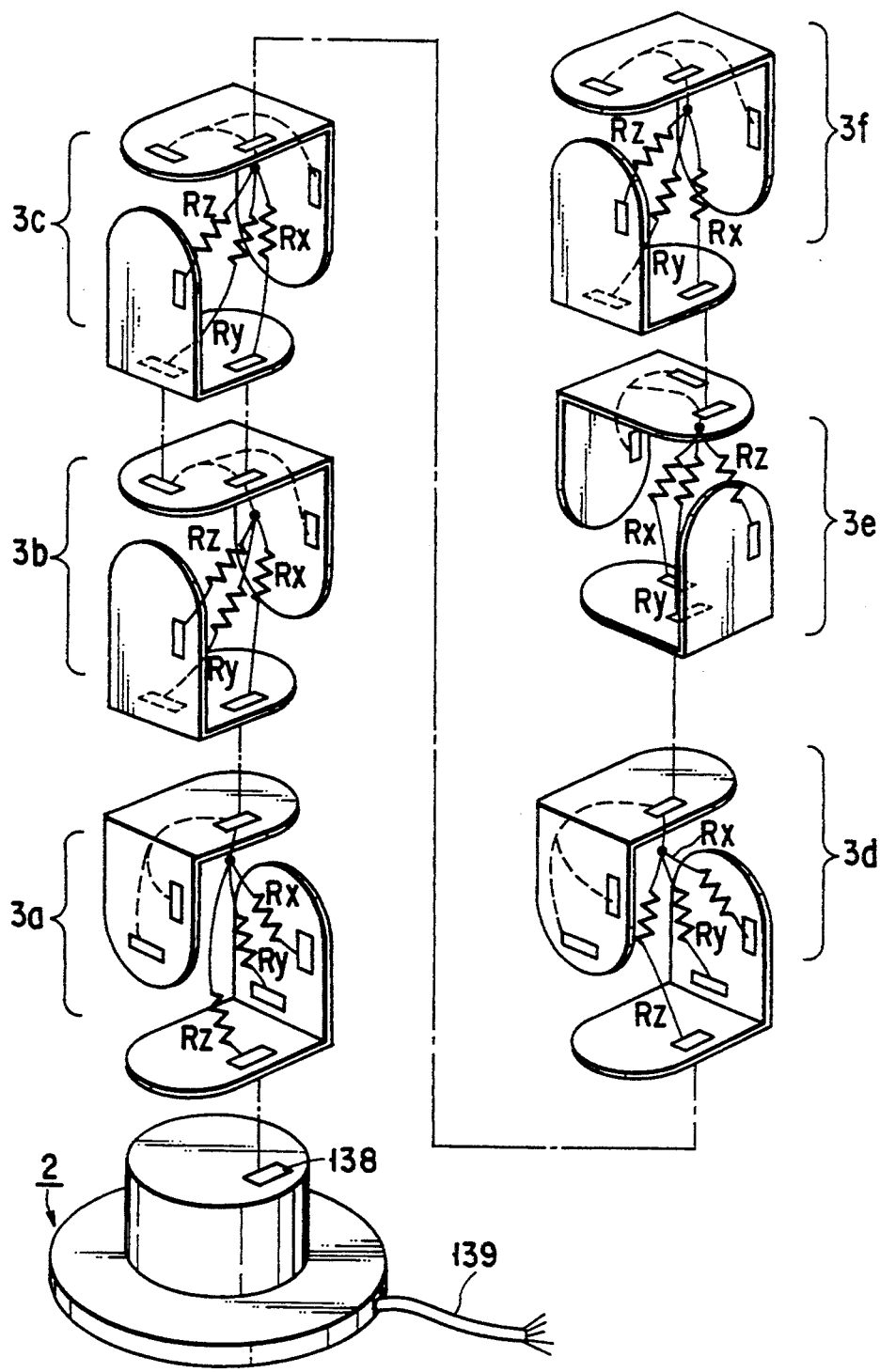
FIG. 42 is a view showing an example of connection between each connector and resistors in a case wherein six joint modules, each identical to that shown in FIG. 39, are combined to form the manipulator main body in FIG. 1.
Figure 43:
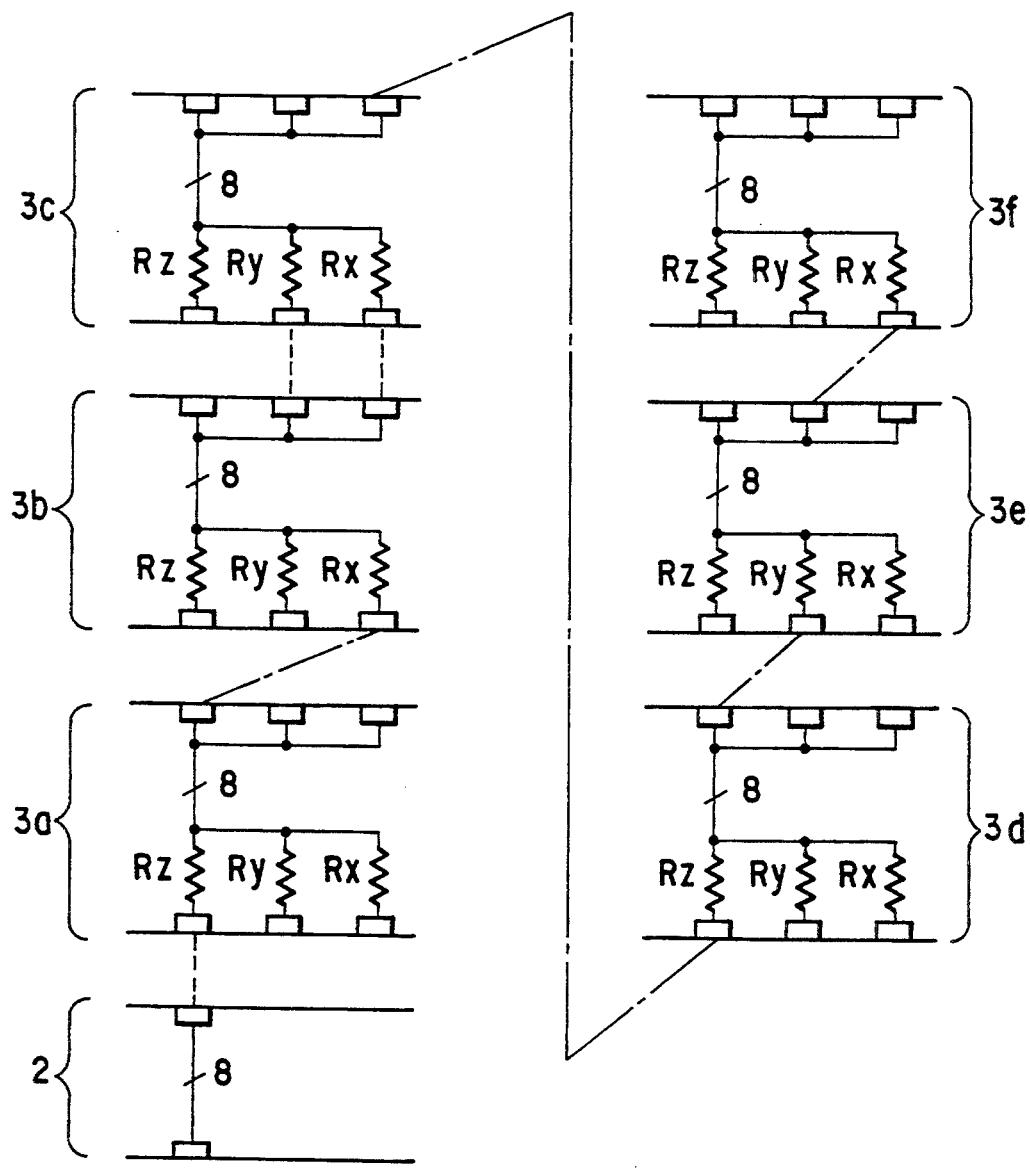
FIG. 43 is a circuit diagram showing the connection in FIG. 42.

If, therefore, the resistance between the ground pin and each pin of each joint portion is measured through a cable 139, and resistance differences are sequentially checked from the first joint portion, the degree of freedom and arrangement of the manipulator main body can be detected. FIG. 42 is a perspective view showing the relationship of connection between each connector and each resistor in a case wherein the manipulator main body 1 shown in FIG. 1 is constituted by a combination of six joint portions 3, each identical to the one shown in FIG. 40. FIG. 43 is a connection diagram of the arrangement in FIG. 42. These drawings are used to explain which one of the resistors having the resistances Rx, Ry, and Rz is added in accordance with the connection state of each joint portion. In order to facilitate the understanding of the connection relationship, single-line diagrams are drawn.

As is apparent from FIGS. 42 and 43, when the resistance between the ground line and the first pin is measured through the cable 139, the resistance Rz is measured. When the resistance between the ground line and the second pin is measured, (Rz+Rx) is measured. Similarly, when the resistances between the ground line and the third to sixth pins are sequentially measured, the following resistances are measured: [Rz+Rx+(Rx·Ry)/(Rx+Ry)}, {(Rz+Rx+(Rx·Ry)/(Rx+Ry)+Rz}, {Rz+Rx+(Rx·Ry)/(Rx+Ry)+Rz+Ry}, and {Rz+Rx+(Rx·Ry)/(Rx+Ry)+Rz+Ry+Rx}.

When the difference between the resistance obtained by each pin and that obtained by a pin lower in ordinal number by one is calculated, Rz, Rx, (Rx·Ry), Rz, Ry, and Rx are obtained. Therefore, the degree-of-freedom arrangement of the manipulator main body 1 is determined as "(Base) - Z - X - X - Z - Y - X - (Hand)", when viewed from the base 2 side, in the coordinate system in which the manipulator main body is installed.

This determination is actually performed by a measuring unit 53d shown in FIG. 41. The measurement and determination results are supplied to an information processing unit 54d to be used for customizing the software for a driving/controlling operation. In this modification, therefore, the same effects as those in the above-described embodiment can be obtained. According to the modification, the ordinal number of each joint portion in the order of connection and the degree-of-freedom direction of each joint portion can be accurately detected regardless of the connection relationship between the respective joint portions.

The present invention is not limited to the above-described embodiments and modifications. Various changes and modifications can be made within the scope and spirit of the invention.

(Effects of First and Second Embodiments)

As described above, according to the present invention, one joint module can be used (as both a rotation joint and a flexion joint) and the bending direction of a flexion joint can be selected from two orthogonal directions. Therefore, a manipulator main body can be constituted by a plurality of joint modules having different outputs in any order of connection. In addition, since the degree-of-freedom arrangement of the manipulator main body can be changed by changing the order of connection of the respective joint portions which have already been assembled into the manipulator apparatus, each joint portion can be separately carried to a working site, and a manipulator main body having a degree-of-freedom arrangement suited for specific operation contents can be assembled at the site. Furthermore, even if the operation contents are changed, a manipulator apparatus having a degree-of-freedom arrangement suited for the new operation contents can be easily assembled. Even if a given joint portion breaks down, the manipulator main body can be normally operated by only replacing the broken joint portion. Since one type of a joint portion can be used as both a rotation joint and a flexion joint, assembly and maintenance can be facilitated. Furthermore, since each joint portion has an identification signal generator capable of generating three types of signals each identifying rotation about the X-, Y-, or Z-axis, customizing of the software used for driving/controlling the manipulator main body can be facilitated by using these identification signals. Therefore, the labor and time required to customize and change the program for driving/controlling the manipulator apparatus in accordance with a change in arrangement can be reduced. Moreover, a manipulator apparatus capable of customizing the program as needed can be provided.

(Third Embodiment)

Figure 44:
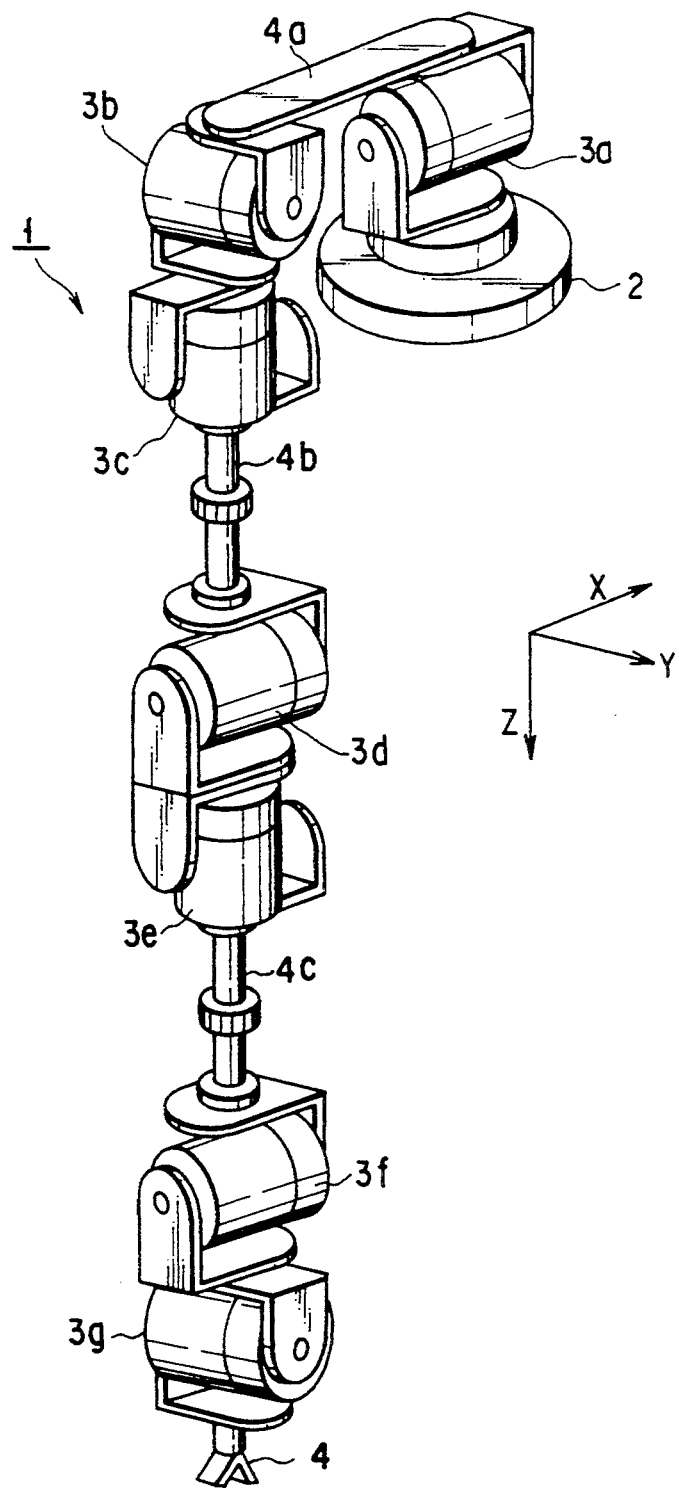
FIG. 44 is a perspective view of a manipulator main body of a manipulator apparatus according to the third embodiment of the present invention.

FIG. 44 shows the schematic arrangement of a manipulator main body 1 of a manipulator apparatus according to the third embodiment of the present invention.

In this manipulator main body 1, seven joints 3a to 3g and three arms 4a to 4c are connected in series on a base 2, and an effector unit 4 equivalent to a hand portion is attached to the joint 3g located at the farthest end of the joint assembly. The joints 3a to 3g are connected to each other to respectively have degrees of freedom in the directions indicated by the equivalent diagram of FIG. 45 on the rectangular coordinate system shown in FIG. 44.

Similar to the above embodiments, in this embodiment, the join portions 3a to 3g are modules having the same size. Each joint in the third embodiment basically has the same specifications as those of each joint employed in the first and second embodiments (see FIGS. 3(a) to 3(e)).

More specifically, however, each of the joints 3a to 3g in the third embodiment is desired such that the distance between the outer surfaces of portions 17 and 18 is set to be 20 cm, and the distance between the outer surfaces of portions 19 and 20 is set to be 20 cm while they oppose each other.

Assume that the joints 3a to 3g, each having the above arrangement, are actually assembled. When, for example, a joint which rotates about the X-axis on the rectangular coordinate system shown in FIGS. 4(a) to 4(c) is to be realized, third and fourth mounting portions 27 and 30 are selected, as shown in FIG. 4(a). When a Joint which rotates about the Y-axis is to be realized, fifth and sixth mounting portions 32 and 34 are selected, as shown in FIG. 4(b). When a joint which rotates about the Z-axis is to be realized, first and second mounting portions 22 and 24 are selected, as shown in FIG. 4(c).

Since each of the joints 3a to 3g has the above arrangement, a manipulator main body can be constituted by even joints having different outputs in any order of connection. In addition, the degree-of-freedom arrangement of the manipulator main body can be changed by changing the order of connection of the respective joints which have already been assembled into the manipulator apparatus. Each joint can be separately carried to a working site, and a manipulator main body can be easily assembled at the site. Furthermore, when operation contents are determined, a manipulator main body can be assembled upon selection of a degree-of-freedom arrangement suited for the operation contents. Therefore, the performance of each joint of the manipulator main body can be efficiently transformed into a speed or power of the end effector (e.g. hand portion). Even if the operation contents are changed, a manipulator main body having a degree-of-freedom arrangement suited for the new operation contents can be easily assembled. As described above, the manipulator main body 1 is constituted by a combination of the seven joints 3a to 3g, each of which can be used as both a rotation joint and a flexion joint with its bending direction allowed to be selected from two orthogonal directions, and the three arms 4a to 4c (to be described later).

Each of the joints 3a to 3g assembled into the manipulator main body 1 incorporates an identification signal generator for generating an identification signal indicating the ordinal number of each joint in the order of connection with respect to the base 2, and an identification signal indicating the degree-of-freedom direction of each joint.

Figure 46:
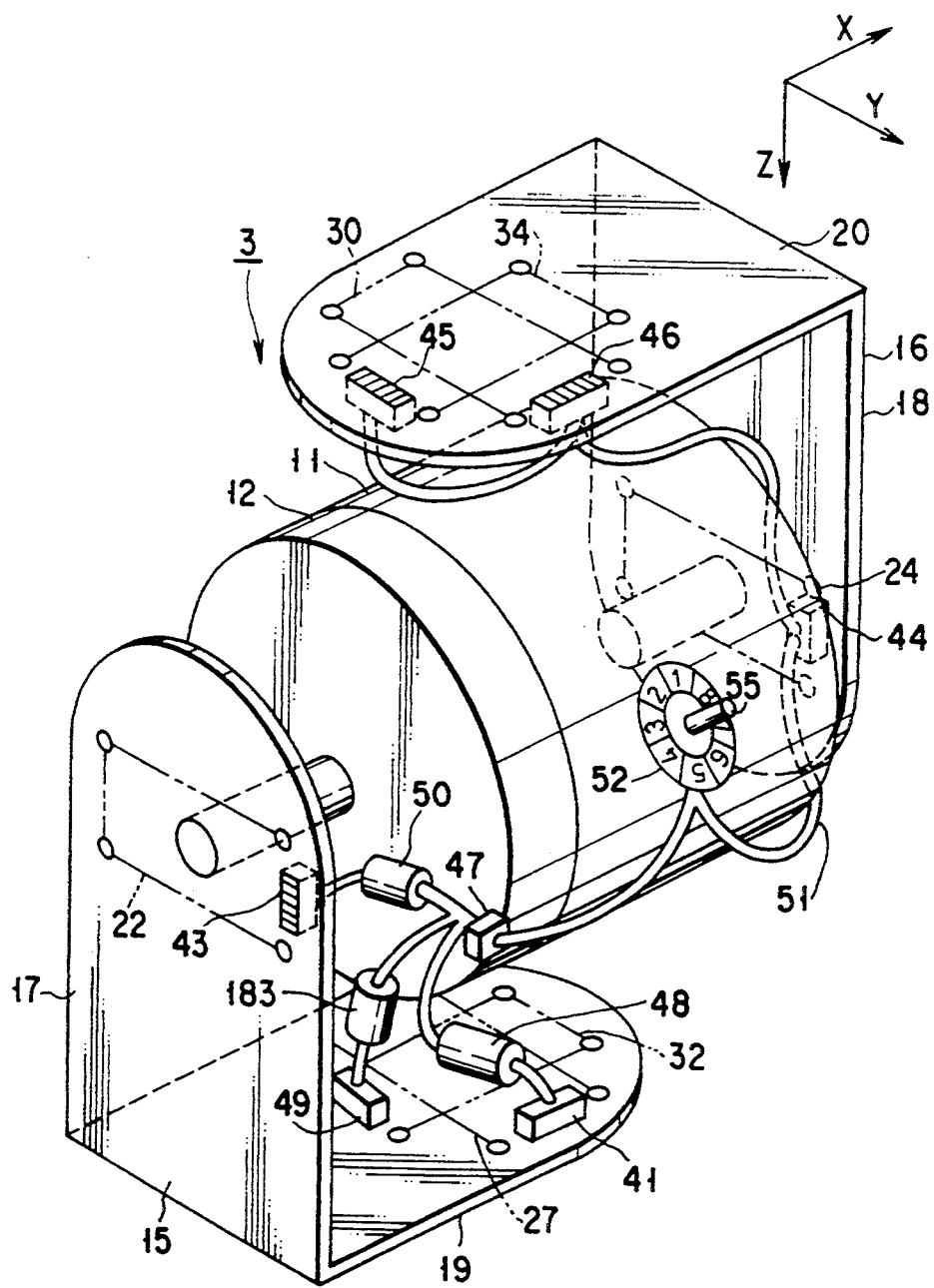
FIG. 46 is an enlarged perspective view of a joint module in FIG. 44.

More specifically, as shown in FIG. 46, each identification signal generator has the following arrangement. A connector 41 is arranged on the portion 19, of a coupling member 15, which is parallel to the rotation axis of the joint, at a position on a short side, of a rectangle defining the third mounting portion 27, which is located on the positive side on the Y-axis in FIG. 46 with respect to the center of rectangle in such a manner that each pin of the connector 41 is exposed to the lower surface of the portion 19 in FIG. 46. A connector 42 is arranged on the portion 19 of the coupling member 15 at a position on a short side, of a rectangle defining the fifth mounting portion 32, which is located on the negative side on the X-axis in FIG. 46 with respect to the center of the rectangle in such a manner that each pin of the connector 42 is exposed to the lower surface of the portion 19 in FIG. 46. In addition, a connector 43 is arranged on the portion 17, of the coupling member 15, which is perpendicular to the rotation axis, at a position on a short side, of a rectangle defining the first mounting portion 22, which is located on the positive side on the Y-axis in FIG. 46 with respect to the center of the rectangle in such a manner that each pin of the connector 43 is exposed to the left outer surface of the portion 17 in FIG. 46.

A connector 44 is arranged on the portion 18, of a coupling member 16, which is perpendicular to the rotation axis at a position on a short side, of a rectangle defining the second mounting portion 24, which is located on the positive side on the Y-axis in FIG. 46 with respect to the center of the rectangle in such a manner that each pin of the connector 44 is exposed to the right outer surface of the portion 18 in FIG. 46. A connector 45 is arranged on the portion 20, of the coupling member 16, which is parallel to the rotation axis at a position on a short side, of a rectangle defining the sixth mounting portion 34, which is located on the negative side on the X-axis with respect to the center of the rectangle in such a manner that each pin of the connector 45 is exposed to the upper surface of the portion 20 in FIG. 46. In addition, a connector 46 is arranged on the portion 20 at a position on a short side, of a rectangle defining the fourth mounting portion 30, which is located on the positive side on the Y-axis in FIG. 46 with respect to the center of the rectangle in such a manner that each pin of the connector 46 is exposed to the upper surface of the portion 20 in FIG. 46.

In this case, each of the connectors 41 to 46 has nine pins. One of these pins is indicated by "G" representing "ground", and the remaining eight pins are indicated by "1" to "8".

Resistors 48, each having a resistance Rx (=10 Ω representing rotation about the X-axis, are connected between the eight pins of the connector 41, excluding the ground pin, and the eight pins of a relay connector 47, excluding the ground pin. Resistors 49, each having a resistance Ry (=20 Ω) representing rotation about the Y-axis, are connected between the eight pins of the connector 42, excluding the ground pin, and the eight pins of the relay connector 47, excluding the ground pin. In addition, resistors 50, each having a resistance Rz (=30 Ω) representing rotation about the Z-axis, are connected between the eight pins of the connector 43, excluding the ground pin, and the eight pins of the relay connector 47, excluding the ground pin.

The ground pins of the connectors 41, 42, and 43 are commonly connected to the ground pin of the relay connector 47. The nine pins of the relay connector 47, including the ground pin, and the corresponding nine pins of each of the connectors 44, 45, and 46 are commonly connected to each other through a cable 51, as shown in FIG. 47.

A switch 52 is mounted on the outer surface of a motor portion 11. The switch 52 includes a stationary contact group 53 having eight contacts, and a movable contact 54 for selecting one of the contacts of the stationary contact group 53, as shown in FIG. 47. When a knob 55 is operated to set the pointer to one of the numbers "1" to "8" drawn on a dial, the movable contact 54 is brought into contact with a stationary contact of a stationary contact number corresponding to the number indicated by the pointer. As shown in FIG. 47, the movable contact 54 is connected to the ground pin of the relay connector 47 through the cable 51. In addition, the eight stationary contacts constituting the stationary contact group 53 are connected to the corresponding pins through the cable 51.

In this case, the knob 55 is operated in the process of assembly to select a stationary contact number corresponding to the ordinal number of each joint from the base 2. When, for example, the joint 3a is to be assembled, since it is arranged at the first position with respect to the base 2, the knob 55 is operated to connect the movable contact 54 to the first stationary contact.

As shown in FIG. 48, a connector 57 having the same arrangement as that of each of the connectors 41 to 46 is mounted on the base 2 at a position on a short side, of a rectangle defining a mounting portion 56, which is located on the positive side on the Y-axis in FIG. 48 with respect to the center of the rectangle in such a manner that each pin of the connector 57 is exposed. A cable 58 is connected to the connector 57.

FIG. 49 shows the detailed arrangement of the X-axis extension arm 4a. More specifically, four mounting holes 60 are formed in one end portion of the arm 4a according to the same arrangement of the mounting holes constituting the first mounting portion 22 described above, i.e., at the vertex positions of a rectangle having long sides perpendicular to the X-axis in FIG. 49, thereby forming a mounting portion 61. In the other end of the arm 4a, four mounting holes 62 are formed at the vertex positions of a rectangle having long sides perpendicular to the X-axis in FIG. 49, thereby forming a mounting portion 63.

A connector 64 is formed on a short side, of the rectangle defining the mounting portion 61, which is located on the negative side on the Y-axis in FIG. 49 with respect to the center of the center of the rectangle in such a manner that each pin of the connector 64 is exposed to the upper surface in FIG. 49. Similarly, a connector 65 is formed on a short side, of the rectangle defining the mounting portion 63, which is located on the negative side on the Y-axis in FIG. 49 with respect to the center of the rectangle in such a manner that each pin of the connector 65 is exposed to the upper surface in FIG. 49. Similar to the connectors 41 to 46, each of the connectors 64 and 65 has one ground pin and eight signal pins. The ground pin of the connector 64 is directly connected to the ground pin of the connector 65. The eight signal pins of the connector 64 are connected to the eight signal pins of the connector 65 through resistors 66, each having a resistance rx representing a length Sx of the arm 4a, and inductors 67, each having an inductance Lx representing the extending direction of the arm 4a, which resistors and inductors are connected in series, respectively, as shown in FIG. 50. That is, the resistors 66 and the inductors 67 constitute a measurement signal generator 68 for indicating the length and direction of the arm 4a.

In this case, 1 (Ω) is set as the resistance rx per 10 (cm) as the length Sx, and the length Sx and the resistance rx are respectively set to be 30 (cm) and 3 (Ω). In addition, an inductance of 10 (H) is employed as a value indicating an X-axis extension arm; an inductance of 20 (H), as a value indicating a Y-axis extension arm; and an inductance of 30 (H), as a value indicating a Z-axis extension. Therefore, the value Lx of the arm 4a is set to be 10 (H).

Figure 51:
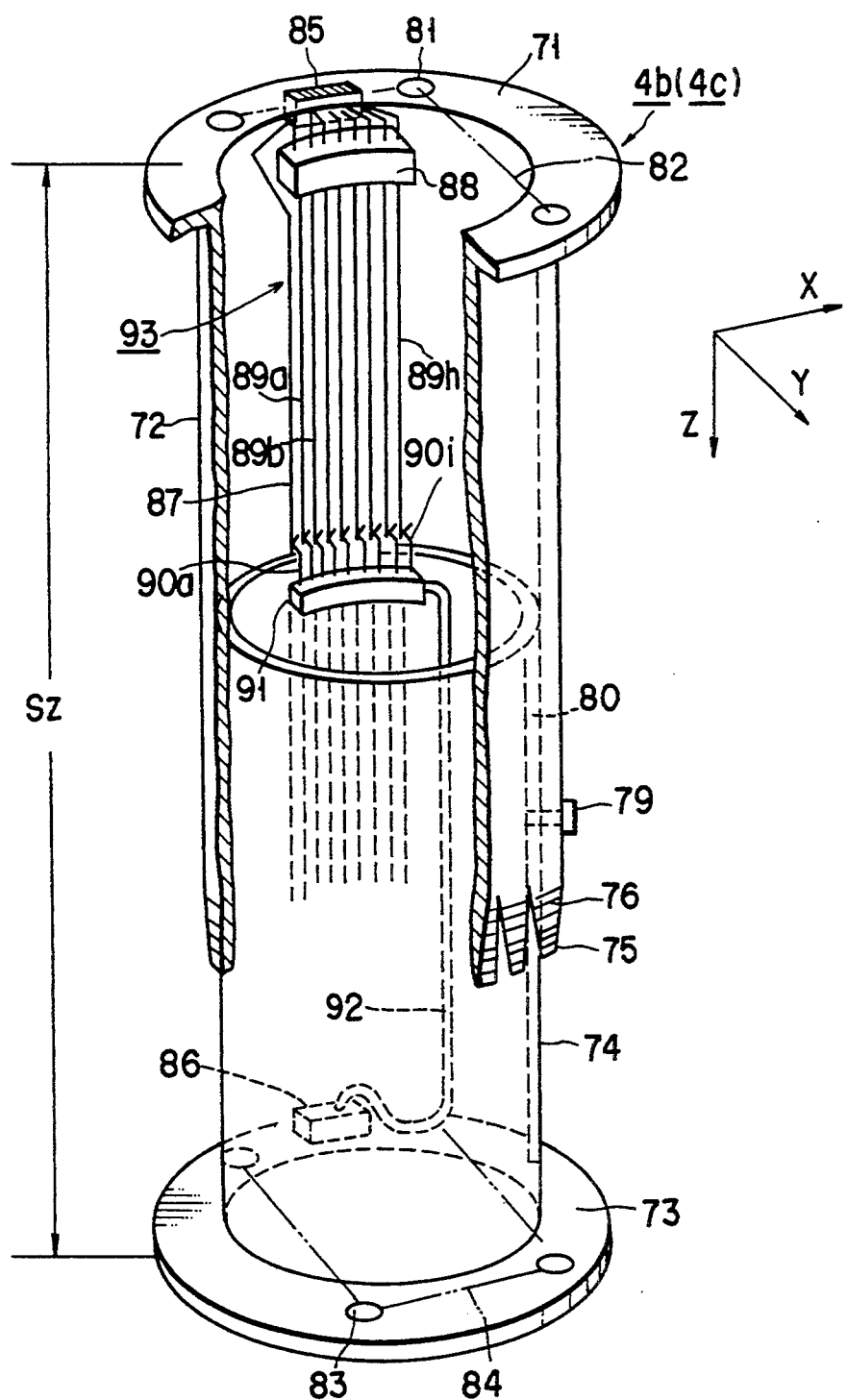
FIG. 51 is a partially cutaway perspective view showing a Z-axis extension arm module incorporated in the manipulator main body.

Each of the Z-axis extension arms 4b and 4c has a shape changing structure, specifically a structure capable of changing the length of the arm, as shown in FIG. 51. More specifically, each of the arms 4b and 4c comprises an outer cylindrical member 72 having a flange 71 at one end, an inner cylindrical member 74 having a flange 73 at one end, and the other end fitted in the other end of the outer cylindrical member 72, press pieces 75 formed at the other end portion of the outer cylindrical member 72 and divided in the circumferential direction, each press piece 75 being tapered narrower toward the distal end, a tapered male thread 76 integrally formed on the outer surfaces of the press pieces 75, and a clamping ring 78 having a tapered female thread 77 formed on its inner surface to be threadably engaged with the tapered male thread 76, as shown in FIG. 52. The clamping ring 78 serves to press the press pieces 75 against the outer surface of the inner cylindrical member 74 with higher force in accordance with an increase in the degree of engagement of the two threads. As is apparent from the above-described arrangement, the arms 4b and 4c are designed to freely adjust the length Sz in the Z-axis direction by changing the degree of fitting between the outer cylindrical member 72 and the inner cylindrical member 74, and subsequently clamping the clamping ring 78. Referring to FIG. 51, reference numeral 79 denotes a screw which is screwed into the arm from the outer surface side of the outer cylindrical member 72 so as to inhibit rotation; and 80, a slit formed in the inner cylindrical member 74 along the axial direction so as to receive the distal end of the screw 79.

The flange 71 has a mounting portion 82 constituted by four mounting holes 81 formed according to the same arrangement as the mounting holes constituting the first mounting portion 22, i.e., at the vertex positions of a rectangle having long sides perpendicular to the X-axis in FIG. 51. The flange 73 has a mounting portion 84 constituted by four mounting holes 83 formed at the vertex positions of a rectangle having long sides perpendicular to the X-axis in FIG. 51.

A connector 85 is formed on the flange 71 at a position on a short side, of the rectangle defining the mounting portion 82, which is located on the negative side on the Y-axis with respect to the center of the rectangle in such a manner that each of the connector 85 is exposed to the upper surface in FIG. 51. Similarly, a connector 86 is formed on the flange 73 at a position on a short side, of the rectangle defining the mounting portion 84, which is located on the negative side on the Y-axis in FIG. 51 in such a manner that each pin of the connector 86 is exposed to the lower surface in FIG. 51. Similar to the connectors 41 to 46, each of the connectors 85 and 86 has one ground pin and eight signal pins.

The ground pin of the connector 85 is connected to a ground pin 87 arranged on the inner surface of the outer cylindrical member 72 to extend along the axis. The eight signal pins of the connector 85 are respectively connected to eight resistive lines 89a to 89h, each arranged on the inner surface of the outer cylindrical member 72 to extend parallel to the ground line 87 and providing a resistance rz representing the length of the arm, through inductors 88 each having an inductance Lz representing the extending direction of the arm. On the other hand, a connection unit 91 having a total of nine contact members 90a to 90i is formed on the inner surface of an upper end portion of the inner cylindrical member 74. The contact members 90a to 90i are brought into slidable contact with the ground line 87 and the eight signal lines 89a to 89h in one-to-one correspondence. The nine signal pins of the connection unit 91 are connected to the corresponding pins of the connector 86 through a cable 92.

As is apparent from the above-described arrangement, the inductors 88 and the resistive lines 89a to 89h constitute a measurement signal generator 93 for indicating the length and direction of each of the arms 4b and 4c. FIG. 53 shows an electrical circuit diagram of the measurement signal generator 93. In this case, as described above, 1 ($\Omega$) is set as the resistance rz per 10 (cm) as the length Sz. If, therefore, the length Sz of each of the arms 4b and 4c is 60 (cm), the resistance rz is set to be 6 ($\Omega$). Since each of the arms 4b and 4c serves as a Z-axis extension arm, the inductance Lz is set to be 30 (H).

If the manipulator main body 1 has the above-described arrangement, a specific axis on a given rectangular coordinate system about which a given joint of a specific ordinal number rotates, or the length and direction of an arm inserted before the joint can be immediately known after the manipulator main body 1 is assembled.

Figure 54:
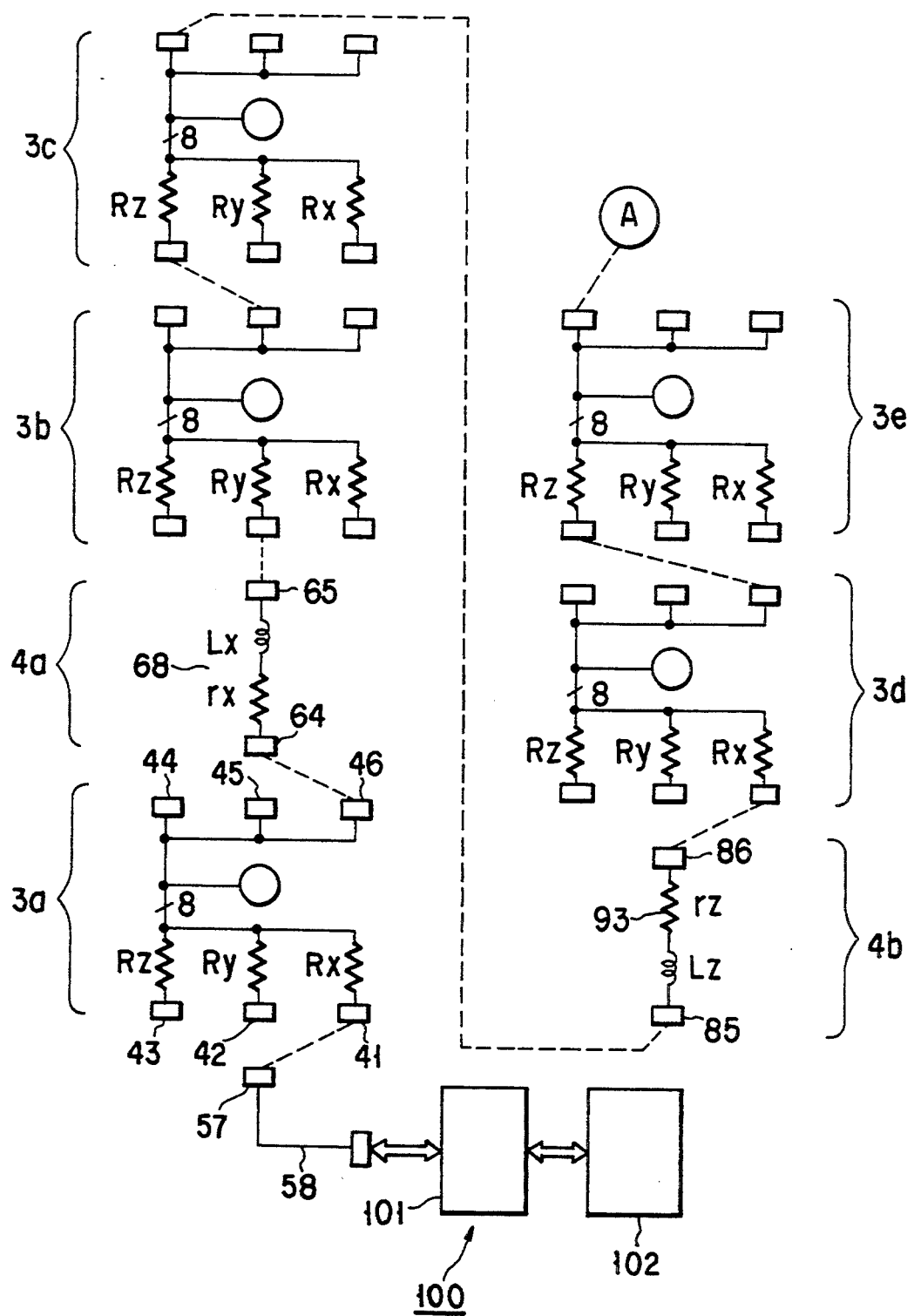
FIG. 54 is a view showing part of the connection relationship between the identification signal generator mounted in each joint module, the measurement signal generator mounted in each arm module, and a signal processing system.

When the manipulator main body 1 is assembled, as shown in FIG. 44, the identification signal generators mounted in the joints 3a to 3g and the measurement signal generators 68 and 93 mounted in the arms 4a to 4c are automatically connected to each other, as shown in FIGS. 54 and 55.

If, therefore, the resistance between the ground pin and the first signal pin is measured through the cable 58 extending from the base 2, R=Rx=10 ($\Omega$) is detected. It can be determined from the value R that the first joint 3a is an X-axis rotation joint. When the resistance between the ground pin and the second signal pin is measured, R=Rx+rx+Ry=33 ($\Omega$) is detected. When the difference between this resistance, 33 ($\Omega$), and the previously detected resistance, 20 ($\Omega$), is calculated, 23 ($\Omega$) is obtained. If the value of the first digit place is removed from this value, 20 ($\Omega$) is obtained. It can be determined from this value that the second joint 3b is a Y-axis rotation joint. Similarly, the resistance between the ground pin and each of the remaining signal pins is measured. Each resistance previously detected is subtracted from the currently obtained resistance, and the value of the first digit place of the resulting value is omitted therefrom, thereby detecting a specific axis about which each of the joints 3c to 3g rotates.

On the other hand, the number of the first digit place of a value obtained by subtracting a previously obtained resistance from the measured resistance between the ground pin and a given signal pin indicates the length of an arm inserted before the corresponding joint. For example, when the previously detected resistance, 10 ($\Omega$), is subtracted from the resistance, 33 ($\Omega$), between the ground pin and the second signal pin, 23 ($\Omega$) is obtained. The value "3" ($\Omega$) of the first digit place of this value corresponds to the length of the arm 4a, i.e., 30 (cm). Therefore, the presence and length of the arm can be known from the value of the first digit place. Table 5 shows an axis about which each joint rotates and the length of each arm, which are determined from a corresponding resistance.

TABLE 5

| Connector Pin Number | Measured Resistance ($\Omega$) | Resistance Difference ($\Omega$) | Digit Distribution | Direction of Joint | Length of Arm |
|---|---|---|---|---|---|
| 8 | infinite | infinite | | distal end | |
| 7 | 142 | 20 | 20 | Y-axis | |
| | | | 10 | | 0 |
| 6 | 122 | 15 | 10 | X-axis | |
| | | | 5 | | 50 |
| 5 | 107 | 30 | 30 | Z-axis | |
| | | | 0 | | 0 |
| 4 | 77 | 14 | 10 | X-axis | |
| | | | 4 | | 40 |
| 3 | 63 | 30 | 30 | Z-axis | |
| | | | 0 | | 0 |
| 2 | 33 | 23 | 20 | Y-axis | |
| | | | 3 | | 30 |
| 1 | 10 | 10 | 10 | X-axis | |
| | | | 0 | | 0 |

From the results shown in Table 5, only an axis about which each joint rotates and the length of each arm can be determined, but the direction of each arm cannot be determined. In order to determine the direction of each arm, an AC current is supplied between the ground pin and each signal pin, and the impedance of a corresponding closed circuit is measured. The inductance of the closed circuit is then measured by using the currently obtained impedance and the previously measured resistance. As described above, the inductors having inductances representing the directions of the respective arms are inserted in the measurement signal generators 68 and 93 mounted in the arms 4a to 4c. If, therefore, each inductance is determined, the direction of each arm can be known. An inductance is measured as follows. For example, consider a series circuit of a resistance Ro and an inductance Lo, as shown in FIG. 56. A DC voltage Vd is applied to the circuit first, and the resistance Ro is measured by using a current id flowing at this time. Subsequently, an AC voltage Va is applied to the circuit, and an impedance Zo is measured by using a current ia flowing at this time. The inductance Lo is then measured according to $Lo = (Zo^2 - Ro^2)0.5/\omega$.

Table 6 shows inductances measured by the above-described method and the directions of the respective arms.

TABLE 6

| Connector Pin Number | Measured Impedance (Ω) | Calculated Inductance (H) | Inductance Difference (Ω) | Direction of Arm |
|---|---|---|---|---|
| 8 | infinite | infinite | | |
| 7 | 158.3 | 70.0 | −0.1 | — |
| 6 | 140.7 | 70.1 | 30.1 | Z direction |
| 5 | 114.2 | 39.9 | −0.2 | — |
| 4 | 86.8 | 40.1 | 30.0 | Z direction |
| 3 | 63.8 | 10.1 | 0 | — |
| 2 | 34.5 | 10.1 | 10 | X direction |
| 1 | 10.0 | 0 | 0 | — |

With the above operation, the directions of the arms 4a to 4c are determined. Since the sizes of the joints 3a to 3g, the thickness of the base 2, and the size of the effector unit 4 are known, the manipulator main body 1 shown in FIG. 44 has specifications shown in Table 3.

TABLE 7

| Joint Number | Direction of Joint | Before and After Joint | Direction of Arm | Length of Arm | Distance between Axes |
|---|---|---|---|---|---|
| hand | | 10 | — | 0 | 20 |
| | | 10 | | | |
| 7 | Y-axis | | — | | 20 |
| | | 10 | | 0 | |
| | | 10 | | | |
| 6 | X-axis | | | | 70 |
| | | 10 | Z-direction | 50 | |
| | | 10 | | | |
| 5 | Z-axis | | — | 0 | 20 |
| | | 10 | | | |
| | | 10 | | | |
| 4 | X-axis | | Z-direction | 40 | 60 |
| | | 10 | | | |
| | | 10 | | | |
| 3 | Z-axis | | — | 0 | 20 |
| | | 10 | | | |
| | | 10 | | | |
| 2 | Y-axis | | X-direction | 30 | 30 |
| | | 10 | | | |
| | | 10 | | | |
| 1 | X-axis | | — | 0 | 20 |
| | | 10 | | | |
| base | | | | | |

Note that the above values are measured by connecting a signal processing unit 100 to the cable 58, as shown in FIG. 54. The above measurement is performed by a measuring unit 101 in this signal processing unit 100. The information obtained by this measurement is supplied to an information processing unit 102. The information is then processed by the information processing unit 102 by the same processing method as in the first embodiment. Therefore, in order to avoid a repetitive description, a detailed description of the method of using the information about the axis about which each joint rotates, the information about the location of each arm, and the information about the direction and length of each arm in the manipulator apparatus having the above arrangement will be omitted (refer to the first embodiment).

As described above, in the third embodiment, the manipulator main body 1 is constituted by a combination of the joints 3a to 3g, formed as modules, each incorporating the identification signal generator for outputting an identification signal indicating the degree-of-freedom direction of each joint on a given coordinate system, and the arms 4a to 4c, each incorporating the measurement signal generators 68 and 93 for outputting signals indicating the direction and length of each arm. With this arrangement, all the information required to customize the software used for driving/controlling the manipulator main body 1 can be obtained, and hence customizing of the software can be performed by using the signal processing unit 100. As a result, a procedure of software creation (e.g., editing, compiling, and linking) which is performed in a working site can be omitted. Therefore, the software for the relationship between the positions of each joint and the end effector, the software for the relationship between the speeds of each joint and the end effector, and the software for the relationship between the forces of each joint and the end effector can be easily and customized in accordance with a degree-of-freedom arrangement selected in the working site.

The present invention is not limited to the above-described embodiment. Although the above embodiment incorporates the arms whose directions and lengths can be electrically measured from the base side, the present invention is not limited to such an arrangement.

For example, the arrangement shown in FIG. 57 may be employed. FIG. 57 shows a shape changing structure, specifically a Z-axis extension arm 4d capable of changing its length. Note that the same reference numerals in FIG. 57 denote the same parts as in FIG. 51, and a repetitive detailed description will be avoided.

In the arm 4d, a resistive line 111 is arranged on the inner surface of an outer cylindrical member 72 to extend parallel to the axis of the arm 4d and to be folded near a flange 71, while a connection unit 113 having contact members 112a and 112b which are brought into slidable contact with the resistive line 111 is arranged on the inner surface of an upper end portion (in FIG. 57) of an inner cylindrical member 74, and the contact members 112a and 112b are connected to a two-pin type connector 115 through a cable 114.

In this case, the resistive line 111, the connection unit 113, the cable 114, and the connector 115 constitute a measurement signal generator 116, and a resistance rz measured between the pins of the connector 115 corresponds to the length of the arm 4d. The arm 4d having such an arrangement may be used.

If the arm 4d having the above-described arrangement is used, since information about a joint arranged to be closer to the farthest end side than the arm 4d cannot be read on the base side, a connection element for transmitting information may be used, or the structure of the identification signal generator of the joint on the farthest end side may be changed to allow information to be independently read.

Figure 58:
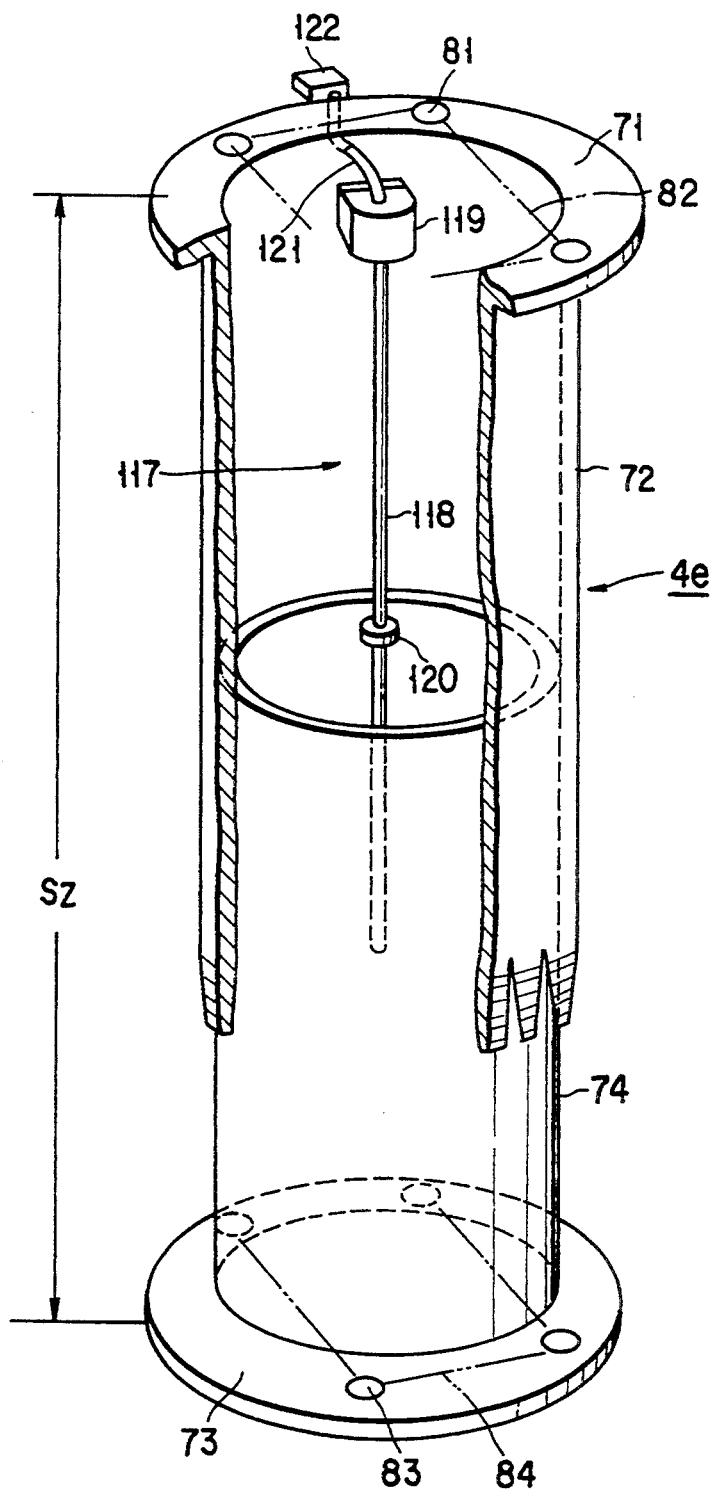
FIG. 58 is a partially cutaway perspective view showing another modification of the Z-axis extension arm module.

FIG. 58 shows another modification of the arm. FIG. 58 shows a shape changing structure, specifically a Z-axis extension arm 4e capable of changing its length. Note that the same reference numerals in FIG. 58 denote the same parts as in FIG. 57, and a repetitive detailed description will be omitted.

In this arm 4e, a measurement signal generator 117 is constituted by a magnetic linear scale. More specifically, a rod-like sensor main body 118 is arranged to extend along the inner surface of an outer cylindrical member 72 so as to be parallel to the axis of the arm 4e, and an upper end portion (in FIG. 58) of the sensor main body 118 is connected to a sensor amplifier 119 fixed to the inner surface of the outer cylindrical member 72. A sensor target 120 is arranged on the inner surface of an upper end portion (in FIG. 58) of an inner cylindrical member 74 to be fitted on the sensor main body 118. In addition, the sensor amplifier 119 is connected to a connector 122 through a cable 121, and a signal corresponding to a length Sz of the arm 4e is output through the connector 122.

Figure 59:
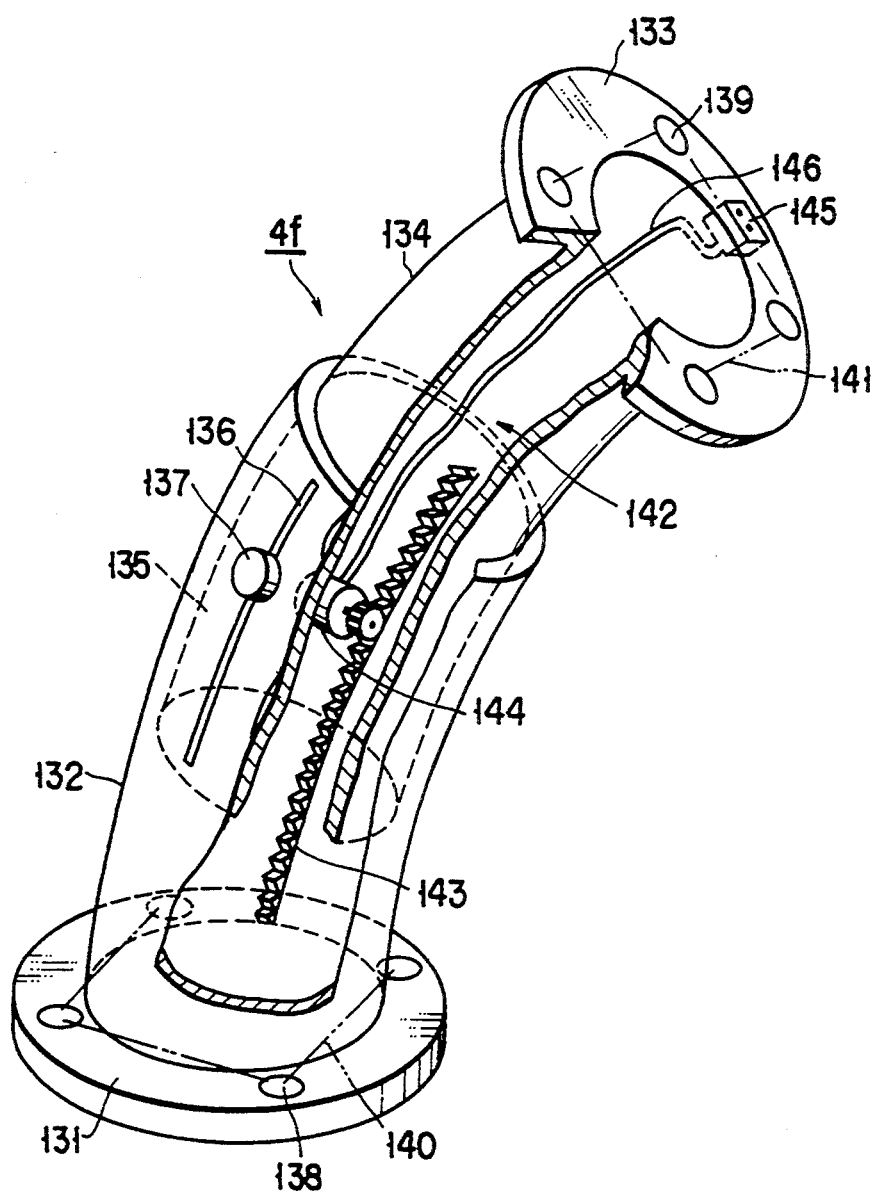
FIG. 59 is a partially cutaway perspective view showing an arcuated arm module.

FIG. 59 shows still another modification of the shape changing structure, specifically an arcuated arm 4f capable of changing the length of the arc.

The basic structure of the arm main body is the same as that shown in FIG. 51. That is, the arm main body is constituted by an outer cylindrical member 132 having a flange 131 on one end side and formed into an arcuated shape having a center at one point, an inner cylindrical member 134 having a flange 133 on one end side, formed into an arcuated shape having a center at the above point, and having the other end side fitted in the outer cylindrical member 132, and a pair of fixing mechanisms 135 for fixing the degree of fitting of the inner cylindrical member 134 to a desired value. The pair of fixing mechanisms 135 are arranged to oppose each other. Each fixing mechanism 135 comprises a slit 136 formed in an outer cylindrical member 132, a screw hole (not shown) formed in an inner cylindrical member 134, and a set screw 137 turned into the screw hole from the outer surface side of the outer cylindrical member 132 through the slit 136. Note that mounting portions 140 and 141 respectively constituted by two sets of four mounting holes 138 and 139 are formed on the flanges 131 and 133.

A measurement signal generator 142 is mounted in the arm 4f. This measurement signal generator 142 comprises a toothed belt 143 fixed to the inner surface of the outer cylindrical member 132 to extend along the axis of the arm 4f, with its portion extending into the toothed belt 143 through the slit formed in the inner cylindrical member 134, a potentiometer 144 fixed to the inner surface of the inner cylindrical member 134 and meshed with the toothed belt 143 to be rotated, a two-pin type connector 145 fixed to the flange 133 such that a connecting portion of the flange 133 is exposed to the upper surface in FIG. 59, and a cable 146 for connecting the connector 145 to the potentiometer 144. A signal corresponding to the length of the arm 4f is output through the connector 145. The arm having such an arrangement may be used.

Figure 60:
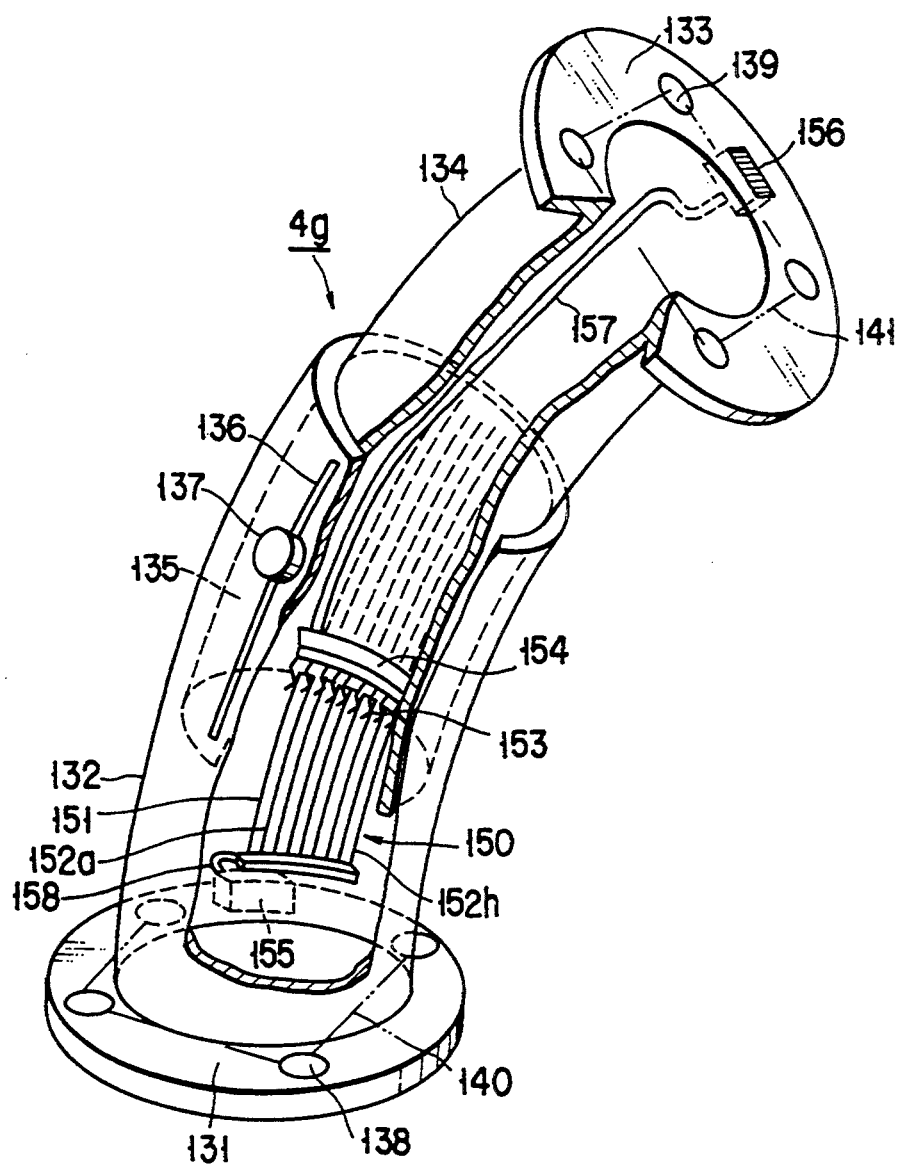
FIG. 60 is a partially cutaway perspective view showing another type of arcuated arm module.

FIG. 60 shows still another modification of the arm. FIG. 60 shows a shape changing structure, specifically an arcuated arm 4g capable of changing the length of the arc. The basic structure of the arm main body is the same as that shown in FIG. 59. Therefore, the same reference numerals in FIG. 60 denote the same parts as in FIG. 59.

The modification in FIG. 60 is different from that shown in FIG. 59 in a measurement signal generator 150. The measurement signal generator 150 comprises, basically similar to the unit shown in FIG. 51, a connection unit 154 having one ground line 151 and eight resistive lines 152a to 152h arranged on the inner surface of an outer cylindrical member 132, and a total of nine contact members 153 which are fixed to an inner cylindrical member 134 and brought into slidable contact with the lines in one-to-one correspondence, a nine-pin connector 155 mounted on a flange 131, a nine-pin connector 156 mounted on a flange 133, a cable 157 for connecting each pin of the connector 156 to a corresponding pin of the connection unit 154, and a cable 158 for connecting the ground line 151 and the eight resistive lines 152a to 152h to the corresponding pins of the connector 155. A resistance signal corresponding to the distance between the flanges 131 and 133 is output through the connectors 155 and 156.

Figure 61:
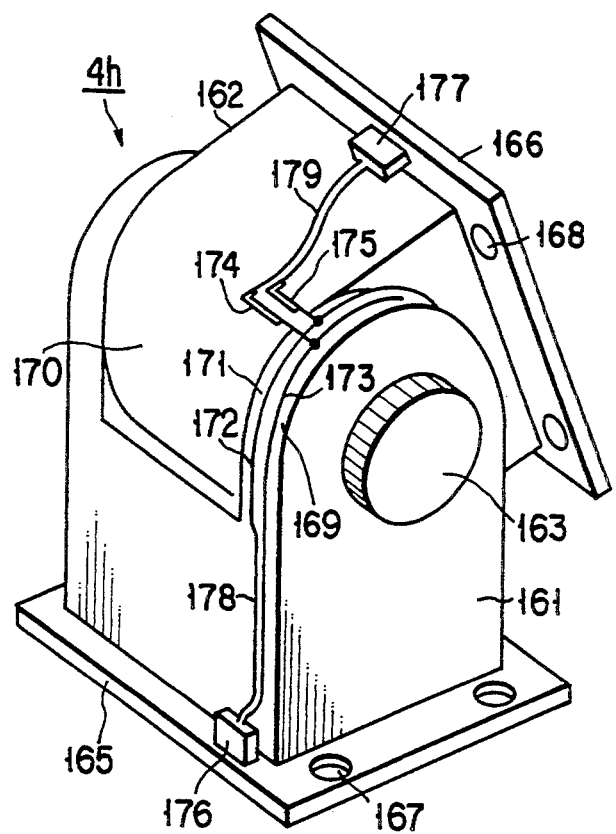
FIG. 61 is a perspective view showing a flexion arm module.

FIG. 61 shows a flexion arm 4h according to still another modification.

The main body of this arm 4h is constituted by a coupling member 161, a coupling member 162 pivotally coupled to the coupling member 161, and torsional dials 163 and 164 (note that the torsional dial 164 is not shown) for fixing the coupling members 161 and 162 at a predetermined pivot position. Mounting plates 165 and 166 are respectively mounted on the coupling members 161 and 162. Mounting portions 167 and 168 respectively constituted by two sets of four mounting holes are formed on the plates 165 and 166.

Curved surfaces 169 and 170 having the same radius are formed at the pivot coupling portions of the coupling members 161 and 162 so as to have the same center at the pivot center. A measurement signal generator 171 is arranged on the arm 4h to utilize the curved portions 169 and 170. The measurement signal generator 171 comprises resistive lines 172 and 173 formed on the curved surface 169 to extend parallel thereto in the circumferential direction, contact members 174 and 175 which are fixed to the curved surface 170 and brought into slidable contact with the resistive lines 172 and 173, a two-pin type connector 176 mounted on the plate 165 to expose the signal pins to the lower surface in FIG. 61, a two-pin type connector 177 mounted on the mounting plate 166 to expose the signal pins to the upper surface in FIG. 61, a connection line 178 for connecting one end of each of the resistive lines 172 and 173 to the signal pins of the connector 176, and a connection line 179 for connecting the contact members 174 and 175 to the signal pins of the connector 177. Therefore, the arm 4h of this modification is designed such that a signal corresponding to the pivot angle defined by the coupling members 161 and 162 is output from the measurement signal generator 171.

Figure 62:
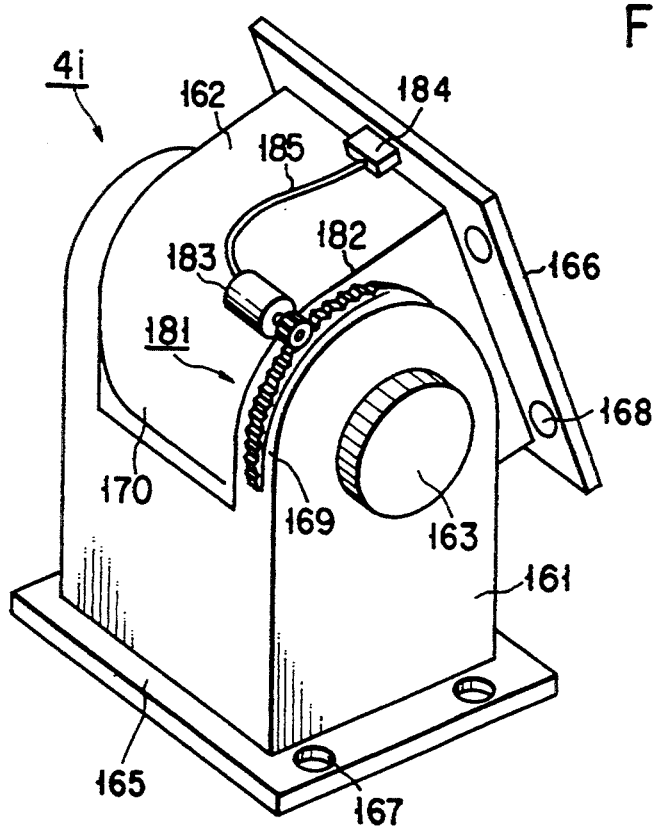
FIG. 62 is a perspective view showing another type of flexion arm module.

FIG. 62 shows an arm according to still another modification, specifically a flexion arm 4i. The same reference numerals in FIG. 62 denote the same parts as in FIG. 61, and a repetitive detailed description will be omitted. The arm of this modification is different from the arm shown in FIG. 61 in a measurement signal generator 181.

The measurement signal generator 181 comprises a toothed belt 182 formed on a curved surface 169 to extend in the circumferential direction, a potentiometer 183 fixed to a curved surface 170 to be meshed with the toothed belt 182, a two-pin type connector 184 mounted on a plate 166 to expose the signal pins to the upper surface in FIG. 62, and a connection line 185 for connecting the output terminal of the potentiometer 183 to the signal pins of the connector 184. That is, this measurement signal generator 181 is designed such that a signal corresponding to the pivot angle defined by coupling members 161 and 162 is output through the connector 184.

Figure 63:
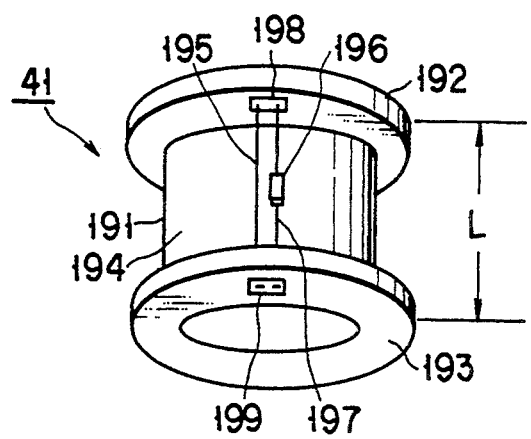
FIG. 63 is a perspective view showing a block type arm module unit.
Figure 64:
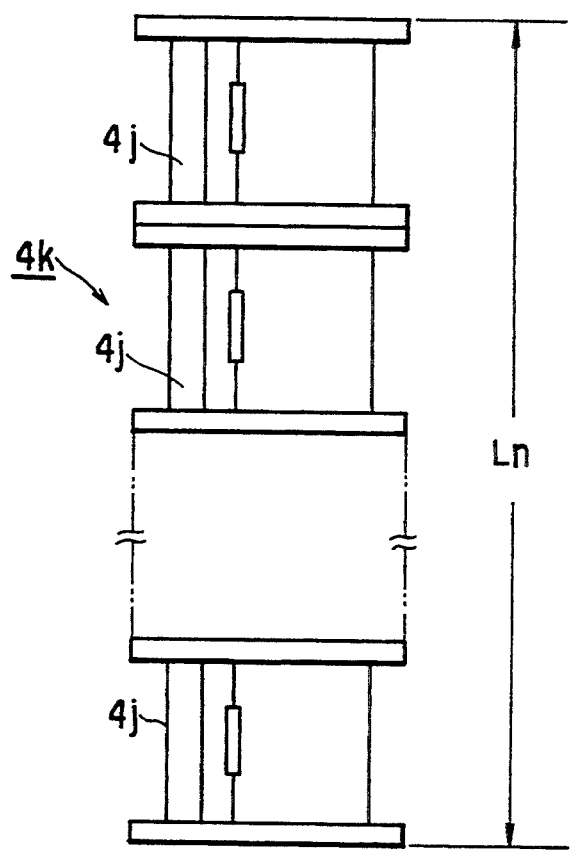
FIG. 64 is a side view of an arm module formed by combining arm module units, each identical to that shown in FIG. 63.

FIG. 63 shows an arm unit 4j formed into a block according to still another modification. FIG. 64 shows an arm 4k constituted by a combination of a plurality of arm units 4j.

The main body of the arm unit 4j is constituted by a cylindrical member 191 and mounting flanges 192 and 193 mounted on the two end portions of the cylindrical member 191. The arm unit 4j incorporates a measurement signal generator 194. The measurement signal generator 194 comprises a ground line 195 extending along the outer surface of the cylindrical member 191, a signal line 197 extending parallel to the ground line 195 and having a resistor 196, which has a resistance r corresponding to an axial length L of the arm unit 4j, inserted therein, a two-pin type connector 198 which is mounted on the mounting flange 192 such that the pins, each connected to one end of each of the ground line 195 and the signal line 197, are exposed to the upper surface in FIG. 63, and a two-pin type connector 199 which is mounted on the mounting flange 193 such that the pins, each connected to the other end of each of the ground line 195 and the signal line 197, are exposed to the lower surface in FIG. 63.

If n arm units 4j are connected in series to constitute an arm 4k, as shown in FIG. 64, and a resistance is measured through the connectors located at the two end portions of the arm 4k, the measured resistance is n times that of a single arm unit. Therefore, a length Ln of the arm 4k can be obtained from this value.

In order to measure a resistance from one end side of the arm 4k, a flange having a short-circuit connector may be mounted on a mounting flange located on the side opposite to the side from which measurement is to be performed.

FIG. 65 shows an arm unit 4m formed into a block according to still another modification. Similar to the unit shown in FIG. 64, the main body of the arm unit 4m is constituted by a cylindrical member 200 and mounting flanges 201 and 202 mounted on the two end portions of the cylindrical member 200. The cylindrical member 200 is not constituted by a straight cylindrical member but is constituted by a curved cylindrical member partially defining an arc having a center at a point P and a radius L1. In this case, the distance between the mounting flanges 201 and 202 is set to be a value corresponding to $\Theta = 15°$ with the point P serving as a center. The arm unit 4m incorporates a measurement signal generator 203.

Similar to the generator shown in FIG. 64, the measurement signal generator 203 comprises a ground line 204, a signal line 206 having a resistor 205, which exhibits a resistance r corresponding to an angle $\Theta$ defining the arm unit 4m, inserted therein, and two-pin type connectors 207 and 208 to which the ground line 204 and the signal line 206 are connected.

In this modification, when an arm is constituted by connecting a required number of arm units 4m, a flange 209 is connected to one end portion of the arm. The flange 209 has a connector 210 connected to a connector on the arm side. An inductor 211 having an inductance indicating a radius L1 is connected to the connector 210. In this case, therefore, the curvature radius L1 of the arm can be obtained from a measured inductance, and the angle range of the arc of the arm can be obtained from a measured resistance. In addition, the length of the arc of the arm can be obtained on the basis of the relationship between the measured inductance and resistance. The arm having such an arrangement may be used.

The above-described various arms are not limited to a manipulator main body using joint modules but may be applied to a normal joint/arm-integrated type manipulator main body.

(Fourth Embodiment)

Figure 66:
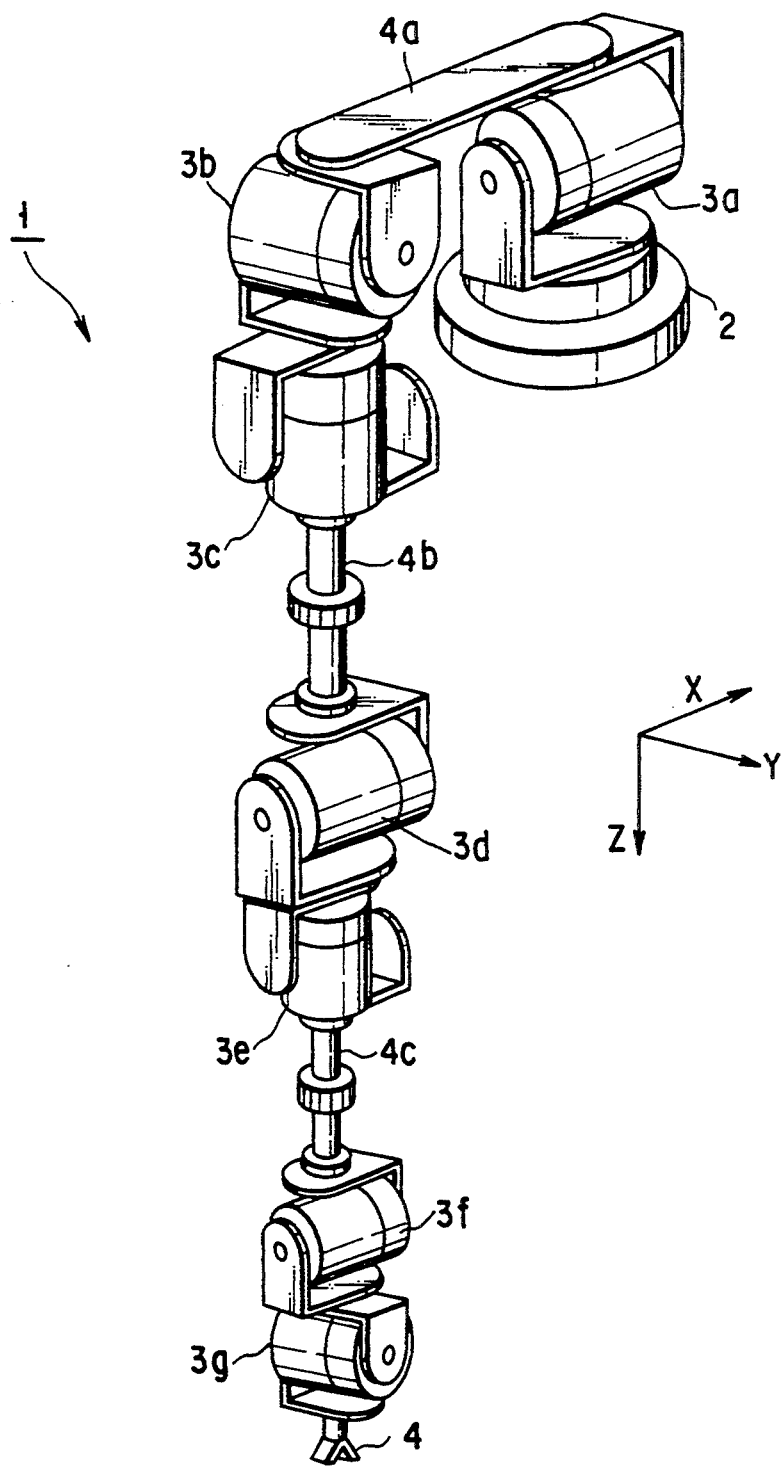
FIG. 66 is a perspective view showing a practical manipulator main body of a manipulator apparatus according to the fourth embodiment of the present invention.

FIG. 66 shows the fourth embodiment of the present invention. In this embodiment, in order to improve the operation efficiency of the apparatus of the third embodiment described above (cf. FIG. 44), the sizes of the respective modules are set to be different from each other, and a desired combination of the modules is disclosed as a combination constituting an actual manipulator main body. Joint modules (3a and 3b) connected to a base 2 of the main body are constituted by modules having large driving forces, whereas joint modules (3f and 3g) for connected nearby a end effector 4 are constituted by lightweight modules having small driving forces. In addition, arm modules and the like (4a, 4b, and 4c) are reduced in size (width) and weight as they located closer to the end effector 4.

The size of each module is detected as follows. The size and torque of each joint module are proportional to the length of the winding of the motor (i.e., the resistance) of each module. Therefore, the relative size of each module can be easily recognized by detecting the resistances of the winding of a power feed line as signals indicating a module size. If the arm module can output predetermined signals corresponding to the length of the arm (neither one's thickness nor one's weight). Those signals are used for customizing the program.

(Effects of Third and Fourth Embodiments)

As described above, according to the present invention, at least one of a plurality of arm modules has a shape changing means capable of arbitrarily setting the length or bending angle of the arm itself, and a measurement signal generator is arranged to output a signal corresponding to the set length or bending angle. With this arrangement, even after the manipulator main body is assembled, its working range can be greatly changed by changing the shape of the arm. In this case, the length or bending angle of the arm can be accurately detected on the basis of an output from the measurement signal generator. Therefore, when, for example, only the arm shape is changed, the software for driving-/controlling the manipulator main body can be customized on the basis of information before the change and an output from the measurement signal generator.

If a new manipulator main body is assembled, or reassembly is performed as the operation contents are changed, required information (required signals, i.e., required parameters) for customizing of the software for driving/controlling the manipulator main body can be obtained by using the above method in combination with a scheme of arranging an identification signal generator for outputting a signal corresponding to the degree-of-freedom direction of each joint. Therefore, customizing can be performed by a signal processing unit to obtain desired software.

That is, the conventional procedure of software creation (e.g., program editing, compiling, and linking) which is manually performed in a working site can be omitted. For example, a program for the relationship between the positions of each joint angle and the position of the hand portion, a program for the relationship between the speeds of each joint and the speed of the hand portion, a program for the relationship between the forces of each joint and the force of the hand portion, and the like can be easily and quickly customized to optimal programs by the system of the main body in accordance with a degree-of-free-arrangement selected in a working site without the mediacy of a manual operation.

By employing the combination of the different driving power modules for the joint portion described in the fourth embodiment, a practical module type manipulator apparatus with high driving efficiency can be provided.

Additional advantages and modifications will readily occur to those skilled in the art. Therefore, the invention (in its broader aspects) is not limited to the specific details, and representative devices, shown and described herein. Accordingly, various modifications may be made without departing from the spirit or scope of the general inventive concept as defined by the appended claims and their equivalents.

What is claimed is:

1. A manipulator apparatus comprising:

a plurality of modules each of said modules including a joint unit having a mounting portion for selectively connecting said modules together in a plurality of directions for selective determination of a degree of freedom of mounting, and each module also including a driving source connected at predetermined positions on said mounting portions, and for selectively moving in a predetermined direction and at least one of said modules includes an identification display means for selectively setting a selected current state of said module and for visual recognition thereof;

driving/controlling means for controlling an operation of said modules including means for storing an operating condition;

information output means, arranged in each of said modules, for acquiring and outputting predetermined information associated with said module including information representing the direction of extension of an axis of rotation of each said joint unit;

information processing means for receiving information from each of said information output means including angular information of each said joint unit and performing predetermined analysis processing on the basis of each piece of information to convert to the information into an operation condition information for said driving/controlling means for specifying an operation of each module; and function performing means for receiving said operating condition information which is stored in said storage means of said driving/controlling means for specifying a new operation of each of said modules.

2. The manipulator apparatus according to claim 1, wherein each of said modules includes an arm unit extending in a predetermined direction for selectively changing a length or angle thereof.

3. The manipulator apparatus according to claim 1, wherein there are at least three joint units.

4. The apparatus according to claim 1, wherein at least each of said joint units and one of said arm units includes said information output means, and said information output means comprises:

identification signal generating means for detecting/acquiring unit type information unique to said unit and combination information indicating a degree of freedom of a combination, and outputting the pieces of information as identification signal signals, and measurement signal generating means for detecting information associated with a shape such as a length or a bending angle of said unit or acquiring the information of said identification display means, and outputting information as a measurement signal.

5. A module type manipulator apparatus having a plurality of modules, a combination of which can be freely selected, and control means for controlling a predetermined operation corresponding to the selected combination, comprising:

a manipulator main body, a combination of joint modules, each constituted by a plurality of types of mounting units and a driving source mounted at predetermined positions on said mounting units, and an arm module extended in a predetermined direction for selectively changing a length or angle thereof;

identification display means, arranged in at least one of said modules, for selectively detecting or manually setting information representing a selected current state of said module, such as unit type information unique to said module, and combination information representing a degree of freedom of combination after the current state, allowing visual recognition thereof, and outputting the information;

identification signal generating means, connected to said identification display means, for receiving the output information, converting the information into an identification signal, and outputting the identification signal; and measurement signal generating means for measuring and detecting information associated with a shape such as a length or bending angle of said unit, or acquiring information from said identification display means, converting the information into a measurement signal, and outputting the measuring signal, and further comprising:

an information processing unit for storing driving/controlling means for specifying an operation of each of said joint modules for optimally driving/controlling said manipulator main body, updating an operation specifying condition of said driving/controlling means to a condition optimal for a combination of modules constituting said manipulator main body on the basis of output signals from said identification signal generating means and said measurement signal generating means, and selectively starting the operation specifying condition.

6. The apparatus according to claim 5, wherein said identification signal generating means and said measurement signal generating means automatically output the identification signal and the measurement signal every time said manipulator main body is assembled.

7. The apparatus according to claim 5, wherein said information processing unit comprises signal processing means, directly connected to said respective generating means, for calculating a parameter as a condition specifying an operation of said driving/controlling means so as to cause said manipulator main body to operate as a whole on the basis of signals respectively output from said measurement signal generating means and said identification signal generating means, and selectively resetting said driving/controlling means by using the parameter.

8. The apparatus according to claim 7, wherein said signal processing means comprises:

first parameter generating means for generating a first parameter for specifying a predetermined operation condition on the basis of a first signal from said measurement signal generating means, and second parameter generating means for generating a second parameter for specifying a predetermined operation condition on the basis of a second signal from said identification signal generating means, wherein the first and second parameters from said first and second parameter generating means are selectively set in said driving/controlling means to replace an initial operation condition.

9. The apparatus according to claim 5, wherein said identification signal generating means outputs first and second identification signals, the first identification signal indicating a degree of freedom of combination of each of said joint modules in a given coordinate system direction, and the second identification signal indicating an ordinal number of each joint module in an order of connection.

10. The apparatus according to claim 5, wherein said identification display means comprises at least a first switch including a dial on which an ordinal number of each joint module with respect to a base is drawn, and a pointer for indicating a character on said dial, or a second switch constituted by a dial on which arbitrary directions of combination on a predetermined rectangular coordinate system are drawn, and a pointer for indicating a character on said dial.

11. The apparatus according to claim 5, wherein said identification signal generating means is a gravity switch comprising:

a rectangular parallelepiped case consisting of a metal and having a bottom, an insulating member close to for closing to close an opening portion of said case, a wire member having predetermined rigidity, said wire member having one end fixed to said insulating member and the other end extending into said case, a conductive member fixed to a free end of said wire member, and a connector connected to said case and said wire member through leads.

12. The apparatus according to claim 5, wherein said measurement signal generating means is a magnetic linear case comprising:

a rod-like sensor fixed to one end of said arm module in a longitudinal direction, which said arm module is capable of arbitrarily changing a length thereof, said sensor having one end connected to said module with the other end set in a movable state, a sense amplifier for amplifying a signal from said sensor, and a connector connected to said sense amplifier through a cable.

13. The apparatus according to claim 5, wherein said plurality of arm modules comprise:

a first axis extension arm unit extending in a horizontal axis direction in a given coordinate system, a second axis extension arm unit extending in an axis direction which is perpendicular to the horizontal axis but is not a vertical axis, and a third axis extension arm unit extending in a vertical axis direction.

14. A manipulator apparatus comprising:

a plurality of modules, each of said modules including: a joint unit having a mounting portion for selectively connecting said modules together in a plurality of directions; and a driving source connected to a predetermined position on said mounting portions and having a function of selectively moving in a predetermined direction, at least one of said modules including identification display means for selectively setting a current state of said module and for allowing visual recognition thereof, wherein said manipulator apparatus has a proximal and distal end, and a size of each of said modules decreases in the direction from the proximal end to the distal end;

driving/controlling means for controlling an operation of said modules, said driving/controlling means having means for storing an operating condition;

information output means, arranged in each of said modules, acquiring and outputting predetermined information associated with said module, said predetermined information including information which represents the direction of extension of an axis of rotation of each said joint unit;

information processing means for receiving information from each of said information output means, said information received by the information processing means including angular information of each said joint unit, for performing predetermined analysis processing on the basis of each piece of information, to thereby obtain operation condition information used for specifying an operation of each module, and for supplying the operation condition information to said driving/controlling means; and function performing means for receiving said operating condition information which is stored in said storage means of said driving/controlling means to cause each of said modules to perform a newly specified operation.

* * * * *